US008237771B2

United States Patent
Kurtz et al.

(10) Patent No.: US 8,237,771 B2
(45) Date of Patent: *Aug. 7, 2012

(54) AUTOMATED VIDEOGRAPHY BASED COMMUNICATIONS

(75) Inventors: Andrew F. Kurtz, Macedon, NY (US); Andrew C. Blose, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 706 days.

This patent is subject to a terminal disclaimer.

(21) Appl. No.: 12/411,431

(22) Filed: Mar. 26, 2009

(65) Prior Publication Data

US 2010/0245532 A1 Sep. 30, 2010

(51) Int. Cl.
*H04N 7/14* (2006.01)

(52) U.S. Cl. ............... 348/14.08; 348/14.12; 348/14.01; 348/14.03

(58) Field of Classification Search .... 348/14.01–14.16, 348/169–172
See application file for complete search history.

(56) References Cited

U.S. PATENT DOCUMENTS

| | | | |
|---|---|---|---|
| 3,495,908 A | 2/1970 | Rea | |
| 4,485,400 A | 11/1984 | Lemelson et al. | |
| 5,457,370 A | 10/1995 | Edwards | |
| 5,572,248 A | 11/1996 | Allen et al. | |
| 5,729,471 A | 3/1998 | Jain | |
| 5,734,415 A | 3/1998 | Hwang | |
| 5,831,670 A | 11/1998 | Suzuki | |
| 5,900,925 A | 5/1999 | Navarro | |
| 5,999,207 A | 12/1999 | Rodriguez et al. | |
| 6,040,841 A | 3/2000 | Cohen et al. | |
| 6,160,573 A | 12/2000 | Allen et al. | |
| 6,243,130 B1 | 6/2001 | McNelley et al. | |
| 6,275,258 B1 | 8/2001 | Chim | |
| 6,400,903 B1 | 6/2002 | Conoval | |
| 6,611,281 B2 | 8/2003 | Strubbe | |
| 6,710,797 B1 | 3/2004 | McNelley et al. | |
| 6,850,265 B1 | 2/2005 | Strubbe | |
| 6,894,714 B2 | 5/2005 | Gutta et al. | |
| 7,015,954 B1 | 3/2006 | Foote et al. | |
| 7,061,525 B1 | 6/2006 | Tanaka | |
| 7,184,917 B2 | 2/2007 | Pramanick et al. | |
| 7,349,008 B2 * | 3/2008 | Rui et al. ................. | 348/169 |
| 2002/0130955 A1 | 9/2002 | Pelletier | |
| 2005/0041840 A1 | 2/2005 | Lo | |

(Continued)

OTHER PUBLICATIONS

Fish et al.; The VideoWindow System in Informal Communications; CSCW 90 Proceedings, Oct. 1990, pp. 1-11.

(Continued)

*Primary Examiner* — Melur Ramakrishnaiah
(74) *Attorney, Agent, or Firm* — Nelson Adrian Blish

(57) ABSTRACT

A method for framing subjects captured on video includes receiving video of a subject and determining a current shot framing of the subject. A magnitude and a direction of movement of the subject is determined, relative to the current framing and a level of motion threshold. The subject movement is analyzed relative to the determined magnitude, direction of subject movement, and the current framing, to determine that the subject is properly framed by the current shot framing or whether modifications of the current shot framing are required to capture the moving subject, or to determine a new shot selection and new shot framing. The camera reframes the subject if the subject is determined not to be properly framed, in accordance with the determined modifications of the current shot framing, the new shot selection and new shot framing. Video images are provided to a remote viewer.

32 Claims, 22 Drawing Sheets

U.S. PATENT DOCUMENTS

| | | | |
|---|---|---|---|
| 2005/0146598 | A1 | 7/2005 | AbiEzzi et al. |
| 2006/0075448 | A1 | 4/2006 | McAlpine et al. |
| 2006/0251384 | A1 | 11/2006 | Vronay et al. |
| 2008/0118161 | A1* | 5/2008 | Liu et al. ............ 382/228 |
| 2008/0211941 | A1 | 9/2008 | Deever et al. |
| 2008/0246830 | A1* | 10/2008 | Martin et al. ........ 348/14.02 |
| 2008/0298795 | A1 | 12/2008 | Kuberka et al. |
| 2010/0118112 | A1* | 5/2010 | Nimri et al. ......... 348/14.08 |

OTHER PUBLICATIONS

Neustaedter et al.; The Design of a Context-Aware Home Media Space for Balancing Privacy and Awareness; Proceedings of the Fifth International Conference on Ubiquitous Computing, 2003.

Doubek et al.; Cinematographic Rules Applied to a Camera Network; Omnivis2004.

Bares et al.; Cinematographic User Models for Automated Realtime Camera Control in Dynamic 3D Environments; Proceedings of the Sixth International Conference on User Modeling, 1997.

Kim et al.; Cinematized Reality: Cinematographic 3D Video System for Daily Life Using Multiple Outer/Inner Cameras; IEEE Computer Vision and Pattern Recogintion Workshop, 2006.

Forsysth et al.; Finding People and Animals by Guided Assembly; published in the Conference on Image Processing, vol. 3, 1997, pp. 5-8.

Kang et al.; Real-time video tracking using PTZ cameras; SPIE Proceedings, 2003, vol. 5132, pp. 103-111.

* cited by examiner

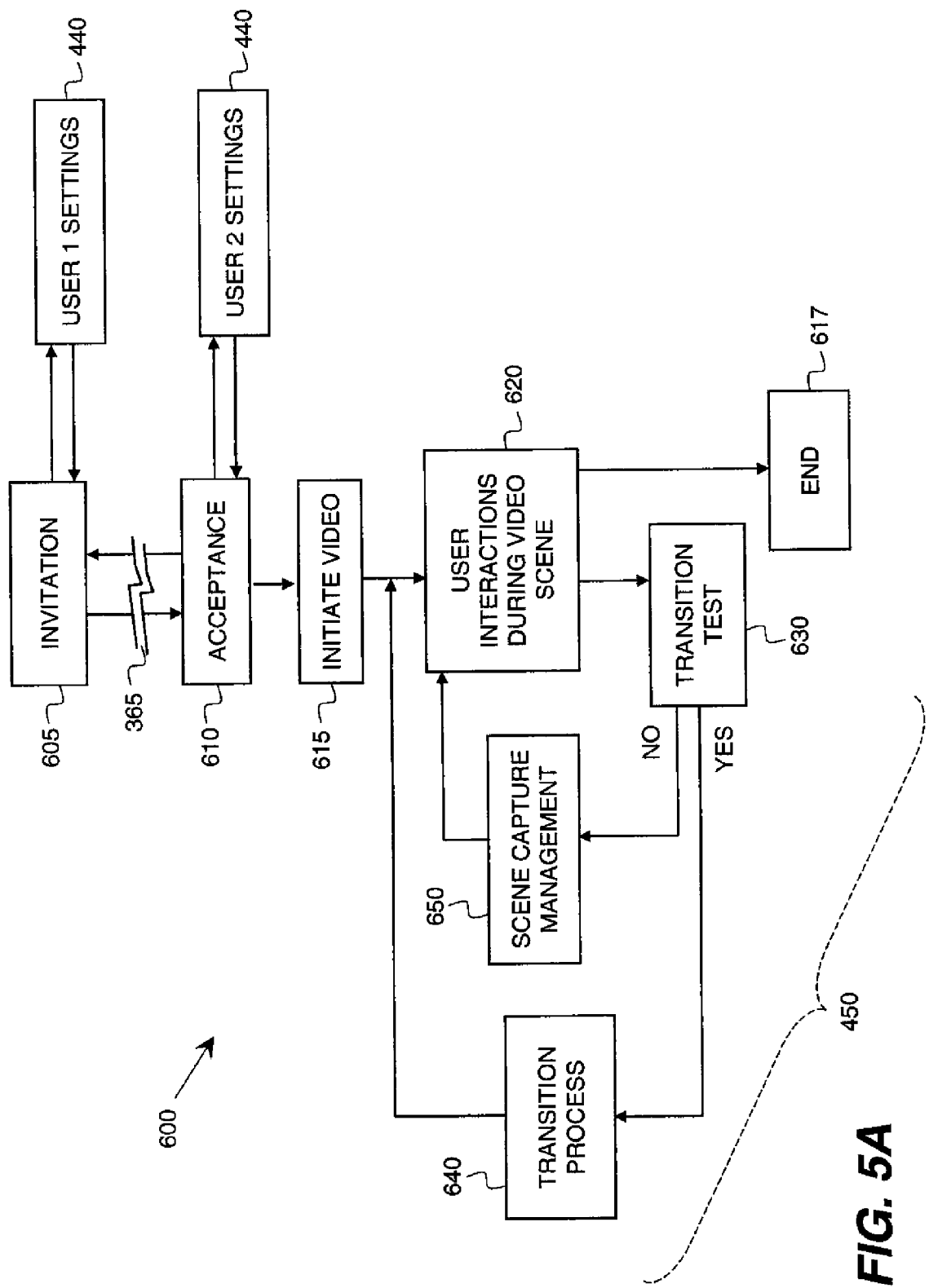

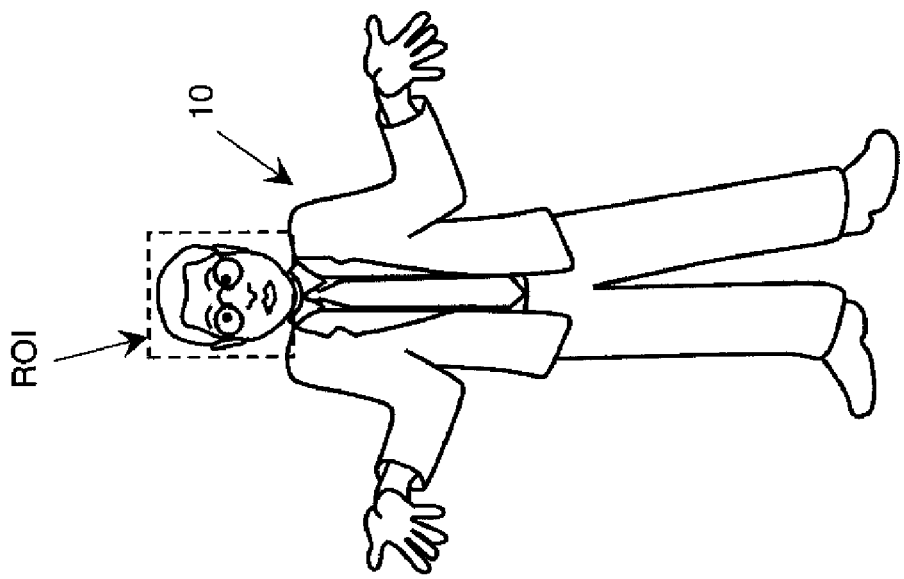
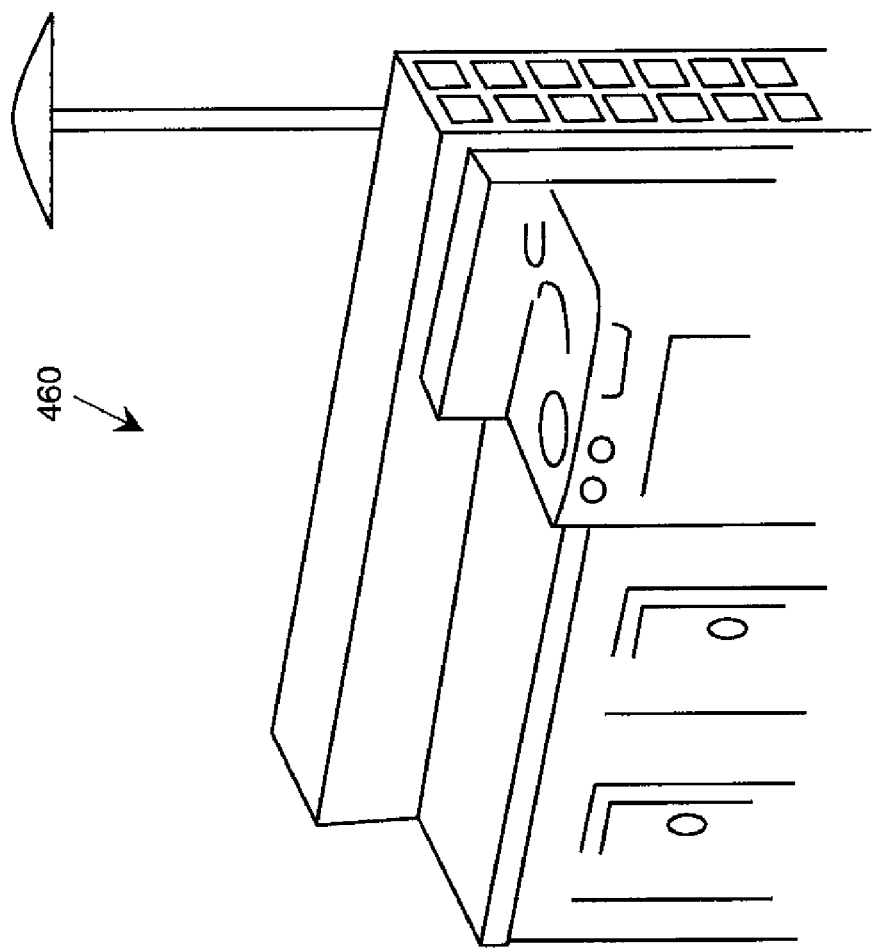
FIG. 8B
FIG. 8A

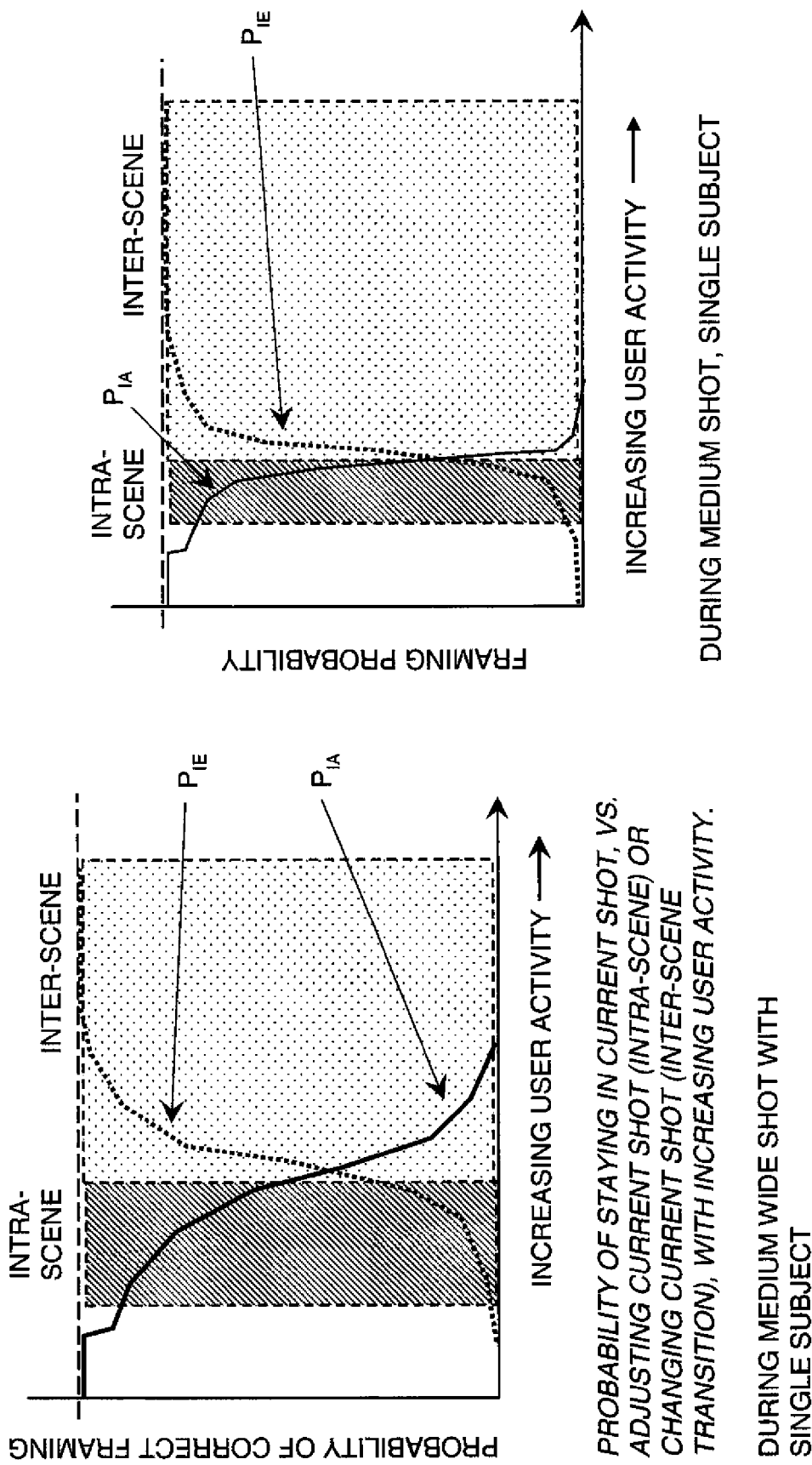

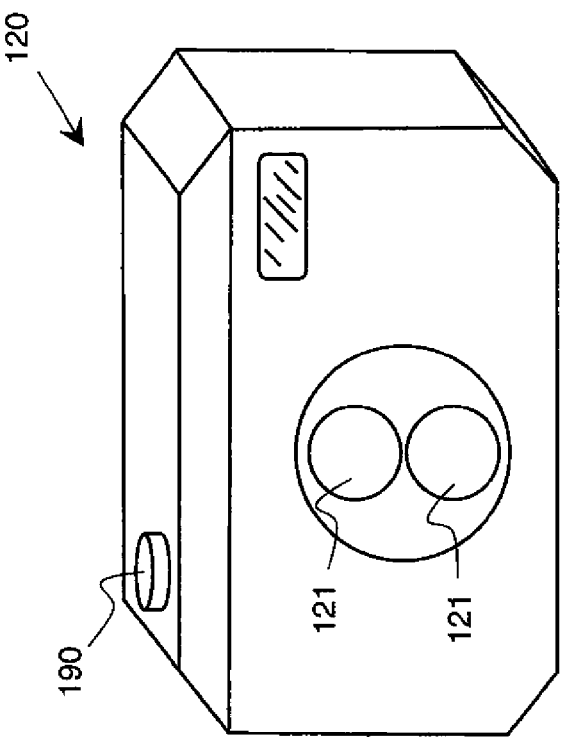
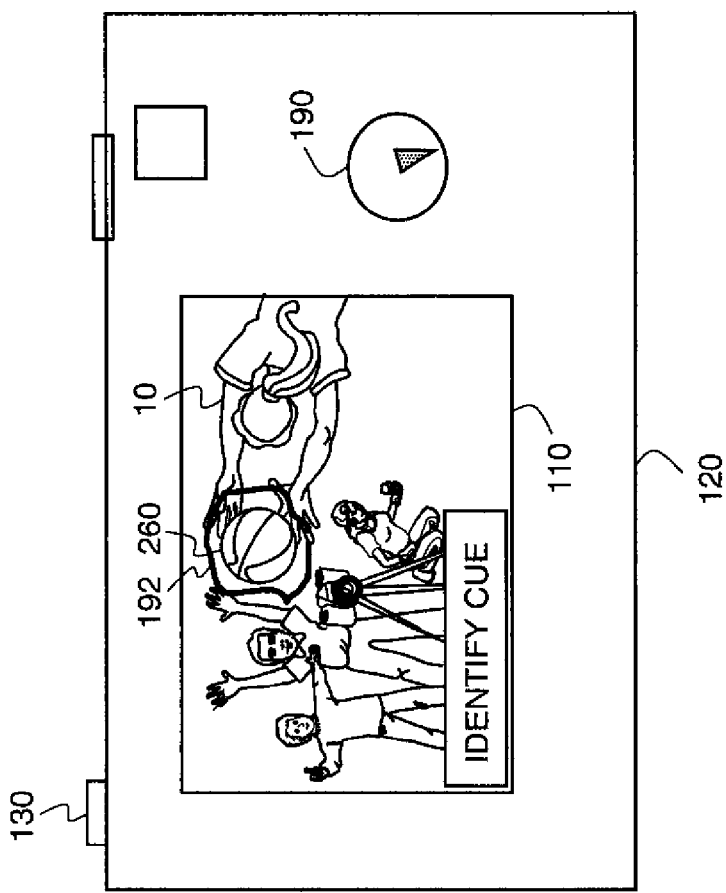
FIG. 12B
FIG. 12A

AUTOMATED VIDEOGRAPHY BASED COMMUNICATIONS

CROSS REFERENCE TO RELATED APPLICATIONS

Reference is made to commonly-assigned copending U.S. patent application Ser. No. 11/756,532, filed May 31, 2007, entitled A RESIDENTIAL VIDEO COMMUNICATION SYSTEM, by Kurtz et al.; U.S. patent application Ser. No. 11/756,563, filed May 31, 2007, entitled MANAGING SCENE TRANSITIONS FOR VIDEO COMMUNICATION, by Kurtz et al.; U.S. patent application Ser. No. 11/756,562, filed May 31, 2007, entitled MULTI-CAMERA RESIDENTIAL COMMUNICATION SYSTEM, by Kurtz et al.; U.S. patent application Ser. No. 11/755,156, filed May 30, 2007, entitled CAMERA CONFIGURABLE FOR AUTONOMOUS SELF LEARNING OPERATION, by Kuberka et al.; and U.S. patent application Ser. No. 12/408,898, filed Mar. 23, 2009, entitled AUTOMATED VIDEOGRAPHY SYSTEM, by Kurtz et al.; the disclosures of which are incorporated herein by reference.

FIELD OF THE INVENTION

The present invention relates to automated videography systems that are particularly suitable for enabling video communications between remote and local participants, with an approach that is particularly suitable for use in residential environments. Specifically, the present invention relates to automated image capture and image framing of unscripted real-time events using a limited set of cameras, which is applicable for video communications, video recording, and other applications.

BACKGROUND OF THE INVENTION

The concept of the video-telephone has long been anticipated, including in the serialized novel "Tom Swift and His Photo Telephone" (1914). An early working videophone system was exhibited by Bell Labs at the 1964 New York World's Fair. AT&T subsequently commercialized this system in various forms, under the Picturephone brand name. However, the Picturephone had very limited commercial success. Technical issues, including low resolution, lack of color imaging, and poor audio-to-video synchronization affected the performance and limited the appeal. Additionally, the Picturephone imaged a very restricted field of view, basically amounting to a portrait format image of a participant. This can be better understood from U.S. Pat. No. 3,495,908 (Rea), which describes a means for aligning a user within the limited capture field of view of the Picturephone camera. Thus, the images were captured with little or no background information, resulting in a loss of context.

In the modern world, two-way video communications are now enabled by various technologies. As a first example, cellular phones, including phone-cameras, are widely used. While currently many cell phones include cameras for capturing still images, most cell phones still lack live video capture and display capability. However, companies such as Fotonation Ltd. (Ireland) are enabling new technologies for live video phone-cameras, such as face detection and recognition, as well as face tracking, which could enhance the user experience. As an example, U.S. Patent Publication No. 2005/0041840 (Lo) describes a camera phone with face recognition capability. While phone-cameras are easy to use, highly mobile, and have arguably become essential for modern life, the size and cost structure constraints limit their applicability for some uses.

Another realization of a device with these general videophone like capabilities is the "web-cam," where a computer, such as a lap-top unit, is equipped with a camera that often has pan, tilt, and zoom capabilities. Companies such as Creative Laboratories (Singapore) and Logitech (Switzerland) presently offer enhanced cameras as computer accessories for web-camera use. These web-cameras can have enhanced audio-capture capability, movement detection, face tracking, and other value-adding features. As an example, U.S. Patent Publication No. 2006/0075448 (McAlpine et al.), describes a system and method for mechanically panning, tilting, and/or zooming a webcam to track a user's face.

Apple Inc. (Cupertino, Calif., U.S.A.) has further extended the web-camera, with the "iSight" and "iChat" products, where the camera is integrated into a lap-top computer, and onboard image processing automatically adjusts the white balance, sharpness, color, focus and exposure and filters out noise to ensure that the transmitted picture provides bright, focused, and true-color imagery. The "iChat" function enables one-to-one chat, multi-way chat, or audio chat with up to ten people. While these video-camera-computer systems are enabling internet-based video-telephony, these technologies have not become ubiquitous like the cell phone has. Certainly, the differential increased cost and size are reasons for this. However, there are many issues related to the user experience with the web-camera that have not yet been adequately addressed. In particular, these systems are not fully optimized for easy use in dynamic environments, such as the home. To accomplish this, technology improvements around the user interface, image-capture, and privacy factors may be needed.

Notably, WebEx Communications (recently acquired by Cisco Systems) has adapted web-camera technology for the purpose of providing inexpensive web-based video-conferencing for conducting meetings, training sessions, webinars, for providing customer support, and for other business purposes. WebEx delivers applications over a private web-based global network purpose-built for real-time communications. However, the WebEx approach, while useful, does not anticipate the concerns and needs that people have when communicating by video on a personal basis.

As another alternative to the phone-camera or the webcam, a video-phone having a larger screen, a more functional camera with zoom and tracking capability, enhanced audio, and multi-user capability, could provide an enhanced user experience. Such enhanced video-phone devices could be used in the home, office, or school environments, where mobility can be compromised for improved capture and display capabilities. Most simply, such a system could combine a camera and a television, and use a phone or Internet connection to transfer information from one location to another. U.S. Patent Publication No. 2005/0146598 No. (AbbiEzzi et al.), describes a basic home teleconferencing system with this construction. This system indeed contains the basic image capture and display elements for a residential teleconferencing system. Like the web-cameras, the system can capture and display a large field of view, which improves on the contextual capture over the original Picturephone. However, again there are many aspects of residential video-telephony, relative to managing privacy and personal context in a dynamic residential environment that this system does not anticipate.

A system described in U.S. Pat. No. 6,275,258 (Chim) provides an enhanced teleconferencing system in which multiple microphones are used to enable enhanced subject tracking using audio signals. Chim '258 provides an audio-driven enhanced tracking process, which employs multiple microphones to localize and track an individual speaker in their local environment. An audio processor derives an audio tracking signal, which is used to drive a camera to follow the speaker. The field of view captured by the camera can be optimized, by both mechanical movement (pan, tilt, and zoom) and image cropping, to follow and frame a speaker or a sound emitting object in their environment. Thus, image framing in Chim '258 is keyed on including the speaker in the image, where the exemplary speaker is a single user is sitting at a desk, engaged in a teleconferencing activity. Chim '258 does not consider the broader problem of following and framing the activities of one or more users under circumstances where speech is an insufficient cue. In particular, Chim '258 does not provide scene transition analysis and shot framing analysis to switch between shots that are appropriate for video capture of one or more users engaged in informal and unscripted activities within a broad, largely unconstrained, environment. Thus, while Chim '258 suggests that his system might be used in a residential environment, in most respects, the system is really targeted for the corporate conference room or office environments, as the privacy, contextual interpretation, and video capture management aspects are underdeveloped and insufficient for residential use.

As another approach to video communications, enhanced video-telephony has been realized by video-conferencing equipment, which is largely targeted for the corporate market. As an example, companies such as Cisco Systems (San Jose, Calif., U.S.A.); Digital Video Enterprises (Irvine, Calif., U.S.A.); Destiny Conferencing (Dayton, Ohio, U.S.A.); and Teleris (London, United Kingdom), are offering enhanced video-teleconferencing equipment targeted for use by corporate executives. Exemplary teleconferencing prior art patents associated with some of the above companies include U.S. Pat. Nos. 5,572,248 and 6,160,573 (both by Allen et al.), and U.S. Pat. Nos. 6,243,130 and 6,710,797 (both by McNelley et al.). The product offerings of these companies emphasize image and sound fidelity, environmental aesthetics and ergonomics, life-size images, eye contact image capture and display, and the seamless and secure handling of large data streams through networks. For example, improved eye contact is typically achieved by hiding a camera behind a screen or beam splitter, through which it unobtrusively peers.

Although video-conferencing systems are designed to handle multiple participants from multiple locations, the systems are optimized for use in highly controlled environments, rather than the highly variable environments typical to personal residences or schools. In particular, these systems assume or provide standard conference rooms with a central table, or more elaborate rooms, with congress-like seating. As image capture occurs in structured environments with known participants behaving in relatively formalized ways, these conference systems are not enabled with capabilities that could be desired in the dynamic personal environments. These systems can also be equipped to extract the images of the local participants from their contextual backgrounds, so that when the image of that participant is seen remotely, the image appears contextually in the remote environment or in a stylized virtual environment. The cost of teleconferencing systems is often in excess of $100,000, which is not supportable by the residential market.

It is noted that some enhanced teleconferencing systems, which are adaptive to multi-person conversational dynamics, have been anticipated. In particular, a series of patents, including U.S. Pat. No. 6,894,714 (Gutta et al.), and U.S. Pat. Nos. 6,611,281 and 6,850,265 (both by Strubbe), which are all assigned to Philips Electronics (Eindhoven, Netherlands), suggest methods for teleconferencing under dynamic circumstances. As a first example, the Strubbe et al. '281 patent proposes a video-conferencing system having a video locator and an audio locator whose output is used to determine the presence of all participants. In operation, the system focuses on a person who is speaking and conveys a close-up (preferably life size) view of that person based on the video and audio locator outputs. Thereafter, if the person speaking continues to speak or becomes silent for a predetermined time period, the system operates to adjust the camera setting to display other participants in sequence who are not speaking, or it zooms out the camera by a specified amount to include all participants. The system is also configured to capture a new person entering or an existing participant exiting the video-conference session. The videoconference scenario of FIG. 2 of the Strubbe '281 patent, which depicts a conference room like setting with participants sitting around a table, does seem particularly suited to handling a formal or semi-formal corporate meeting event, where the various participants are of relatively equal status, and certain amount of decorum or etiquette can be expected. In such circumstances, the formalism of capturing and transmitting the non-speaking participants in sequence could be applicable and appropriate.

The Strubbe '265 and Gutta '714 patents basically expand upon the concepts of the Strubbe '281 patent, by providing adaptive means to make a videoconferencing event more natural. In the Strubbe '265 patent, the system applies a set of heuristic rules to the functionality provided by the camera, the audio locator, and the video locator. These heuristic rules attempt to determine whether the system should follow a current speaker or a switch to a new speaker. Various factors, such as time gaps between speakers, and 5-degree co-location thresholds are measured and assessed against confidence level estimations to determine whether the system should switch to another individual or switch to wide field of view image capture. The Gutta '714 patent extends the concepts of dynamic videoconferencing further, as it identifies a series of behavioral cues from the participants, and analyzes these cues to predict who the next likely speaker is, and then pro-actively makes a seamless transition in shifting the video-capture from a first speaker to a second speaker. These behavioral cues include acoustic cues (such as intonation patterns, pitch and loudness), visual cues (such as gaze, facial pose, body postures, hand gestures, and facial expressions), or combinations of the foregoing, which are typically associated with an event. As depicted in the respective FIG. 1 of each patent, these patents basically anticipate enhanced video-conferencing appropriate for the conference room or for congress-like seating arrangements, where there is little movement or change of the participants These patents also seem particularly suited to handling a formal or semi-formal corporate meeting event, where the various participants are of relatively equal status, and certain amount of decorum or etiquette can be expected. Although the Gutta '714 suggests broader applicability, and modestly anticipates (see Col. 11 table) a situation with a child present, the systems proposed in the Strubbe '281, Strubbe '265, and Gutta '714 patents are not targeted to the residential environment. For example, the proposed rules for predicting and redirecting image framing to the next speaker would be undesirable in video capture of chaotic informal activities, where people often interrupt each other. Likewise, these patents do not consider how to frame shots, identify shot or scene transitions, and execute the resulting shot changes for unscripted events likely involving many people. Thus, these patents are not sufficiently adaptive to residential dynamics, and the privacy and context management aspects are also underdeveloped.

Teleconferencing or enhanced video communications has also been explored for the office and laboratory environments, as well as the conference room environment, to aid collaboration between colleagues. The first such example, the "media space", which was developed in the 1980's at the Xerox Palo Alto Research Center, Palo Alto, Calif., U.S.A., provided office-to-office, always-on, real-time audio and video connections. As a related example, the "VideoWindow", described in "*The Video Window System in Informal Communications*", by Robert S. Fish, Robert E. Kraut, and Barbara L. Chalfonte, in the Proceedings of the 1990 ACM conference on Computer-Supported Cooperative Work, provided full duplex teleconferencing with a large screen, in an attempt to encourage informal collaborative communications among professional colleagues. Although such systems enabled informal communications as compared to the conference room setting, these systems were developed for work use, rather than personal use in the residential environment, and thus do not anticipate residential concerns.

Prototype home media spaces, for facilitating communications between a telecommuter and in-office colleagues have also been developed. For example, an always-on home media space is described in "*The Design of a Context-Aware Home Media Space for Balancing Privacy and Awareness*", by Carman Neustaedter and Saul Greenberg, in the Proceedings of the Fifth International Conference on Ubiquitous Computing (2003). The authors recognize that personal privacy concerns are much more problematic for home users than for office based media spaces. The described system reduces risks of privacy loss using a variety of methods, including secluded home office locations, people counting, physical controls and gesture recognition, and visual and audio feedback mechanisms. However, this system was not optimized for personal communications by the residents and does not necessarily provide adequate privacy controls for home users.

Thus, there is a remaining need and opportunity, which is not anticipated in the prior art, for a residentially targeted system that is generally useful for aiding family video-conferencing or video communications with one or more remote individuals. Such a system should function as seamlessly as is reasonably possible while being adaptable to the dynamic situations present in a residence. In particular, the system should enable the users to readily manage and maintain their privacy, relative at least to image capture, recording, and transmission. This system should also manage the contextual information of the user and their environments, to provide an effective communication experience.

Of course, the enjoyment users experience with such a system will greatly depend on the quality of the images, relative to how they are captured and presented. Consumer captured images, whether still or video, often have uneven image quality and artistic characteristics. This occurs because most consumers are untutored amateur photographers shooting images of unscripted live events. Although image quality characteristics can be improved by auto-focus, auto-flash and aperture control, red-eye reduction, and other technologies, artistic inadequacies are harder to address. In contrast, people attend movies for the entertainment and artistic value, largely based on the acting, plot, and genre. However, the artistic portrayal of the characters and scenes is very much affected by the cinematography. When cinematographers shoot movies, they typically use a series of guidelines concerning shot framing (scale and centering (such as the rule of thirds), shot perspective (camera angle and placement), shot transitions, and camera moves (pan, tilt, zoom, and dolly). Certainly, the comparison of consumer photography to cinematography is not entirely fair, as the latter benefits from large budgets, tightly scripted events, complete control of one or more cameras, and the opportunity to re-shoot the scenes for enhanced effect.

However, it may be possible to adapt aspects of cinematography to consumer use, in residential or other environments. Rather than teach consumer to be cinematographers, a better approach would be to adapt cinematographic sensibilities or guidelines into consumer devices. While this has not yet been attempted per se, there are various prior attempts at automated cinematography, videography, or camera selection that are worth considering. For example, prior art U.S. Pat. No. 5,457,370 (Edwards) provides a computerized motion control apparatus for controlling a plurality of degrees of freedom of the positioning and orientation of a camera within a film studio. The apparatus including a dolly, positional along an extensible track, and a camera provided with motors that provide variable control to pan, tilt, and roll. As another example, prior art U.S. Pat. No. 5,900,925 (Navarro) anticipates a hybrid approach, in which a studio camera can be computer driven or operated by a cameraman. In this case, the system responds to the measured or sensed position of a camera support such as a crane or dolly, and determines the desired camera pan, tilt, roll, focus, zoom, etc., based on predetermined correspondence between camera location and camera parameters. U.S. Patent Publication No. 2002/0130955 (Pelletier) anticipates the adaptation of automated cinematographic techniques to television production. In particular, Pelletier '955 anticipates the real-time operation of one or more cameras, relative to panning and zooming, to enable the average or occasional user to produce high quality pleasantly viewable images of a scene without needing expert knowledge. None of these prior art references either explicitly or implicitly anticipate the limitations, differences, or requirements for adapting cinematographic principles for use in residential video communications.

It is also recognized that a few attempts have been made to transfer cinematographic rules to unscripted live events outside the studio environment. As a first example, the paper "*Cinematographic Rules Applied to a Camera Network*", by P. Doubek et al., published at Omnivis2004, describes an algorithm based approach in which an imaging system acts as a combination of a director and a cameraman to drive image capture using multiple low-end networked cameras, with the goal of producing an attractive video stream. The system detects humans using background segmentation and skin area modeling to locate hands and heads. The system then determines a best available view or framing to show a person using visibility measures based on object size, object velocity of a tracked object, or the detection of skin. It then provides an appropriate view using images captured from one of the available cameras, or an interpolated view from a virtual camera, which is synthesized from images collected by the multiple cameras. To maximize the artistic and dramatic effect, this system selects a long shot when a subject is moving, moves to a medium shot or close-up for stationary subjects, and then attempts to provide a subjective shot (showing what the subject sees from the subjects point of view) by image interpolation when the subject stops moving. This system also tries to apply other cinematographic conventions, including the action axis rule when changing camera selection, and providing shot sequences that are progressive, regressive, or contrasting to enhance the artistic effect. Doubek et al. does provide a resistance factor, to prevent fast successions of viewpoint changes for the viewer. Accordingly, the shot or framing is changed only if an available new view is better than the current view, based on various visibility measures.

While the approach of Doubek et al. has merit, it seeks an artistic rendering and does not adequately anticipate provide video capture of real time unscripted human activities within a residential environment, potentially involving multiple individuals and limited camera options. Doubek et al. measures subject activity, using a velocity vector approach, which can be insufficient, as factors such as the frequency and distance of subject motion can also be important. Doubek et al. also does not consider other measures of subject activity, such as a reframing frequency, that can indicate a need for changing framing or shot selection. As a result, Doubek et al. does not really develop concepts and metrics to discriminate between changes in user activity consistent with the current scene or shot (and intra-scene transition) and changes in user activity that that are too large for the current shot (an inter-scene transition). Thus, Doubek et al. does not provide a method of shot selection, shot framing, and shot transition management for different amounts of relative subject motion. This is understandable as the cinematography rules applied by Doubek et al. do not provide for imaging moving subjects with any shots tighter than long shot. Thus, Doubek et al. does not anticipate that shot transition timing can depend on both the current shot selection and the amount of subject activity. Finally, Doubek also does not adequately provide for shot selection, framing, and transitions with multiple subjects.

U.S. Pat. No. 7,349,008 (Rui et al.) anticipates an automated camera management system using videography rules, that is targeted for use in recording presentations (such as lectures or classes). The application of the videography rules is based on the type (size) of the presentation rooms and the use of a multitude of cameras. The videography rules in Rui '008 cover placement of the multiple cameras, image capture of presenter behavior, image capture of generalized audience behavior and image capture of audience members questioning the presenter. Rui '008 also anticipates shot transition rules based on shot duration and presenter activity. The videography rules and system of Rui '008 are premised around the formalized setting of a presentation room, and are not conceived to address the issues pertinent to personal video communications, with the spontaneity and limitations of the residential environment. In particular, Rui '008 is not constrained by limited camera placement, does not anticipate shot selection of framing problems for framing one or more moving subjects, and does not develop adequate shot (or scene) transition rules and supporting activity or probability metrics.

U.S. Patent Publication No. 2006/0251384 (Vronay et al.) also explores adapting cinematographic sensibilities to video applications. Vronay et al. '384 describes an automated video editor (AVE) that is principally used in processing pre-recorded video streams that are collected by one or more cameras to produce video with more professional (and dramatic) visual impact. Accordingly, each of the video streams is analyzed using a scene identification module to partition each stream into a sequence of scenes, with this identification based significantly on the determination of whether an individual is speaking or not. A shot identification module then analyzes each scene to identify and rank candidate shots. Each scene is also analyzed by a scene-parsing module to identify objects, people, or other cues that can effect final shot selection. The best-shot selection module applies the shot parsing data, cinematic rules regarding shot selection and shot sequencing, to select the best shots for each portion of a scene. Finally, the AVE constructs a final video and each shot based on the best-shot selections determined fro each video stream.

Vronay et al. '384 also anticipates the AVE being used for various purposes, including for live unscripted events such as teleconferencing and birthday parties. In the case of multi-party live teleconferencing, an example is given where the AVE understands the structure of the communication event in advance, and it applies cinematic rules to deal with adding another remote participant (a third location), to determine speaker selection, and to arrange picture-in-picture or split screen viewing. However, in the case of unscripted events lacking predefined scene structures, such as birthday parties, Vronay et al. '384 anticipates that the users pre-record the video using one or more cameras, and then the users provide input relative to scene selection, person identification, shot selection, and final review during a subsequent video editing process using the AVE. Notably, Vronay et al. '384 does not extend the AVE technology to enhancing the live video capture of unscripted real time events when the video structure is unknown in advance and user behavior is uncertain. However, these are indeed the conditions that can occur during personal video communications as users multi-task in their environments, user events change, or the number and identities of the users change. Therefore, Vronay et al. '384 does not anticipate the scene transition and shot framing concepts, as well as the supporting metrics, that enable automated video capture of real time unscripted and unstructured events.

As another example, somewhat similar to Vronay et al. '384, the paper describes a system in which cameras record video of "unexpected moments in people's lives", and the video is post-processed using cinematographic principles to create movies that appear as if they were created as real expertly captured film footage. To accomplish this, Kim et al., *Cinematized Reality: Cinematographic 3D Video System for Daily Life Using Multiple Outer/Inner Cameras*, IEEE Computer Vision and Pattern Recognition Workshop, 2006, populates a living space with a multitude of cameras, including multiple ceiling mounted cameras and an omni-directional camera. Each camera then captures video of the ensuing events, with synchronizing time code data. The video from each camera is the analyzed by an algorithm using cinematographic guidelines regarding shot selection, shot perspective, zooming, panning, indecisive cuts, and the action axis to classify the available shots, as well as potential shots synthesized for a virtual camera. The virtual camera shots are rendered using video from the omni-directional camera and the ceiling mounted cameras in combination as appropriate. Users (the director) then select the preferred shots to compose a movie progressing from scene to scene using video from a real or synthesized virtual camera. While the method of Kim et al. enables cinematization of real time video of unscripted events, the use of multiple liberally distributed cameras and post-processing mean this technique is inappropriate for real time video communications.

There are also various examples of cinematography application to virtual worlds (for animation, gaming, metaverses such as Second Life, etc.), including the principles outlined in the paper "*Cinematographic User Models for Automated Realtime Camera Control in Dynamic 3D Environments*", by William H. Bares and James C. Lester, which was published in the Proceedings of the Sixth International Conference on User Modeling (1997). This paper describes a cinematographic user-modeling framework that provides user-sensitive real time camera control in of animations in dynamic 3D environments. Planning camera shots and camera positions in virtual environments, while preserving continuity, requires solving precisely the same set of problems that are faced by cinematographers. Users can provide input by selecting the viewpoint style (informational or dramatic), the camera pacing (slow or fast), and the transition style (gradual or jump). The cinema algorithm of Bares and Lester the applies these user preferences to a user model that enables virtual cameras to track objects by executing cuts, pans, and zooms (pull-ins and pull-outs), and to make on-the-fly decisions about camera viewing angles, distances, and elevations, while statistically holding to the user preferences. Similarly, U.S. Pat. No. 6,040,841 (Cohen et al.), describes a hierarchical approach for applying cinematographic rules in real-time animation to create virtual scene cinematography using virtual cameras and virtual actors. While the methods of Bares and Lester and Cohen '841 adapt cinematography to real-time action, their optimization for virtual worlds means these approaches are not bound by the constraints appropriate to real-time video communications of spontaneous unscripted events with limited cameras in residential environments.

In summary, there is then an opportunity and need to provide a method for automating video capture, including image framing, for applications such as personal video communications, in which video images of real time unscripted events are captured by a constrained set of cameras. Current video communications systems, and other automated videography systems do not satisfy this need either individually or in combination.

SUMMARY OF THE INVENTION

Briefly, according to one aspect of the present invention A method for framing subjects captured on video includes receiving video of a subject and determining a current shot framing of the subject. A magnitude and a direction of movement of the subject is determined, relative to the current framing and a level of motion threshold. The subject movement is analyzed relative to the determined magnitude, direction of subject movement, and the current framing, to determine that the subject is properly framed by the current shot framing or whether modifications of the current shot framing are required to capture the moving subject, or to determine a new shot selection and new shot framing. The camera reframes the subject if the subject is determined not to be properly framed, in accordance with the determined modifications of the current shot framing, the new shot selection and new shot framing. Video images are provided to a remote viewer.

BRIEF DESCRIPTION OF THE DRAWINGS

FIGS. 5A, 5B, and 5C depict flow diagrams describing aspects of various methods;

FIG. 8A illustrates a reference image;

FIG. 8B illustrates the general concept of a facial region of interest (ROI);

FIGS. 11A and 11B illustrate the probability of staying in a current shot, and possibly making intra-scene transitions in capture settings, versus the probability of encountering an inter-scene transition to a new shot capture settings. FIG. 11A graphically illustrates probabilities for a medium wide shot, while FIG. 11B illustrates probabilities for a medium shot. The graphs depict probabilities versus increasing user activity;

FIG. 12A illustrates an autonomous camera, and aspects of its operation; and

FIG. 12B illustrates a multi-lens camera having multiple image capture modules.

DETAILED DESCRIPTION OF THE INVENTION

The quality of video teleconferencing or video telephony is loosely described today by the term "telepresence", which has been defined as the experience or impression of being present at a location remote from one's own immediate environment. This term has been particularly applied to business teleconferencing, relative to enabling teams who cannot be together, work together. The video-conferencing systems that provide eye-contact life size images of the remote participants, with the remote background extracted, such that the remote participants appear as if they are in the local environment, are perhaps an idealized implementation of a telepresence system. However, in some sense, the telepresence concept is a misnomer, as the various controls and tools, including camera zoom, can create an artificial experience, which is in some respects equivalent to "better than being there".

While the telepresence concept may be useful for residential video-telephony, it is not necessarily an optimal approach for residential use. Thus in particular, the systems, devices, and methods described for the present invention can be used to address the need for improved systems for residential video communications from one or more local participants to one or more remote participants. The present invention describes an automated videography system 300 suitable for video communications and other applications. The key functional attributes of various embodiments of the video communication system described herein can include any of the following but are not limited thereto:

- It can have an image display device, which can be sized for portability.
- It can have one or more image capture devices that acquire video images, and which enable both wide field of view (WFOV) and narrow field of view (NFOV) image capture.
- It can have an audio subsystem having both an audio emission device and an audio capture device.
- It can have a privacy interface for managing the privacy of the local scene, including the individuals therein.
- It can have a contextual interface for managing the image capture of the local scene and the individuals therein, principally via automated video capture.
- It can be enabled by individual identification (keyed, face recognition, audio recognition, for example).

Figure 1:
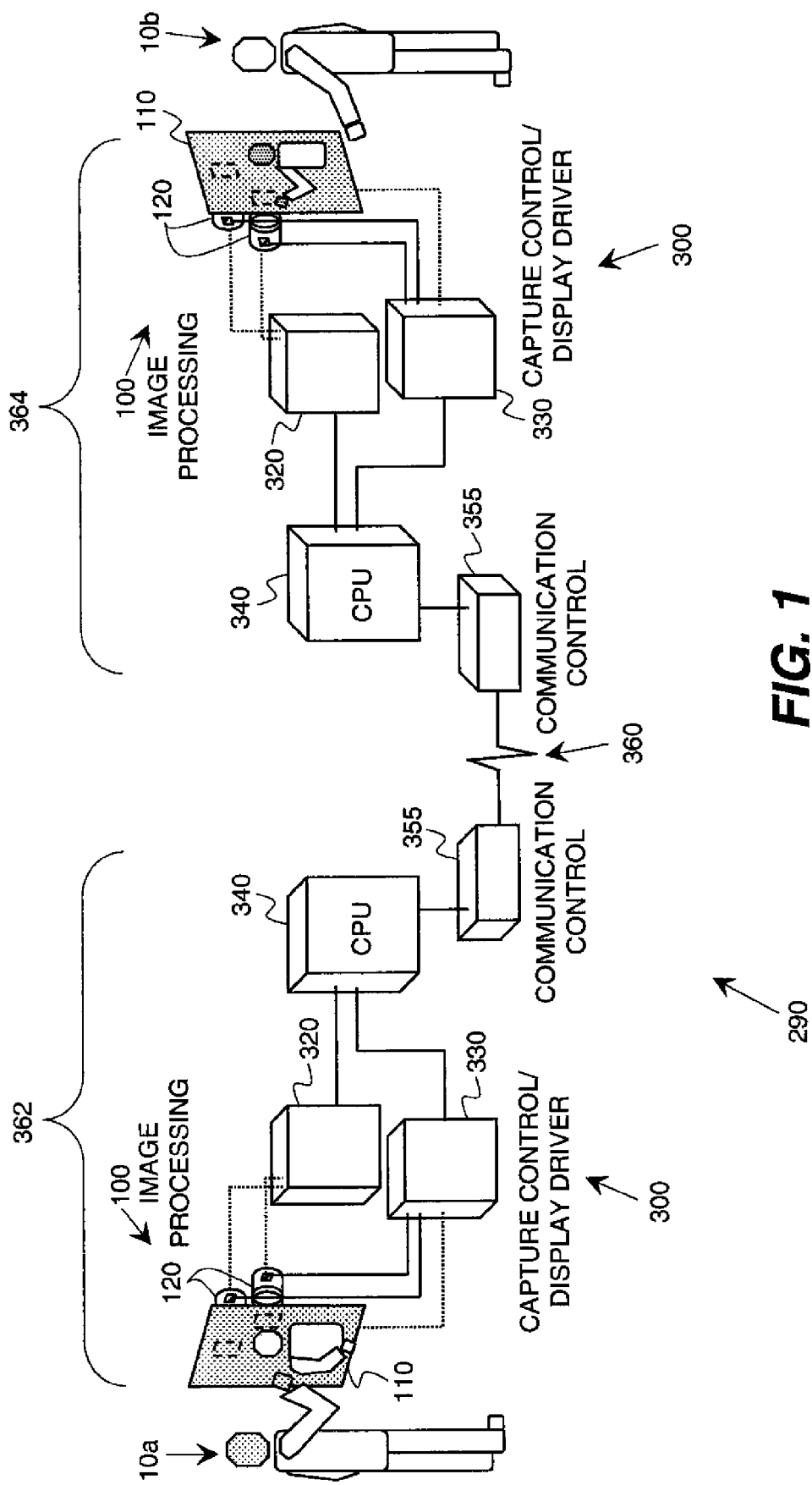
FIG. 1 is an overall system figure depicting a local system linked to a remote system over a network.

The block diagram of FIG. 1 shows one embodiment of such a networked video communications system 290 having a video communication device 300 located at a local site and a video communication device 300 at a remote site. In the illustrated embodiment, video communication devices 300 have an electronic imaging device 100, including a display 110 and an image capture device 120 for communication between a viewer 10a at a first site 362 and a viewer 10b at a second site 364. Each video communication device 300 manages the capture, processing, transmission or receipt of video images across a communicative network 360, subject to handshake protocols, privacy protocols, and bandwidth constraints. The network 360, which can be supported by remote servers (not shown), connects two sites 362 and 364, each of which has an automated videography system 300. Each viewer 10a, 10b has an electronic imaging device 100 comprising a display 110 with one or more image capture devices 120. A computer (or control logic processor (CPU)) 340 coordinates control of an image processor 320 and a system controller 330 that provides display driver and image capture control functions. System controller 330 can be integrated into computer 340, or not, as desired. Computer 340 is nominally located locally, at a video communication device 300 located at a given site, such as exemplary local site 362, but some portions of its functions can be located remotely at a remote server within the networked video communications system 290 (at the service provider) or at a video communication device 300 at a remote site 364. System controller 330 can provide commands to an image capture device 120, controlling the camera view angle, focus, or other characteristics. A communications controller 355 acts as interface to a communication channel, such as a wireless or wired network channel, for transferring image and other data from one site to the other.

The networked video communication system 290 is intended to advantageously support video conferencing or video-telephony, particularly from one residential location to another. During a video communication event 600, comprising one or more video scenes 620, a system typically transmits both local video signals and local audio signals to the remote site and receives remote video and remote audio signals from the remote site. As would be expected, a local viewer 10a at a first site 362 is able to see a remote viewer 10b (located at a second site 364) as an image displayed locally on display 110, thereby enhancing human interaction. Image processor 320 can provide a number of functions to facilitate two-way communication, including improving the quality of image capture at the first site 362, improving the quality of images displayed at the local display 110, and handling the data for remote communication (by improving the image quality, data compression, encryption, etc.). It must be noted that FIG. 1 shows a general arrangement of components that serve an embodiment. Image capture devices 120 and display 110 can be assembled into a single frame or housing (not shown) as part of the integration for video communication device 300. This device housing can also include other components for video communication device 300 at site 362 or 364, such as image processor 320, communications controller 355, computer 340, and system controller 330.

As is also shown in FIG. 1, video communication device 300 also comprises an audio capture device 322 and an audio emission device (speaker 125) that are connected to an audio system processor 325, which, in turn is connected to computer 340. In the embodiment illustrated, audio system processor 325 comprises at least one microphone 144 such as omni-directional or directional microphone or other devices that can perform the function of converting sonic energy into a form that can be converted by audio system processor 325 into signals that can be used by computer 340. It can also include any other audio communications and other support components known to those skilled in the audio communications arts. Audio emission device 125 can comprise a speaker or any form of device known that is capable of generating sonic energy in response to signals generated by audio processor and can also include any other audio communications and other support components known to those skilled in the audio communications arts. Audio system processor 325 can be adapted to receive signals from computer 340 and to convert these signals, if necessary, into signals that can cause audio emission device 125 to generate sound. It will be appreciated that any or all of microphone 144, audio emission device 125, audio system processor 325 or computer 340 can be used alone or in combination to provide enhancements of captured audio signals or emitted audio signals, including amplification, filtering, modulation or any other known enhancements.

Figure 2:
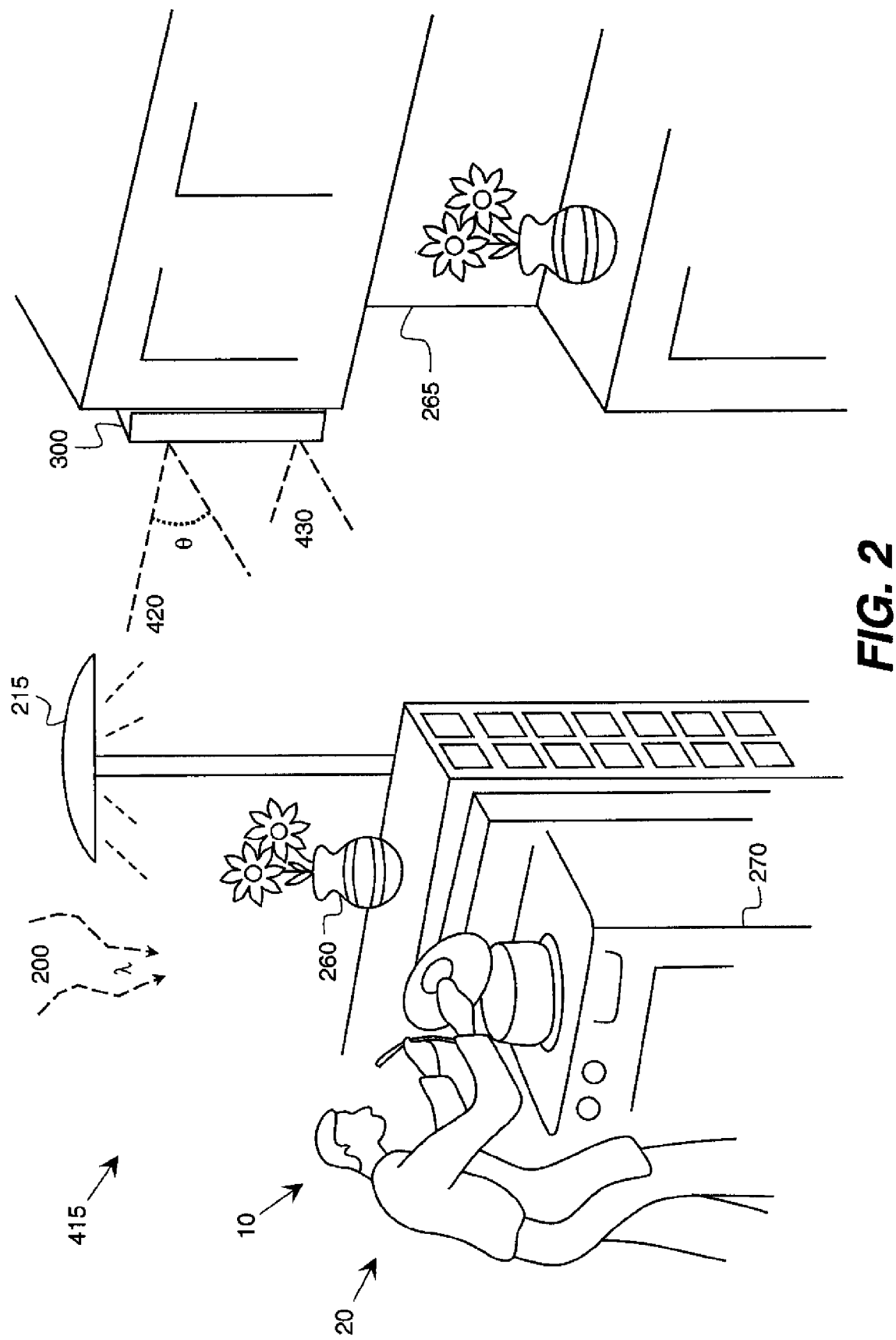
FIG. 2 depicts the general concept of the video communication system of the embodiment of FIG. 1 being operated in the context of a local environment.

FIG. 2 depicts a user (subject) 10 operating an interactive video communications device 300 within their local environment 415 or scene, which is at a local site 362. In this illustration, user 10 is shown in a kitchen, illuminated by ambient light 200, is cooking at a stove (home appliance 270), while also interacting with the video communications device 300, which is mounted on a home structure 265 (a nearby kitchen cabinet). The video communication device 300 utilizes image capture devices 120 and microphones 144 (neither is shown in this figure) to acquire data from an image field of view 420 from an angular width (full angle θ) and an audio field of view 430, which are shown by dashed lines as generally directed at a user 10.

Figure 3A:
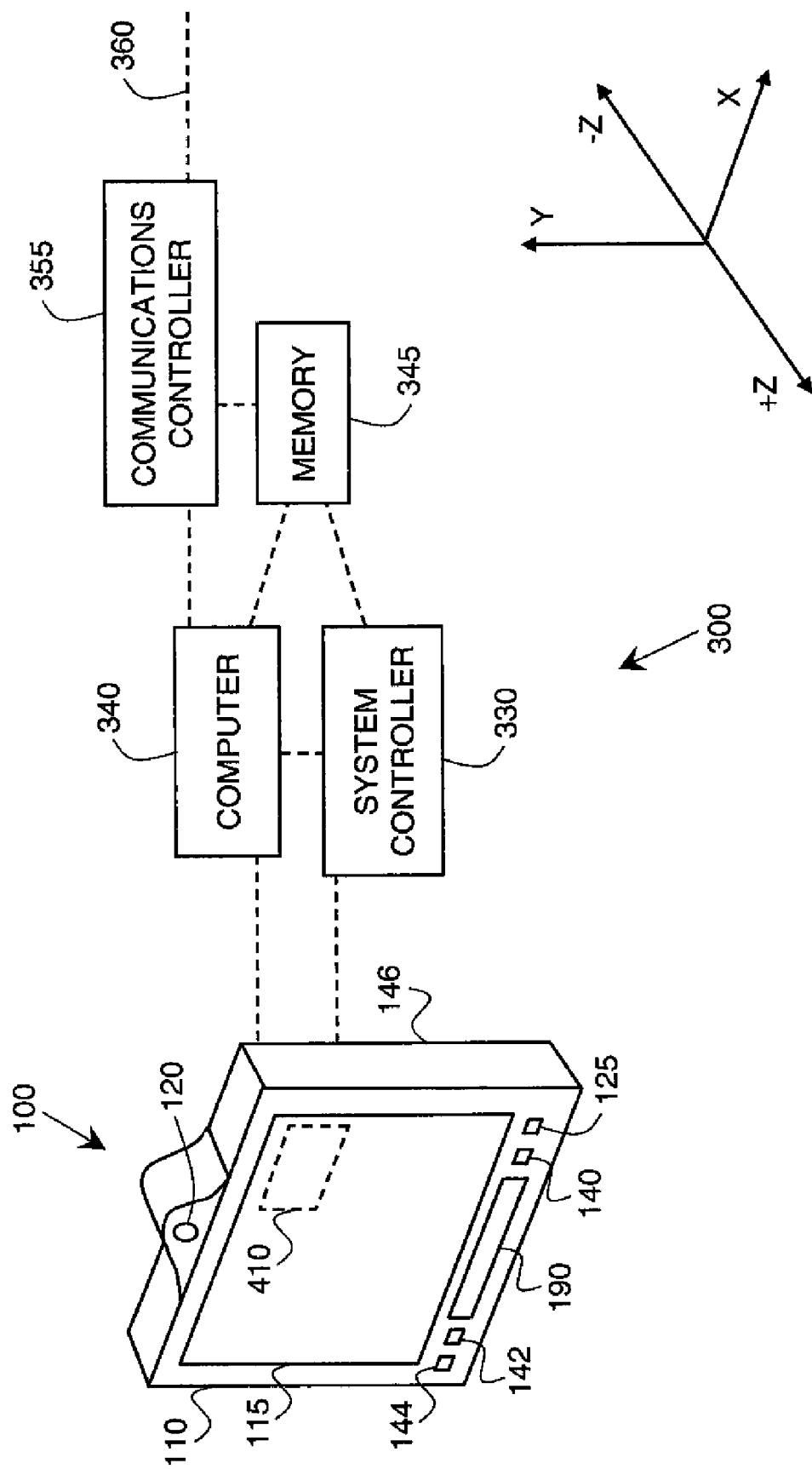
FIG. 3A provides a detailed illustration of the operational features of the video communication system.
Figure 3B:
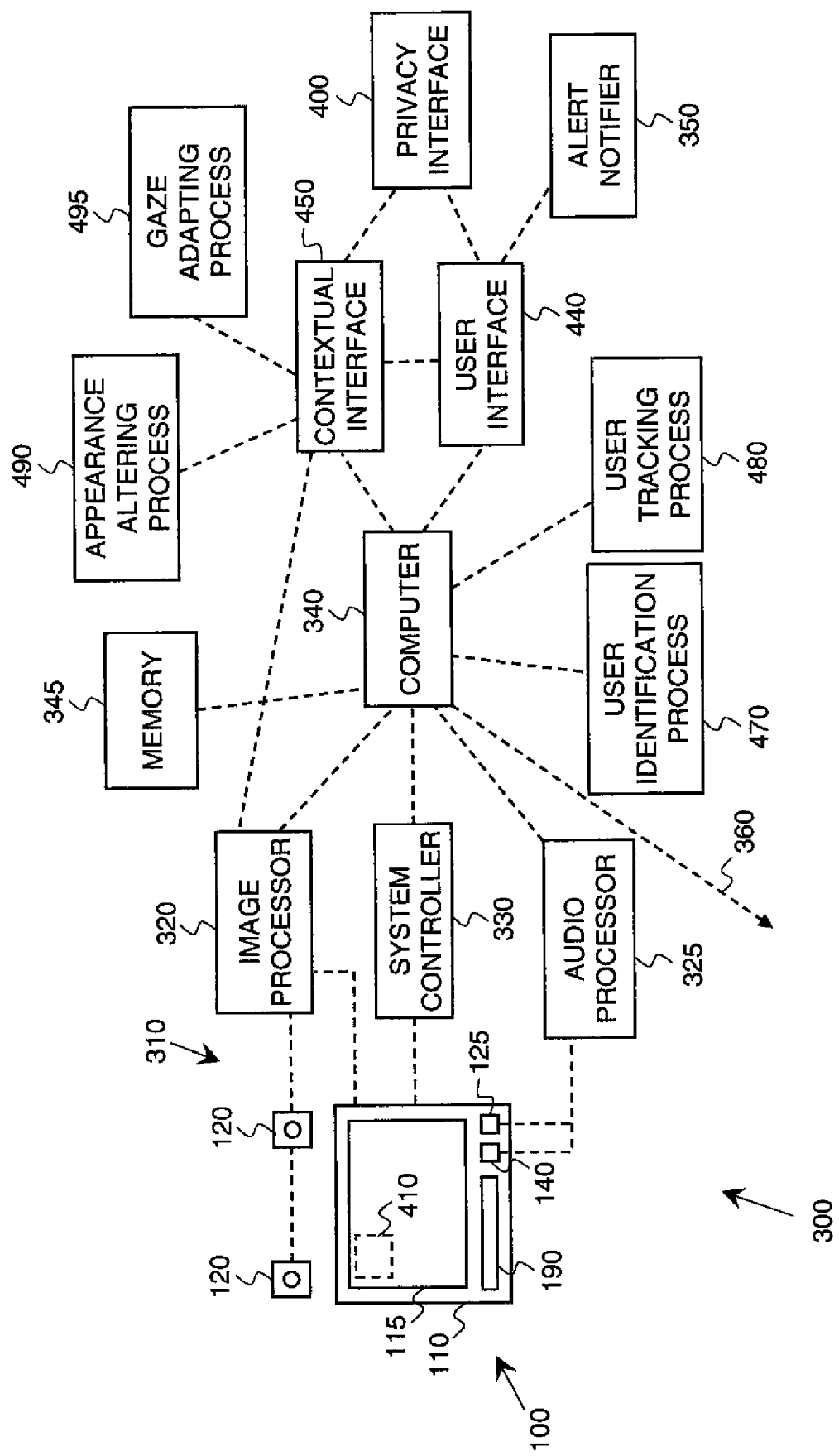
FIG. 3B depicts the operational features of one embodiment of the video communication system in greater detail.

FIGS. 3A and 3B then illustrate the architecture for one embodiment of a video communication device 300 having an electronic imaging device 100. FIG. 3A, in particular, expands upon the construction of the electronic imaging device 100, which is shown as including an image capture device 120 and an image display device (display 110), having a display screen 115. The computer 340, system controller 330, data storage 345, and communications controller 355 can be assembled within a housing 146, or located separately, and be connected wirelessly or via wires to an electronic imaging device 100. The electronic imaging device 100 also includes at least one microphone 144 and at least one speaker (audio emitter) 125. The display 110 has picture-in-picture display ability, such that a split screen (or partial screen) image 410 can be displayed on a portion of the screen 115. Each image capture device 120 is nominally an electronic or digital camera, using an imaging lens 122 and an image sensor 124 (both shown in FIG. 4A), the latter likely being a CCD or CMOS type array device, having a resolution of 2-15 megapixels. The image display device (display 110) may be a liquid crystal display (LCD) device, an organic light emitting diode (OLED) device, a CRT, a projected display, a light guiding display, or other type of electronic display appropriate for this task. The size of the display screen 115 is not necessarily constrained, and can at least vary from a laptop sized screen or smaller, up to a large family room display. Multiple, networked display screens 115 or video communication devices 300 can also be used within a residence (local environment 415). The electronic imaging device 100 can also include a motion detector 142 and an ambient light detector 140, as separate devices that can be integrated within the housing 146 of the electronic imaging device 100. It is also possible that the ambient light (λ) sensing functions can be supported directly by an image capture device 120, without having a separate dedicated sensor (ambient light detector 140). Likewise, an image capture device 120 and a microphone 144 may support the motion detection functions, without having a separated dedicated sensor (motion detector 142). FIG. 3A also illustrates that the electronic imaging device 100 can have interface controls 190 integrated into the housing 146. These user interface controls 190 can use buttons, dials, touch screens, wireless controls, or a combination thereof, or other interface components.

By comparison, FIG. 3B particularly expands upon the design of the system electronics portion of the video communications device 300. One subsystem therein is the image capture system 310, which includes image capture devices 120 and image processor 320. Another subsystem is the audio system, which includes microphones 144, speakers 125, and an audio system processor 325. The computer 340 is operatively linked to the image capture system 310, image processor 320, the audio system and audio system processor 325, and the system controller 330, as is shown by the dashed lines. While the dashed lines indicate a variety of other important interconnects (wired or wireless) within the video communications system 300, the illustration of interconnects is merely representative, and numerous interconnects that are not shown will be needed to support various power leads, internal signals, and data paths. The computer 340 also is linked to a user tracking process 480, which can be an algorithm operated within the computer 340, using motion detection data acquired from a motion detector 142. Likewise, the computer 340 can access a user identification process 470, which again can be an algorithm operated within the computer 340. Similarly, the computer can access a gaze adaptive process 495, which can include both a gaze correction process and a gaze tracking process (or algorithms). The memory or data storage 345 can be one or more devices, including a computer hard drive or a flash drive, and can contain a frame buffer to hold a number of video frames, to support ongoing video image data analysis and adjustment. The computer 340 also accesses or is linked to a user interface 440. This user interface 440 includes interface controls 190, which can take many physical forms, including a keyboard, joystick, a mouse, a touch screen, push buttons, or a graphical user interface. Screen 115 can also be a functional element in the operation of the interface controls 190. The user interface 440 can also include a privacy interface 400 and a contextual interface 450, and may further include an appearance-altering interface 490.

Contextual interface 450 includes an intelligent agent or artificial intelligence (AI) or set of algorithms that adaptively responds or anticipates user activities, and modifies the video capture process to improve the video experience. Contextual interface 450 can also be a learning system, that progressively gains understanding of user activities and communication needs. Basically, as the users 10 operate the automated videography system 300, the intelligent agent can learn user preferences, and then subsequently operate the system automatically using that information. The user interface 440 can also include a cue-based interface, which can be a portion of the contextual interface 450. The cue-based interface essentially observes cues, including speech commands, voice cues (intonation, pitch, etc.), gestures, body pose, and other interpretive cues, and then derives or determines responsive actions for the video communication system 300. These interfaces combine database, analysis, and control functions, which are enabled by the computer 340, the memory 345, the display 110, the image capture devices 120, the interface controls 190, and various other system components.

Most simply and obviously, the user interface 440 can include interface controls 190 such as a system on/off switch, an audio output volume control, a display brightness control, and other common user controls typical to televisions and computer monitors. As the video communication device 300 can also provide television-viewing functionality, the interface controls 190 can include a remote control or other means for selecting channels, or controlling television recording or the display of video content from record-able media, such as a DVD. The interface controls 190 can also include control functions to support standard telephony, such as "dialing", caller ID, and contact number lists. Additionally, these interface controls 190 can provide or enable control of an image capture device 120, relative to panning, tilting, zooming (PTZ), and other camera type functions. In particular, the interface controls 190 can also include automated functionality, for example, using a user identification process 470 and a user tracking process 480 to direct image acquisition by one or more image capture devices 120, such that the video communications device 300 provides a seamless and graceful experience for the users 10.

Figure 4A:
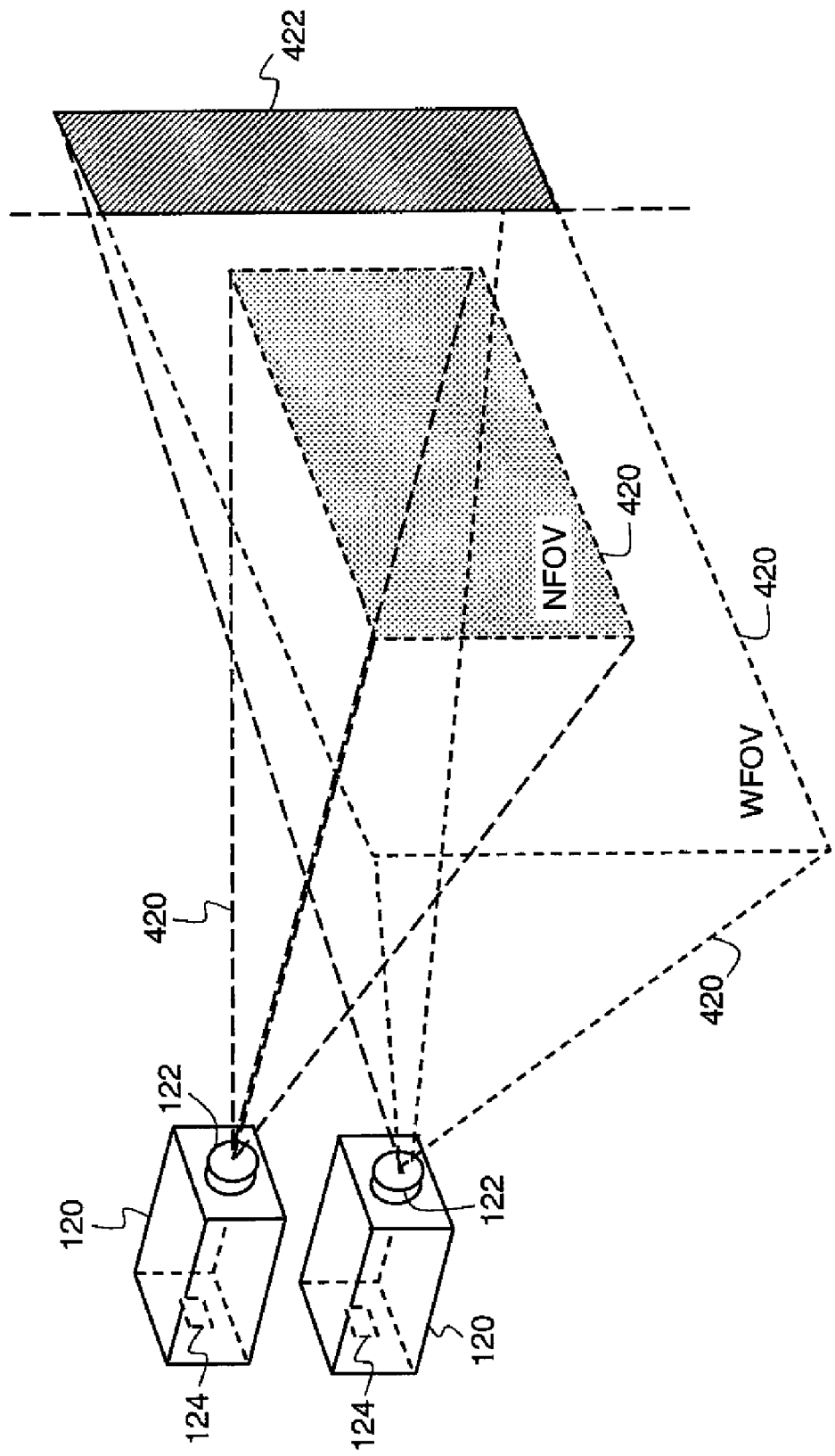
FIGS. 4A and 4B illustrate both narrow and wide image capture fields of view that can be captured by an arrangement of cameras.

Although video communication device 300 is depicted in FIG. 3A with a single image capture device 120, FIGS. 1 and 3B illustrate that the video communication device 300 can utilize two image capture devices 120 for capturing video images, in accordance with defined video capture settings. Indeed, it is particularly useful for the video communication device 300 to utilize at least two image capture devices 120, and particularly a wide field of view (WFOV) camera and narrow field of view (NFOV) camera. For example, wide-angle camera lenses (122) generally cover an angular width (θ) that spans between 60° and 120° full field, while a (fixed focus) telephoto lens generally spans a field of view with a full angle (θ) between 5-20 degrees. Although the image capture devices can be integrated via a beamsplitter, such that they share a common optical axis, and perhaps common lenses, in the direction towards object space, it is more likely that separate image capture devices 120 with separate imaging lenses 122 will be used. This is shown in greater detail in FIG. 4A, where one image capture device 120 captures imagery from a narrow image field of view 420 (NFOV 420), while the second image capture device 120 captures imagery from a wide image field of view 420 (WFOV 420). In FIG. 4A, the upper image capture device 120 is depicted as capturing a NFOV 420 which is centered within the WFOV 420 captured by the second image capture device 120. However, the NFOV camera can have automatic pan, tilt, and zoom (PTZ) adjustment capabilities, such that its NFOV 420 can be changed in size and location, in response to signals from either a local or remote video communication device 300. Zoom is controlled by mechanisms internal to the lens assembly, while pan and tilt can be controlled by mechanisms (not shown) that orient the camera body. For example, the PTZ controls can be directed to follow activity within a local environment 415, such as suggested in FIG. 4B, where the subjects 10 (children) may have moved from the table to the floor. While the narrow field of view information can be extracted in image processing from the images captured by a WFOV camera, the image quality is likely to be better by having a separate dedicated NFOV camera.

Figure 4B:
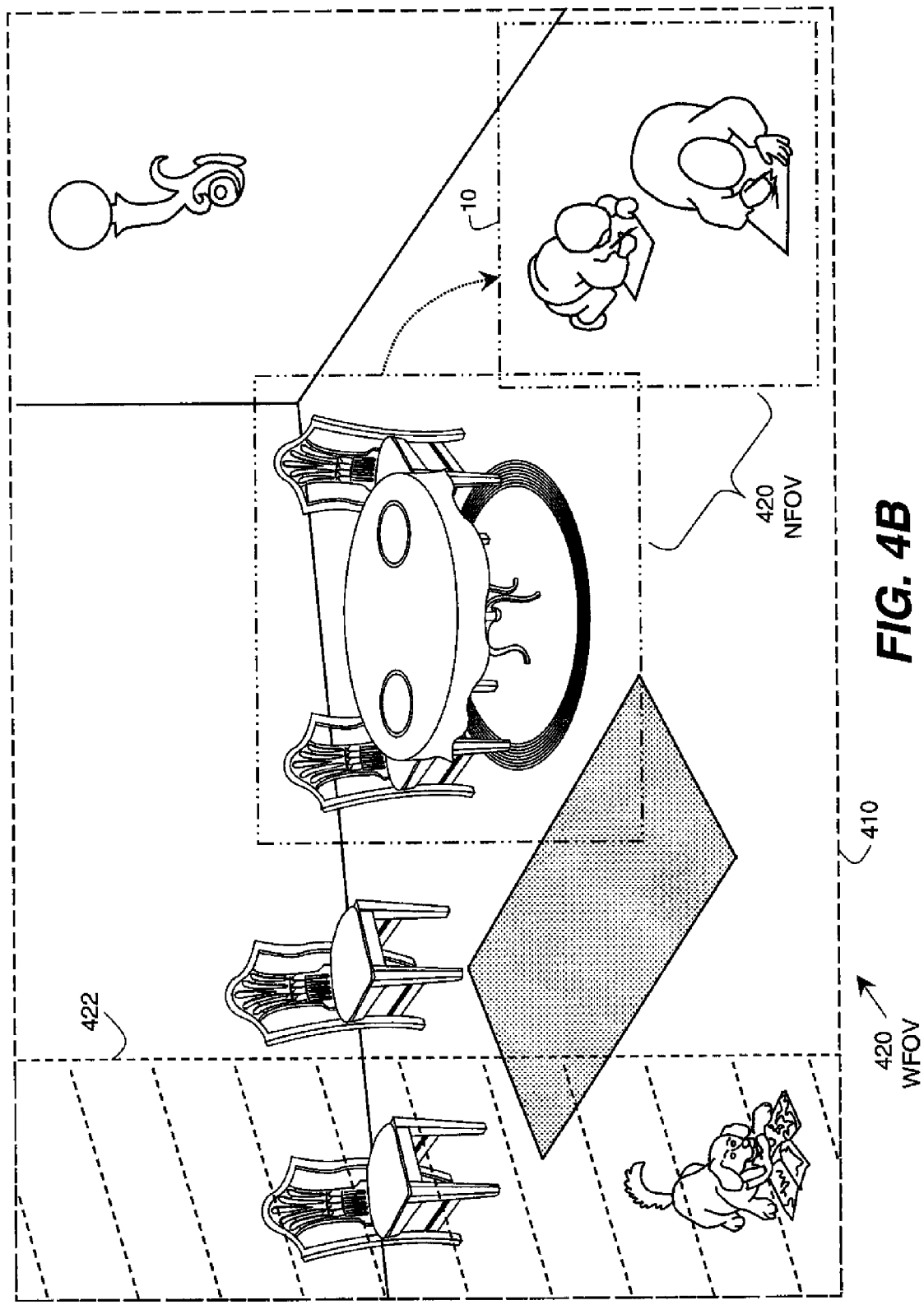

Additionally, multiple NFOV cameras can be used in the image capture device 120 to provide multiple NFOV's across the WFOV. It can be expected that the captured NFOV 420 will generally fall within the captured WFOV 420, as depicted in FIGS. 4A and 4B. However, as multiple NFOV cameras can be used, and as the residential experience can be quite dynamic, that may not always be the case. Thus, while a NFOV camera and a WFOV camera may be simultaneously used in a local environment 415, their fields of view 420 may be only partially overlapping, or entirely separate and non-overlapping.

Figure 3C:
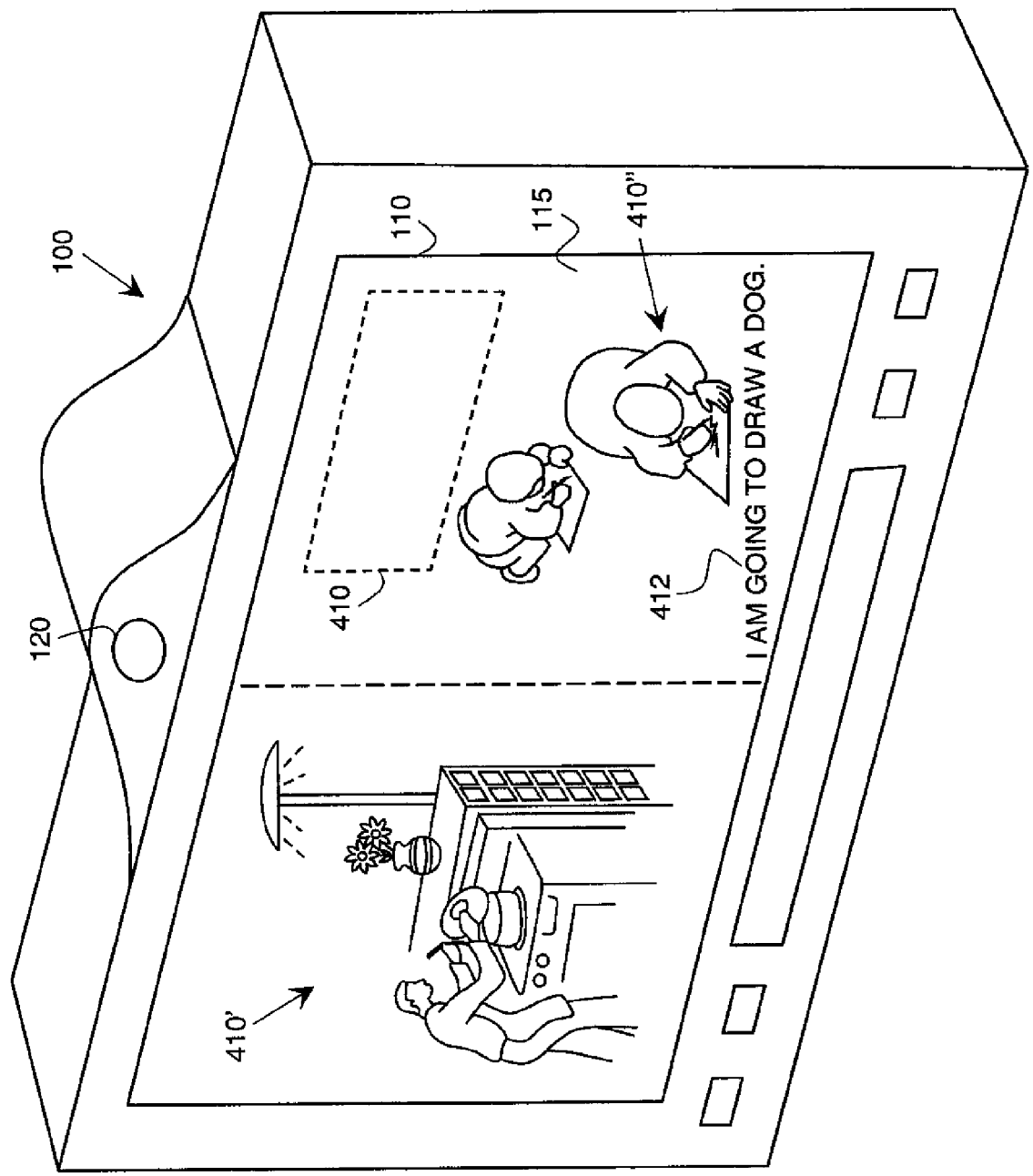
FIG. 3C depicts an electronic imaging device, which is a portion of the video communication system presenting split screen images of two remote scenes.

As shown in FIGS. 3A and 3B, display screen 115 preferentially includes a split screen image 410. Nominally, the greater portion of the display screen 115 will display an incoming image of a remote viewer (from remote site 364), while smaller picture-in-picture or split screen image 410 would display the outgoing video image from the local site 362. As shown in FIG. 3C, display screen 115 can also present split screen video images 410' and 410" of multiple activities occurring in the remote site 364, while still providing a split screen video image 410 of the local environment. Depending on the set-up, the secondary split screen image 410" may depict (peripheral) activities occurring in the same room as the primary activities, or even activities occurring in another room. It is noted that multiple displays can be used instead of split screen or picture-in-picture displays. In order to help a viewer follow the two parallel activities of split screen images 410' and 410", a voice translation algorithms can be used to generate subtitles 412, so that multiple voice streams are not heard simultaneously.

Other valuable functionality of the video communications device 300 resides in the user interface 440, and particularly in the privacy interface 400 and the contextual interface 450, both of which are sub-portions of the user interface 440. The more sophisticated aspects of the user interface 440, relating to privacy and context can best be understood with respect to potential user behavior and the dynamics of residential (and family) living. While the mere presence of a video communications device 300 in a residence may suggest that the resident users would have certain expectations and tolerance relative to using the device, in reality, the users 10 will likely want a range of user controls to identify and limit contextually restricted content. The privacy controls need to be flexible and adaptable, as privacy expectations can vary from event to event, and are subject to individual, familial, generational, societal, cultural, and religious variations. Thus, the privacy interface 400 enables users to determine privacy settings and controls with varying levels of sophistication.

In particular, the following issues regarding user control and privacy can be anticipated as being of interest in particular situations:

The local users may want direct control and knowledge of outgoing images and audio.
The local users may want the video communication device 300 to respond automatically so as to protect privacy.
The local users may want control and knowledge of new parties being added to a video-communications event.
The local users may want knowledge of the remote users changing the locally captured field of view.
The local users may want to alter the appearance or context of the images of objects within the capture field of view.
The local users may want to know if other participants are recording images.
The local users may want physical devices, such as camera covers, as privacy controls.

The privacy interface 400 enables users to control the capture, display, and recording of outgoing or incoming video image content for personal video communications for their residence. In a general sense, the video communication device 300, via control over privacy and contextual image transmission, enables etiquette for modern personal video communications.

Local user privacy can be provided by various means, including the use of physical light blocking shutters (not shown) supplied with cameras 120 that are readily visible to the local users 10 to indicate that image capture has been enabled or is disabled. A variety of indicators (alert notifiers 350), such as an emitted audio tone or visual cue (such as a flashing light) can be used to alert users 10 of video capture and transmission. Some users may want to use an audio first option that prevents video capture when a communication event 600 commences. The video communication devices 300 at the first and second sites 362 and 364 can utilize a privacy language protocol to communicate privacy settings across the intervening communicative network 360. For example, both a user 10a at a site 362 and a user 10b at a site 364 would have to authorize visual communications before the respective video communication devices 300 individually or both switch to video transmission (that is, an "electronic handshake"). The video data streams between sites 362 and 364 can be transmitted over the intervening network 360 in an encrypted form. The privacy language protocol can then supply electronic keys to enable decryption at the corresponding remote site. Privacy settings can also be provided by the privacy interface 400 to enables local users to authorize whether their video communication device 300 will enable either local or remote video recording of the captured video from their local environment site 362. In support of this, the privacy language protocol can be used to communicate recording authorization status between video communication devices 300 at a local site 362 and a remote site 364.

As another privacy control, the picture-in-picture or split screen image 410 shown in FIG. 3A can display the outgoing video image captured at the local site 362. Thus, the local users 10 can have a direct visual presentation of the images being captured and/or transmitted (to a remote site 364) by their video communication device 300. This feature also gives the local users 10 the opportunity to verify that the transmitted image has the privacy level that is desired, so that adjustments can be made as required.

In particular, the video communication device 300 can enable the users 10 to change the capture conditions, and particularly the image capture field of view 420. For any variety of reasons, including to control privacy or merely limit distractions, a local user 10 may want to limit the image field of view 420. Certainly, this may be accomplished simply by closing a door or turning off some locally positioned room lighting. However, the local image capture can also be limited using the privacy settings to predefine a field of view that that image capture devices 120 can capture. For example, it can be defined that only a NFOV image capture or image transmission is allowed. In particular, the pan tilt and zoom controls for a NFOV image capture device 120 can also be restricted, thereby limiting the expanded field of view and motion tracking capabilities of video communication device 300 for a communication event. Alternately, the imaged WFOV can be constrained, as users 10 may define image areas 422 for exclusion. As shown in FIG. 4A, an image capture device 120 (the WFOV camera) has a portion of its image field of view 420, indicated by image area 422, modified, for example, by cropping image area 422 out of the captured image before image transmission across network 360 to a remote site 364. Restrictions to image areas 422 can also apply to NFOV cameras 120. Alternately, an image area 422 can be modified or obscured with other visual effects, such as distorting, blurring (lowering resolution), or shading (reducing brightness or contrast). For example, the shading can be applied as a gradient, to simulate a natural illumination fall-off.

It is expected that a user 10 may pre-determine privacy settings, based partially on human perception and emotional sensitivity to image features or content, during a preview mode prior to a video communication event, although users 10 may want to modify the captured image area during the course of an ongoing event. Reference images 460 of a local environment 415 (see FIG. 8A), captured without people or any privacy sensitive objects, can also be useful for substitution or image editing. For example, an object 260 (such as the vase in FIG. 2) that is present in current time can be visually removed using a pre-existing reference image 460. Preview mode setting may be done with images displayed on the larger display screen 115, or on the split screen image 410. The split screen image 410 on display 110 can also display the resulting privacy limited and modified image, or larger areas images of the local environment that also depict the image areas effected by active privacy settings.

It is also noted that reference images 460 (FIG. 8A) can be used to geometrically register or calibrate the images captured of the local environment 415 by the multiple cameras 120. For a variety of reasons, including limits to the FOV 420 and pan and tilt motions, privacy limited image areas 422, and reframing shots 428 during scene transitions 635, it is valuable to have known sizing and spatial relationships between the cameras 120, which can be determined or verified at the beginning of a communication event 600.

Figure 4C:
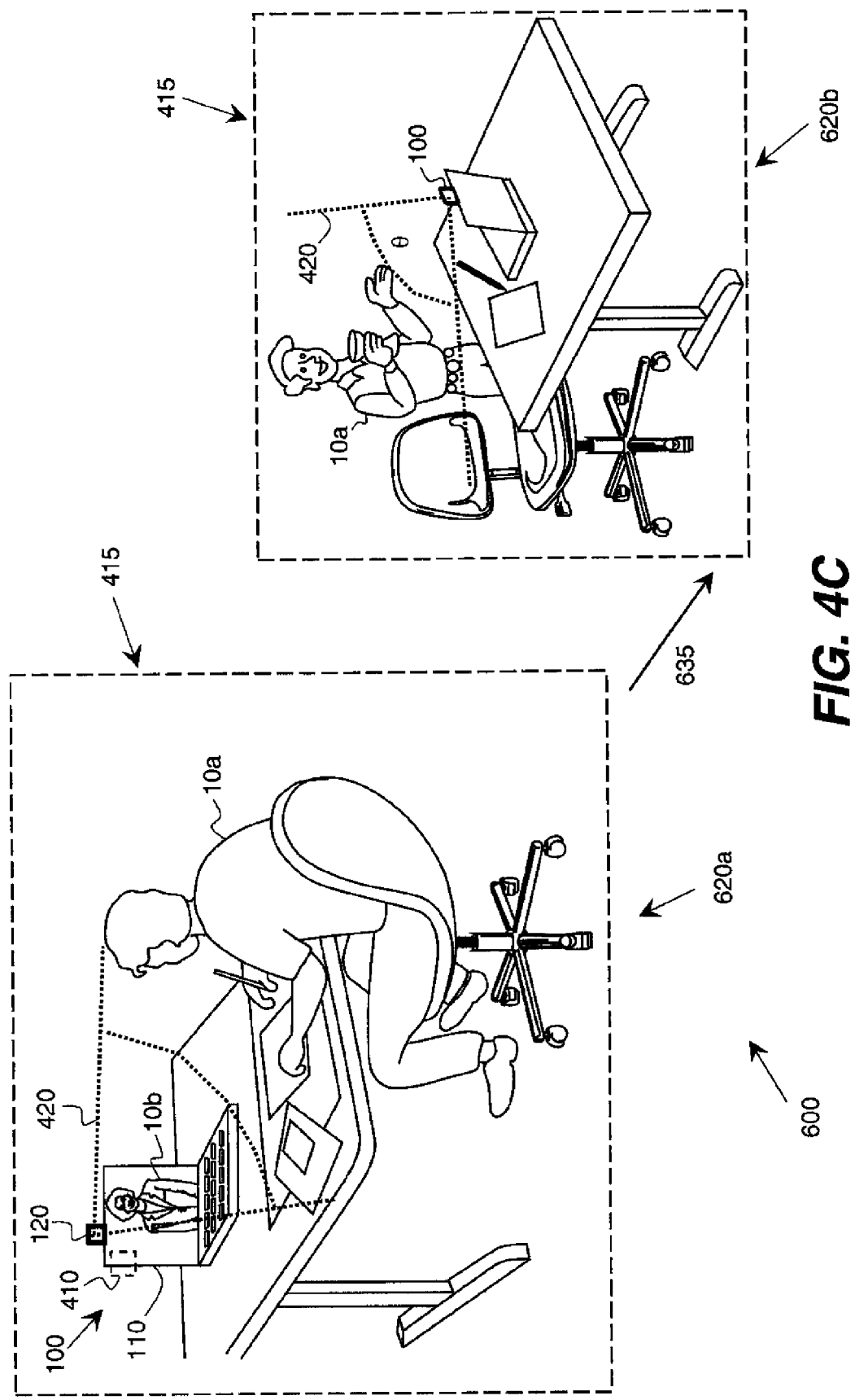
FIG. 4C illustrates an example of the capture field of view changing with a transition during a communication event.

As stated previously, a communication event can be quite dynamic. As an example, FIG. 4C depicts a video communication event 600 occurring in a local environment 415 involving a local individual (user 10a). In a first video scene or video interaction 620, a user 10a is sitting at a table, looking at a display 110 where an image of a remote user 10b is displayed. If, for example, users 10a and 10b are engaged in a purposeful conversation regarding serious concerns, then the image field of view 420 may be relatively narrow. As the communication event continues, the participating users (10a and 10b) may relax, and transition into a more spontaneous event, where a wider image field of view 420 may be more appropriate. Such a scenario is depicted in FIG. 4C, where user 10a goes from a sitting position in a first video scene 620a to a more relaxed behavior in a second video scene 620b. As these changes occur, the video capture settings or privacy settings could change. For example, a local user 10 could use interface controls 190 to manually direct image capture of the local environment by a camera 120. Local user 10 may also choose to change privacy settings during the course of the event.

However, users may also value automatic camera control, provided that their privacy is maintained by the established privacy settings. Automatic camera control can provide many significant benefits, as the local users 10 can communicate "hands-free", and multi-task or readily interact with each other, while still communicating with the remote viewer(s). Additionally, automated camera control and image processing can provide visually enhanced viewing experiences for the remote viewer (user 10b), as compared to manually controlled cameras. To accomplish these goals, the contextual interface 450 of video communication device 300 must successfully manage the automated image capture and image processing for presentation through transitions in scene content or human activity.

Automated videography, including camera control, image framing and other image processing, can be provided in various ways, as outlined in Table 1, which defines a set of video capture modes that can be supported by the contextual interface 450. Certainly there can be manual modes which allow either local users 10 or remote viewers to control video capture, either by controlling camera operation (for pan, tilt, and zoom) or by controlling image cropping to simulate or complement camera control. There can also be preview modes, which for example, enable users 10 to verify that the captured portion of their local environment 415 matches expectations. Using a preview mode, users can then adjust camera settings and privacy settings, limit shot selection, adjust lighting, move objects or clean-up their environment, enhance personal grooming, or otherwise modify the video capture and viewing experience. The video communication device 300 can also provide various default conditions, such as pre-established default privacy settings, that users 10 can readily select as appropriate for a given communication event. For example, in many instances, users 10 may prefer to use a default mode, such as audio only or NFOV camera at the beginning of a communication event. Likewise users may also select a default mode, such as WFOV camera only or NFOV camera only for use in all or part of a communication event. For example, image capture restricted to NFOV only, whether customized for a particular communication event, or selected as a default mode, may be used when users want tightly restrict video capture for privacy reasons or to reduce distractions during a purposeful conversation.

However, to provide both a hands-free operation for the local users 10 and an enhanced viewing experience for the remote viewer(s), automatic capture operation that adjusts both camera settings and image processing can be valuable. Automatic capture can be guided by various contextual cues, either individually, or in combination, including user identity, user gestures, voice or audio cues, user activities or event classifications, and the number of users. Automatic capture modes can be defined, in which different contextual cues have greater priority. Exemplary partially bounded or constrained automatic capture modes include user lock and follow and user hierarchical (based on user classification or identity). In the case of a lock and follow capture mode, a user may direct the video communication device 300 to lock onto and track a local user 10a around within the local environment 415. To accomplish this, the video communication device 300 can tag a given user and then apply the user tracking process 480 to follow them within the local environment as bounded by the image field of view 420. The tags can be based on tracking current features of an individual (including facial features, clothing, or voice characteristics) without knowledge of user identity. The tags can also be based on contextual characteristics ("follow the clown") or user classifications (such as "lead or primary" user, adult user, first child, or second child). The tags can be based on knowledge of user identity or relationships, so that the image capture follows a given person ("follow Mike", "follow grandfather"). Potentially lock and follow tagging can also be keyed on objects, pets, or other features.

Likewise, a hierarchical capture mode can be supported by knowledge of current individual features, user classifications, or user identities. However, in a hierarchical mode, the video communication device 300 would direct image capture and image processing to feature various users. For example, a multitude (for example, six) of users can be located in a room, with two users tagged, as the primary and secondary users respectively. While the primary user is in the room, the video communication device 300 can direct image capture and processing to frame the captured images with emphasis on the primary user. This can mean that the primary user is always shown, or is always shown centered within the image frame, and that other local individuals are not always shown. In the eventuality that the tagged primary user leaves the image field of view 420, the hierarchical approach would then direct image capture and processing to the tagged secondary user, until such time as the primary user returns.

Automated video capture can also be premised on a using a set of event classifications. A user 10 could provide input, such as "birthday party" or "purposeful event", that defines an event, essentially cueing the contextual interface 450 to look for indicators of this type of event, and to look for specific behaviors or activities (such as blowing out candles) to direct image capture towards. Alternately, the contextual interface 450 can automatically adapt to such events, by using scene analysis algorithms that recognize different types of events or activities using a set of event type classifications as cues to define a video communication context and an appropriate video capture mode. For example, the contextual interface 450 can recognize types of events, such as that a party is occurring and direct the video communication device 300 accordingly. This event or activity recognition function can be based on a classification dataset for event type that includes quantitative descriptors of various activities, including the number of people involved, gestures used, time patterns, and object or voice recognition. The contextual interface 450 can direct the video communication device 300 to stay with a wide image field of view 420 for image capture regardless of the identity of the individuals, or the activities the individuals are engaged in, or the localization of the activities. The contextual interface 450 can also recognize the type of event (such as a family dinner, party, a card game, small group spontaneous, purposeful, or portable) and type of location based on recognizable objects that would typically be associated with different types of events, and apply a set of event capture guidelines appropriate for that type of event. These guidelines can account for factors such as field of view, audio processing, lighting expectations, privacy factors, gaze correction, or tracking. The contextual interface can also monitor for changes in activities within an event (such as family dinner shifting to clean-up and then to the playing of a board game), and then manage the transitions through these changes using interim settings as necessary relative to the video capture and display, audio capture, and other factors.

More broadly, the automatic video capture can be driven by a set of behavioral or contextual cues, which may or may not be associated with user identity, user activity, or event classifications, including cues such as user gestures (such as waving or pointing), voice or audio cues (such as clapping or crying) or audio commands, and behaviors or activities (such as jumping, or cooking). As an example, user gestures such as pointing can be used as explicit commands to direct image capture, or as implicit cues to interpretively direct image capture.

As just discussed, automatic video image capture can be defined with video capture modes (see Table 1) that are based on a video context of semantic cues and operational responses, such as 1) user classification, 2) user identity, 3) user lock and follow, 4) event type classifications, or 5) behavioral or contextual cues. As another type of video context, the video capture modes for automatic capture can respond to cues based on measures of the location and duration of activity. Basically, determined cues or quantitative metrics for the range, magnitude, and rate of user activities, can be defined and analyzed without having to identify the activities themselves. Other activity cues or metrics, related to the system responsivity or the video viewing experience (such as zoom rate or refraining frequency) also can affect activity metric based automated video capture. These metrics of users or system activity can be used to guide automated video capture within scenes (intra-scene) or during transitions to new scenes (inter-scene). The use of such metrics to support automated videography based on a video context of location and duration of activity can be better understood using the illustrations of FIGS. 4C and 4D.

TABLE 1

Video Capture Modes

Video capture modes define a range of settings that describe various operational capture attributes, including: the operation of WFOV cameras, the operation of NFOV cameras, the operation of pan, tilt, and zoom functions, the application of privacy settings, audio settings and processing, uses of video processing, and response (timing, magnitude) to intra-scene and inter-scene transitions.
Manual mode
Preview mode
Default modes—such as WFOV capture only, NFOV capture only, audio only, or initial capture
Defined automatic capture modes—such as user lock & follow or hierarchical (using user classification or identity), or based on event classifications
Behavioral or contextual cue based automatic capture—based on cues such as voice or audio cues, eye gaze, personal relationships, event classifications, gestures, or explicit behaviors
Activity metric based automatic capture—based on metrics of user and system activity, such as range, magnitude, and rate of user activities, number of faces; PTZ frequency, etc . . .
Intermediate or semi-automatic modes—a hybrid of manual and automatic modes or multiple automatic modes
Portable mode (including an outdoors mode)

As a first example, FIG. 4C depicts a video communication event 600 occurring in a local environment 415 involving a local individual (user 10*a*). In a first video scene or video interaction (620*a*), a user 10*a* is sitting at a table, looking at a display 110 where an image of a remote user 10*b* is displayed. If, for example, users 10*a* and 10*b* are engaged in a purposeful conversation regarding serious concerns, then the imaged field of view 420 capturing user 10*a* may be relatively narrow.

As the communication event continues, the participating users (10*a* and 10*b*) may relax, and transition into a more spontaneous event, where a wider image field of view 420 may be more appropriate. Such a scenario is depicted in FIG. 4C, where user 10*a* transitions from a sitting position in a first video scene 620*a* to a more relaxed behavior in a second video scene 620*b*. Associated activity metrics related to the user (range and magnitude of motion or subject movement factor) and image capture (PTZ frequency, framing size) were in initial ranges during the initial video scene 620*a* and in different ranges for the subsequent video scene 620*b*. Using such metrics of user and system activity, the contextual interface 450 of video communication device 300 can measure activity and transition 635 to an appropriate captured video to the remote viewer 10*b*, changing from a NFOV in the initial scene 620*a* to a wider FOV for the second video scene 620*b*, and perhaps providing other fields of view during the transitional activities (not shown) between these video scenes 620*a* and 620*b*.

The term "video scene" is generally defined as the video imagery that is captured of the users 10, their local environment 415 and the objects 260 therein, and the activities the users 10 are engaged in. A shot 428 is then defined by the framing (shot selection, shot centering or orientation) by which the camera(s) 120 capture images of a video scene 620. Thus, a shot 428 represent a choice of size and direction (or framing) of the field of view 420 captured by a camera 120. A transition in user activity can cause a scene transition 635, whether intra-scene (small) or inter-scene (large), for which transitions in capture conditions, including camera selection, shot selection and framing (shot transitions 635), audio capture conditions and audio system operation, lighting, privacy settings, and other capture conditions, can occur. Considering again FIG. 4C, the video scenes 620*a* and 620*b* were captured by one or more cameras 120 to provide a narrow shot 428 and a wider shot 428, respectively. During the inter-scene transition 635, a new shot selection and framing were defined by the automated videography system 300 to use for video scene 620*b*. Interim shot selections may have been used to capture the implied activities that occurred between the two scenes depicted in FIG. 4C.

Figure 4D:
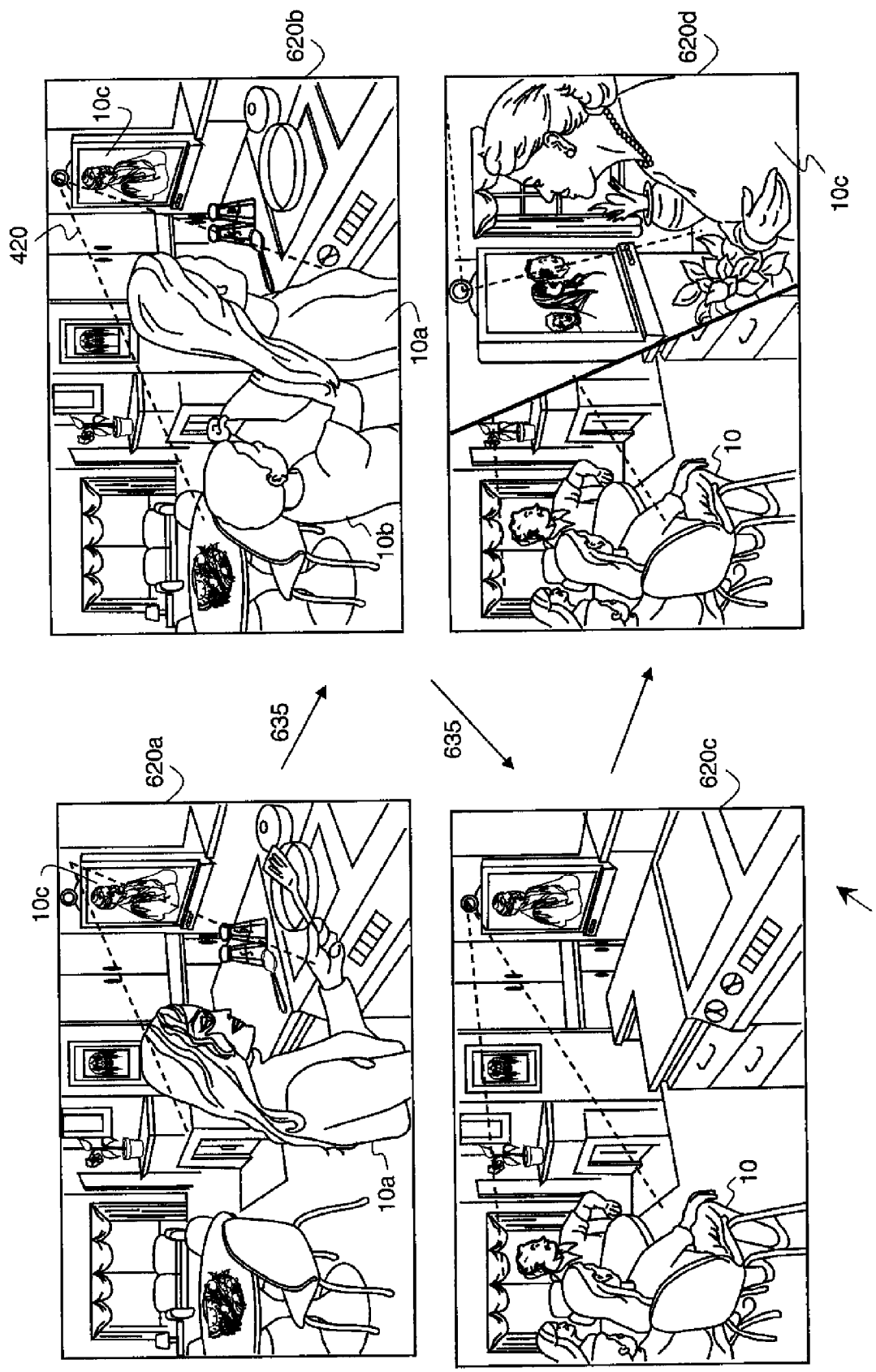
FIG. 4D illustrates an embodiment of the system in operational use during a sequence of several video scenes or shots.

A second example is shown in FIG. 4D, in which is a single local user 10*a* is visible in the first video scene 620*a*, two users in the second video scene 620*b*, and a group of local users 10 are seats at a table in the third video scene 620*c*. Between these scenes, interim or transitional events occurred, including the arrival of the boy (user 10*b*) between video scenes 620*a* and 620*b*, and the arrival of additional family members, and subsequent positioning around the table (between video scenes 620*b* and 620*c*). During the first video scene 620*a*, image capture could have settled into a relatively tight shot (such as a medium shot) while imaging the user 10*a* cooking. As the boy arrived, image capture could have expanded to frame with a wide shot to show his arrival, and then tightened to frame a medium wide shot for video scene 620*b*, as the mother (user 10*a*) is standing next to the boy (user 10*b*), who is showing his paperwork to the remote viewer (user 10*c*). For video scene 620*d*, with the group of people at the table, the image could be framed using a wide shot to encompass the area of activity. If the shot 428 was captured with a camera 120 capable of pan and tilt, the angular direction of the camera 120 may have been adjusted to compensate for the position of users 10 in the room. As the shot selections or framing are varied, the outgoing video image can be composed of: the NFOV 420, the WFOV 420, portions of the NFOV 420, portions of the WFOV 420 or composite image combinations thereof, as selected by the contextual interface 450 and as limited by the privacy interface 400. While some shot transitions 635 may happen suddenly (for example the arrival of the boy (user 10*b*) may have occurred with little warning, gradual shot transitions can be less jarring for the viewer (user 10*c*). Depending on the camera 120 used (NFOV or WFOV), the image framing can be achieved with PTZ settings or image cropping. However, even when a NFOV is being provided to a remote viewer, use of a WFOV camera 120 and microphones to monitor the surrounding environment 415 is useful relative to anticipating a change in the presence of individuals in the local environment 415 (such as the boy coming into video scene 620*b* of FIG. 4D). As an example, the contextual interface 450 can utilize scene analysis algorithms to determine whether an additional individual is passing through the periphery of the local environment 415 or is actually entering the central or primary portion of the local environment 415. These algorithms can also use data, from both current and prior video frames, regarding the location and duration of the peripheral activities, based on image areas, time thresholds, and motion tracking data.

Nominally, users 10 can select or default to an automatic capture mode at the beginning of a communication event 600, when they are selecting privacy settings for the event. FIG. 5A generally illustrates the overall operational processes that video communication devices 300 step through when in use during a video communication event 600. As FIG. 5A shows, a typical communication event 600 begins with a process of invitation 605 and acceptance 610, during which a local video communication device 300 and a remote video communication device 300 establish connections across a communicative network 360 (see FIG. 1). From a systems point of view, this connection process includes the use of a network protocol to locate, identify, and contact a desired address using an "electronic handshake" 365 between the two interacting devices. This electronic handshake process (365) can also utilize a privacy language protocol, which translates privacy settings across the network 360, as an exchange of authorization status regarding video transmission (rather than just audio), encryption and decryption, recording, and other privacy related features. Relative to the users 10, during invitation 605 and acceptance 610, the user interface 440 provides means to direct and receive calls, including such possible features as contact lists, caller ID, and incoming call or connection alerts. Users 10 can also be expected to determine any initial privacy or contextual settings they intend to use during this process of invitation 605 and acceptance 610, using the user interface 440, including the privacy interface 400 and contextual interface 450 as appropriate. This can involve the use of a preview mode, during which image and audio capture and privacy settings may be modified. Invitation 605 and acceptance 610 typically then leads to the initiation of video transmission 615, directly, or after a delay, depending on whether the users were employing initial audio mute or video blanking features.

Video transmission is initiated with a first video interaction or video scene 620, using one or more image capture devices 120 in each local environment 415, according to the respective initial video contexts. An initial video context (such as an event classification) or an associated video capture mode (for video and audio capture and processing settings) may be user supplied, or video communication device 300 supplied (in the latter case, likely using default settings). The initial video scene 620 for the local and remote users 10*a* and 10*b* proceeds naturally from their respective local environments 415. While a communication event 600 may end (end transmission step 617) without any consequential transitions between first and second (or subsequent) video scenes 620, transition testing 630 is likely occurring on an ongoing basis, particularly if the video communication device 300 is operating in an automatic video capture mode.

The concept of user activity transitions and video capture transitions has been discussed previously, with various examples of both changes in user activities and in video capture settings, as for example, associated with event classifications. A particularly useful nomenclature for this invention is to define intra-scene transitions and inter-scene transitions 635. FIG. 4D depicts examples of transitions 635 in content and context than can occur during a communication event 600. As the user 10*a* changed her position or activities with the first video scene 620*a*, small changes in video image capture (equivalent to intra-scene transitions) and processing relative to focus, contrast, image brightness, image color properties, eye gaze, field of view, or other factors may have been required. If the woman (user 10*a* was initially framed with a wide or medium wide shot), the scene transition 635 that captured the arrival of the boy (user 10*b*) into second video scene 620*b* may have been captured by small capture setting changes consistent with an intra-scene transition. In general, intra-scene transitions describe small changes in video capture settings that can be completed without involving a change in the video context or shot framing for a communication event or video scene, and are associated with small changes in user activities. Expressed another way, intra-scene transitions 635 relate to small changes in user activities (below a level of motion threshold) that are consistent with the framing of the present shot 428 or video scene 620. The concept of a "small change" is context or framing size dependent, as a small change for a purposeful event (FIG. 4C, video scene 620*a*) or a tight (medium) shot, compared to a larger area event (FIG. 4D, video scene 620*c*) or a wide shot, can be quite different. In many instances, intra-scene transitions correspond to changes within portions of the local environment 415 (or field of view) relating to scene composition or audio that reduce the communicative impact or quality of the video communication, unless corrected. However, small intra-scene changes in the video capture (such as panning a camera to include a second (new) local individual can also provide significant benefit to a remote viewer beyond just compensating for image or audio quality losses.

By comparison, an inter-scene transition 635 relates to changes in the nature or expanse of the communication event, or the user activities therein (for example, relative to a level-of-motion threshold) such that a change from one defined video context or shot framing to a subsequent video context or shot framing is required. For example, as the users 10*a* and 10*b* of FIG. 4D progressed from the second video scene 620*ba* to the third video scene 620*c*, a scene transition 635 in video context and a shot transition 635 in video capture settings (including selection of shots 428) likely occurred. In video scene 620*b*, a tight shot that enabled good eye contact, such as a medium wide shot, may have been provided to the remote viewer (user 10*c*). In the next video scene 620*c*, a wide or long shot, showing the users from the knees up as well more of the local environment 415 could be more appropriate. Thus, the progression in FIG. 4D from second video scene 620*b* to third video scene 620*c* can represent an inter-scene transition 635 (a change between successive scenes or shots) for which the changes in a communication event 600 are assessed to be sufficiently significant (relative to the video capture settings and image framing) to be identified as representing an ongoing transition in user content and activity.

In general, the transition test 630 monitors the ongoing video stream, as well as video and audio from outside a current transmitted field of view 420, to assess whether an inter-scene transition from a current video scene 620*a* to a subsequent video scene 620*b* is occurring. The transition test 630 assesses video imagery for the current video scene, relative to earlier data, using metrics for activity or motion (velocity or rate, area or field of view, position, direction, PTZ frequency) and associated thresholds, the probability of correct framing (or confidence values), or contextual cues, or the defined video context (or deviations there-from), to identify a potential video scene transition. When the transition test 630 identifies large changes consistent with an inter-scene transition, then a transition process 640 is initiated to interpret and respond to the transition and change the operation of video communication device 300 appropriately. On the other hand, if the changes within a scene are of lesser significance, appropriate intra-scene responses can be provided by scene capture management 650.

Figure 5B:
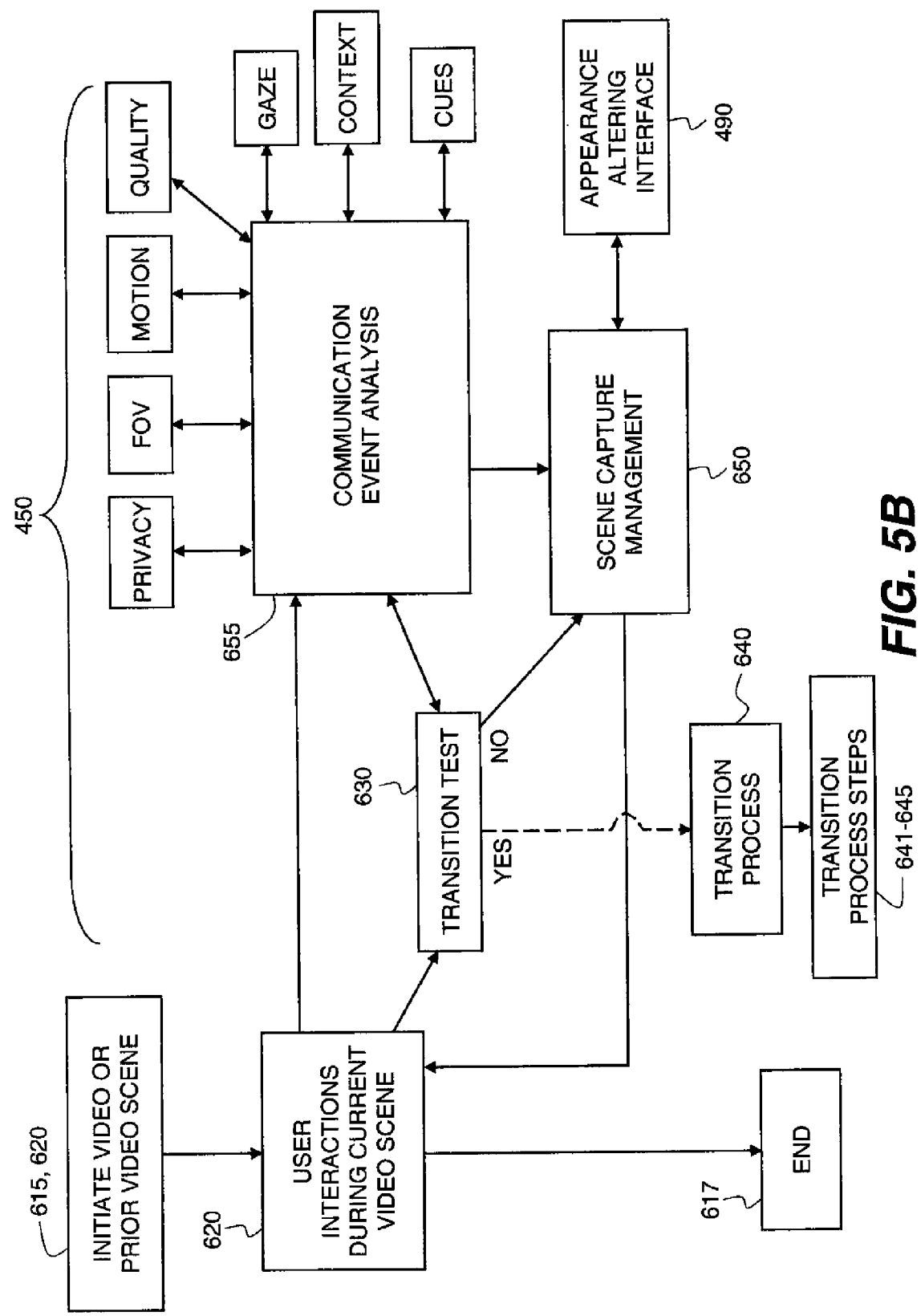
Figure 5C:
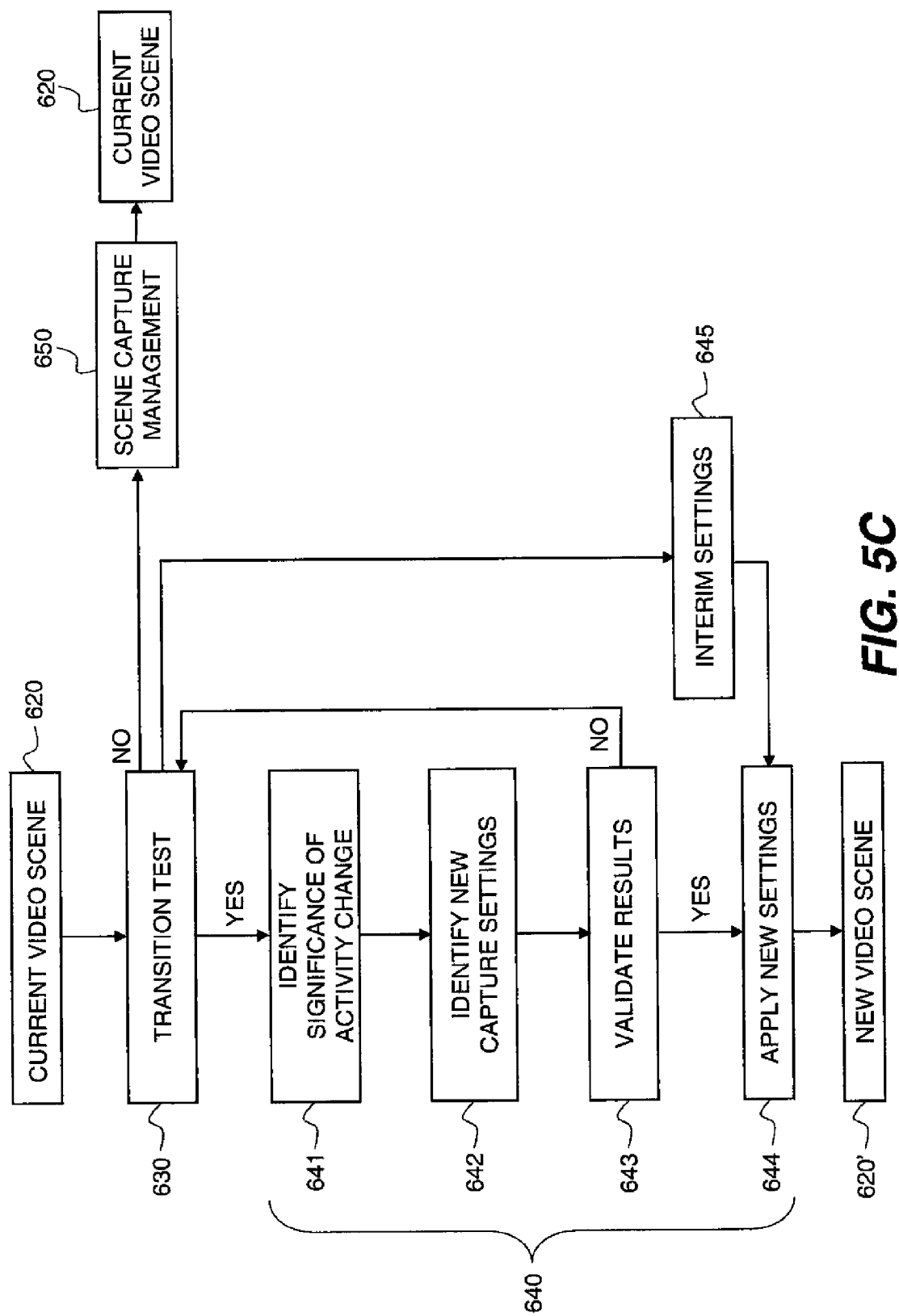

As shown in FIGS. 5A and 5B, the contextual interface 450 includes the transition test 630, the transition process 640, scene capture analysis 655, and scene capture management 650. FIGS. 5B and 5C expand upon the operational process steps for a communication event 600 depicted in FIG. 5A, showing greater details regarding scene capture management 650 and the transition process 640. As shown in FIG. 5B, during a video scene 620, the video communication device 300 can perform communication event analysis 655 and transition testing 630, for example as parallel path activities. Both the communication event analysis 655 and the transition test 630 are scene analysis algorithms (related to intra-scene analysis and inter-scene analysis respectively) tasked with assessing data directly derived from the video data streams (and audio) and identifying the significance of detected changes in scene content and context. The analysis approach is multivariate, as the scene analysis algorithms evaluate video scenes using a combination of scene content metrics, scene analysis rules, contextual cues, and statistical measures. Likewise, the scene capture management algorithm 650 and capture transition algorithm (FIG. 5C, step 644) are video capture scene adjustment algorithms tasked with modifying ongoing video capture by adjusting the defined video capture settings (including camera and audio settings).

Turning to FIG. 5C, the transition process 640 is illustrated in further detail, as a series of transition process steps 641-645. In a first step (641), the ongoing change in inter-scene content is assessed using current and prior video imagery, for example based upon statistical activity metrics or a video context selection algorithm, to determine the significance of the change in activity. This can mean identifying a new appropriate video context classification (for a new type of event) or identifying a change in activity levels (range or speed of motion, number of people, etc.). As an example, a transition in scene content from one event type to another, such as a group party activity to a group card activity, or from a purposeful to more spontaneous event (as in FIG. 4C), or from an event involving children to one involving their parents, can be identified as a change in the video context to a new or alternate video context. As another example, user activity metrics and capture activity metrics can indicate that user activity levels have increased or decreased relative to the current image framing and associated thresholds, such that new image framing is appropriate.

In a second step (642), the transition process 640 identifies resulting changes that can be made to the video or audio capture, or video or audio processing, to provide a new video capture mode or image framing (shot selection) that suits the new circumstances. The changes in the defined video capture settings can include field of view (FOV) or shot selection adjustments, application of privacy settings, response to user motion or activities or gestures, appearance based image changes (such as for gaze), or improvements in the image quality. Preferentially, the changes are consistent with an available defined video capture mode, but custom video capture settings for a communication event 600 or video scene 620 can be identified and used if appropriate. In a third step (643), the transition process 640 can test (statistically) the validity of the identified inter-scene transition (probability $P_{IE}$), an identified new video context (event) classification, the identified new video capture mode, the identified shot selection (probability $P_{SF}$), and the associated video and audio settings. If the resulting analysis is affirmative (indicating validated scene transitions), the following step (644) defines and manages the transition and adjustment to the new video capture settings for the ongoing video. If the resulting analysis is negative, or sufficiently uncertain, the video communication device 300 can continue with the current video mode using scene capture management 650, or initiate interim video settings (step 645) until the uncertainties can be further resolved. For example, interim video setting step 645 may provide a shot with intermediate framing between a wide shot and a long shot.

Although the contextual interface 450 responds to direct user input to enable some manual control over video capture and video processing, the contextual interface 450 is also designed to control the video communication device 300 during automatic video capture modes to provide user's 10 an enhanced video viewing experience. In particular, each video communication video communication device 300 is thus intended to provide high quality video that responds seamlessly and gracefully to changes in the user local environment 415 during video communication events 600. Any changes that the video communication device 300 makes in the video capture and processing need to occur over an appropriate time period and frequency that enhances the video experience, but avoids annoying the users. In that respect, high quality image capture is significantly a problem of proper image framing and changes or transitions in image framing.

Image framing is known in the photographic arts. In the case of both still and motion photography, professional photographers and cinematographers use guidelines such as the "rule of thirds", the "action axis rule", shot framing (wide shot, medium shot, close-up), and transition shots (establishing shots, straight cuts, dissolves, etc.) to aid camera placement, shot selection, and subject framing. For example, these guidelines can help a cinematographer establish a dramatic or conic shot sequence. Guidelines, relative to the rate of panning or tiling or dolly motion are used for motion during shots or between shots. For example, at 30 fps, the number of frames needed for to provide a quick 45 degree pan would be ~22 frames. In cinematography in particular, attempts have been made (see the background discussion) to automate camera selection and use so that a cameraman is not necessarily needed. However, unlike cinematography, the present invention anticipates automated videography that creates a good viewing experience from video capture of real time, unscripted events, and particularly communication events 600 provided by video communication device 300. Additionally, unlike classical cinematography, the video communication device 300 of the present invention (see FIGS. 3B and 4A), as typically used by consumers or users 10, has a limited set of cameras 120 placed in constrained positions. With these camera limitations, cinematographic sensibilities regarding shot selection and image framing, avoiding crossing an action axis, or avoiding indecisive cuts (related to changes in shot angle between adjacent shots) likely cannot be fulfilled.

Moreover, with respect to viewing a video communication, the goal is to provide a well framed image or shot that allows a local user 10 to move around within the captured area without changing the image capture settings unnecessarily, thereby reducing the needless viewing perspective changes for the viewer.

Figure 6B:
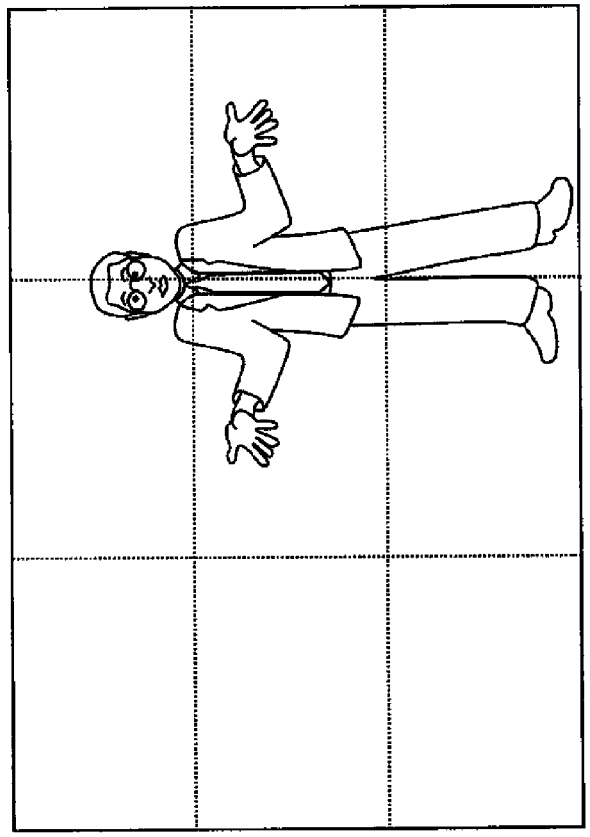
FIG. 6B illustrates the rule of thirds as classically applied in photographic image framing.
Figure 6A:
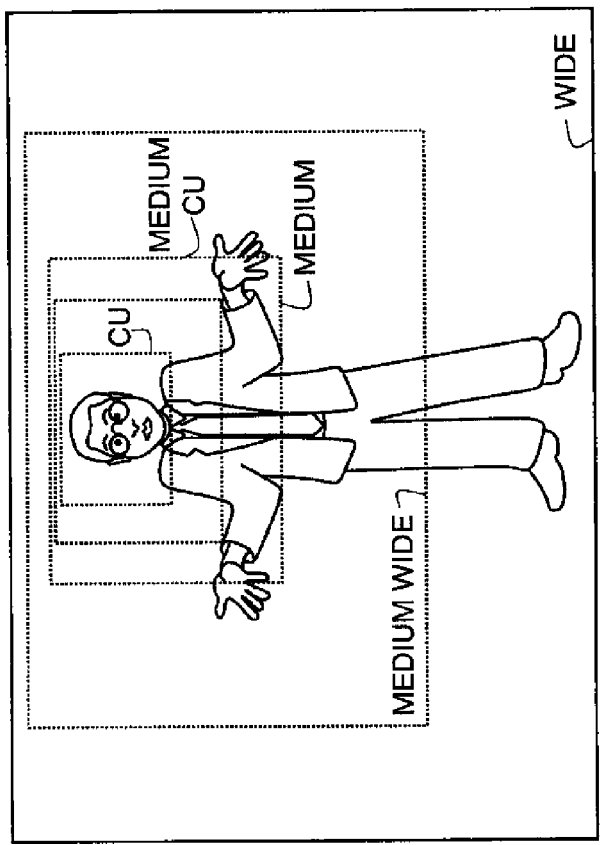
FIG. 6A illustrates classical image framing used in cinematography.

While shot framing for the present invention is based on different metrics, and is motivated by different needs, the shot framing concepts from cinematography have relevance. FIG. 6A illustrates common cinematographic concepts for framing shots 428, including close-up (CU), medium close-up, medium, medium wide, and wide shots, which are generally face-centric. A close-up shot shows the head neck and shoulders, while a medium close-up shows the head, neck, shoulders, and torso from the chest, up. A medium shot shows the person from the waist-up, while the medium wide shot usually shows a person from the knees up. A wide shot shows an entire person from head to toe, and a long shot (not shown) shows larger areas of their environment. A medium shot is wide enough to show two people in the same view (a "two-shot"), while a wide shot can be wide enough to show 4-6 people in the same view, depending on their positioning. FIG. 6B illustrates the concept of the "rule of thirds", in which to improve aesthetics, the preferred image photographic composition has the subject or object imaged off-center. In particular, when professionals photograph or film people, it is common to line the body up with a vertical line (along a line corresponding to ⅓ the image width), while having a person's eyes along or near a horizontal line. People are also typically imaged at an angle, to avoid frontal views that tend to flatten facial features and environments.

With respect to automated video capture or videography of real time unscripted events, whether for video communications, or other applications, use of definitions such as shots 428 and subject framing positioning are a useful construct. Certainly, shot selection, including sizing and positioning can provide pleasurable views that people are accustomed to, relative to detail (resolution) and aesthetic balance. However, in the case of the present invention, shot selection and framing primarily helps to balance subject image size and position with the uncertainty of a subject's next action. Thus, shot selection will not be limited to shots equivalent to those depicted in FIG. 6A, and intermediate shots (such as medium long) can be used. Likewise, the concepts of inter-scene and intra-scene transitions 635 are useful to video communication device 300. Essentially a shot 428 is a subset of a video scene 620, the latter of which can be described by other attributes, such as event classifications. Significantly, for the present invention, during the relative stability of a current defined video scene 620 (or shot 428), with the knowledge that user activity is within the defined ranges of intra-scene variations, the video communication device 300 can more readily apply computational bandwidth to other considerations, such as privacy and eye gaze algorithms, object detection algorithms, or determining audio adjustments. The concept of inter-scene and intra-scene transitions 635 also helps to define what a current shot consists of, and thus what the next shot can be. Thus, as will become clearer, shot selection, framing, and transitional rules for the present invention applies different criteria, to achieve different results, than does cinematography.

To begin with, shot selection or framing for video capture of unscripted real time events does generally depend on the number of subjects present, which is also often true for cinematography. For the video communications application, with a single subject 10, a long shot can occur when the subject is moving within large areas, but wide shots, and particularly medium wide shots or medium shots will be most common, and medium close-up shots will be about the tightest shots that occur. Basically, as the range, rate, and frequency of the subject's motion reduces, tighter shots can be provided. By comparison shot selection with multiple people will be highly dependent on the number of people, with a long shot likely required to accommodate greater than ~6 people, while a wide shot can accommodate small groups of 2-6 people, depending on positioning, a medium wide shot can likely only accommodate 2-3 people, and a medium shot, two (2) people in close proximity.

As shot selection is highly dependent on the number of people, the video communication device 300 can employ means, such as a face detector or body-shape detector for detecting and counting people. Various face detection approaches and algorithms are known in the art, and can operate at real time (30 fps) rates. For example, many face detectors search directly for key facial features, such as the eyes, mouth, and nose, that have physical prominence and can be further accentuated by shadowing. These key facial features can be modeled with a set of facial feature points or with templates (representing the eyes-nose-mouth) for example. As another example, a template search for a shadow-highlight-shadow pattern can find the eyes-nose-eyes, thereby locating a face. Alternately, people can be located in images using approaches that search for body shapes. For example, D. Forsyth et al., in the paper *Finding People & Animals by Guided Assembly*, (published in the Conference on Image Processing, pp. 5-8, vol. 3, 1997) describes a method for finding people and animals based on a body plans or grouping rules for using basic geometric shapes (cylinders) to identify articulating forms. It should be understood that face detection and body shape detection can both be used in the present invention, and in the circumstance that a subject's face is not facing a camera 120, body shape detection can still be used to localize and count heads in the images. This is particularly valuable because selection of shots 428 can be associated with a shots sizing parameter based on the percent area a head or face occupies in an image. In particular, FIG. 8B depicts a user 10 for whom a facial region of interest (ROI) is depicted as a rectangular box surrounding the head and face. Either a computed facial area, or more simply the facial ROI area, can be used in shot selection. For example, with a wide shot, the head or facial area represents ~0.5-1.0% of the image area. Then as the shots become tighter, the head or facial area increases on a percentage basis (for example, medium wide ~2%, medium ~4%, medium close ~8%, and close-up ~20%). Alternately, a body ROI can be defined and used based on body shape and size analysis.

Figure 7A:
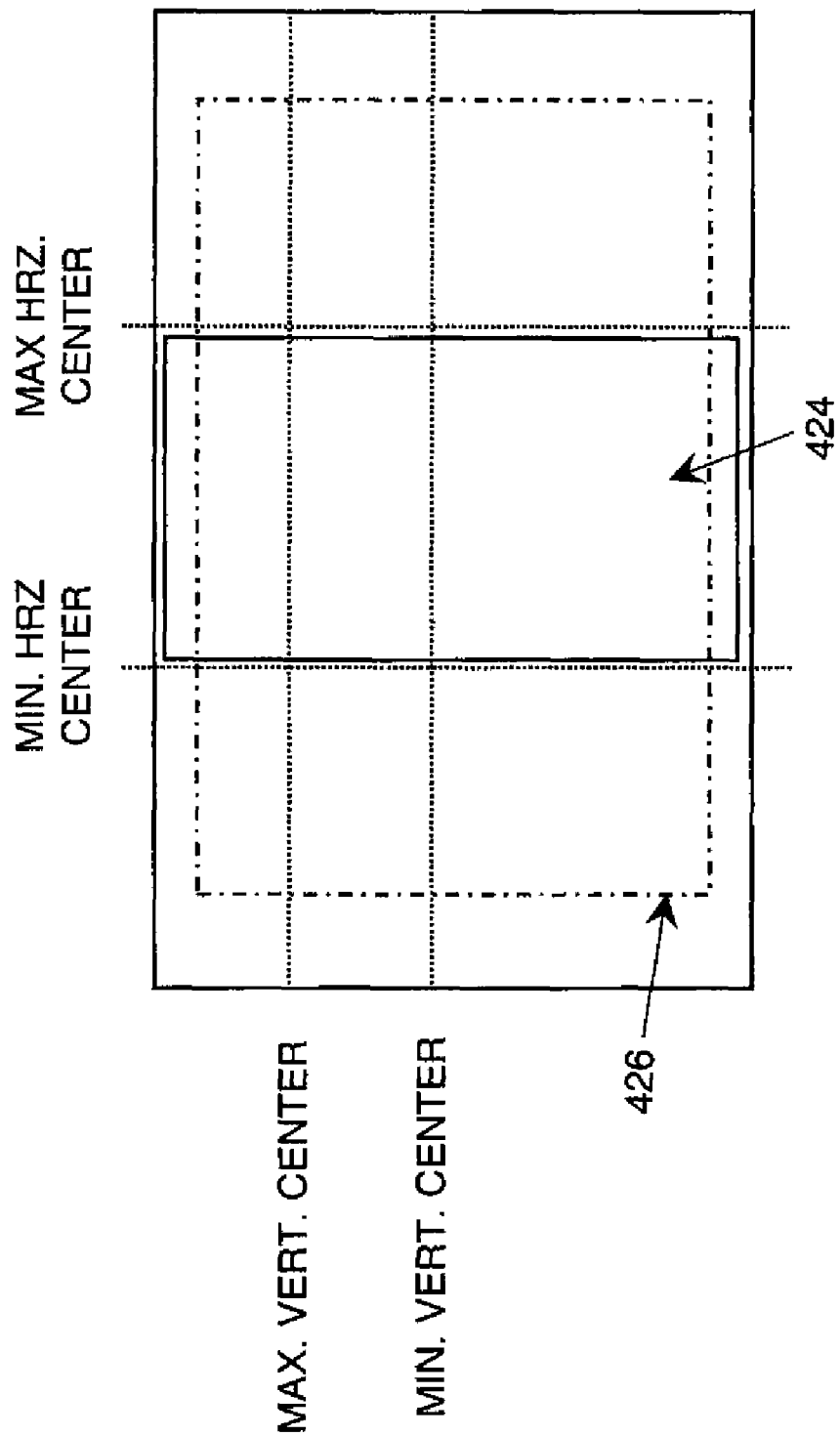
FIG. 7A illustrates image framing of the present invention as used for single subjects.

For the present invention, shot selection also depends on the activity level of the subjects, which can be described by the range, rate, and frequency of movement, the number of subjects, the subject activity history, and the system activity (PTZ or re-framing frequency). Again, in the case of image capture of real time unscripted events, where the next action of the subjects or users 10 is uncertain, it can be important to dampen the system response, so that every motion of a local user 10a does not cause a reframing change in the images conveyed to the remote viewer. Unlike the classical "rule of thirds" of FIG. 6B, shot framing and subject positioning is used to balance subject size in the image against the uncertainty of subject activity, rather than balancing subject size and aesthetics. Thus, FIG. 7A depicts a subject framing for video communication device 300 usable when single subjects are present. In particular, the target is to frame images with the subject located within the center ⅓ of the image, corresponding to the frame center area 424 that is bounded by the maximum and minimum horizontal center lines. As an example, this can mean that a user 10 resides wholly in the frame center area 424, or that at least half the user 10, as defined by a vertical line bisecting the body shape (torso), head, face, or ROI, is within frame center area 424. Again referring to FIG. 7A, it is the target to position the head or face of a user 10, using a horizontal centerline of the facial ROI, between the minimum and maximum vertical center lines that define a region representing ~55-75% of the frame height. These centerlines effectively represent shot centering thresholds, to which subject activity can be measured. Nominally, in framing a shot 428, a subject 10 is initially aligned horizontally to frame center. The subject 10 thus framed can then move around horizontally and vertically within frame center area 424 without reframing the shot 428 or video scene 620, while scene capture management 650 applies image focus, brightness, contrast, or color changes, or gaze corrections, or privacy or audio settings changes, or electronics settings (such as gain or noise reduction) changes, and other functions as necessary.

TABLE 2

System and Shot Framing Metrics

Figure 7B:
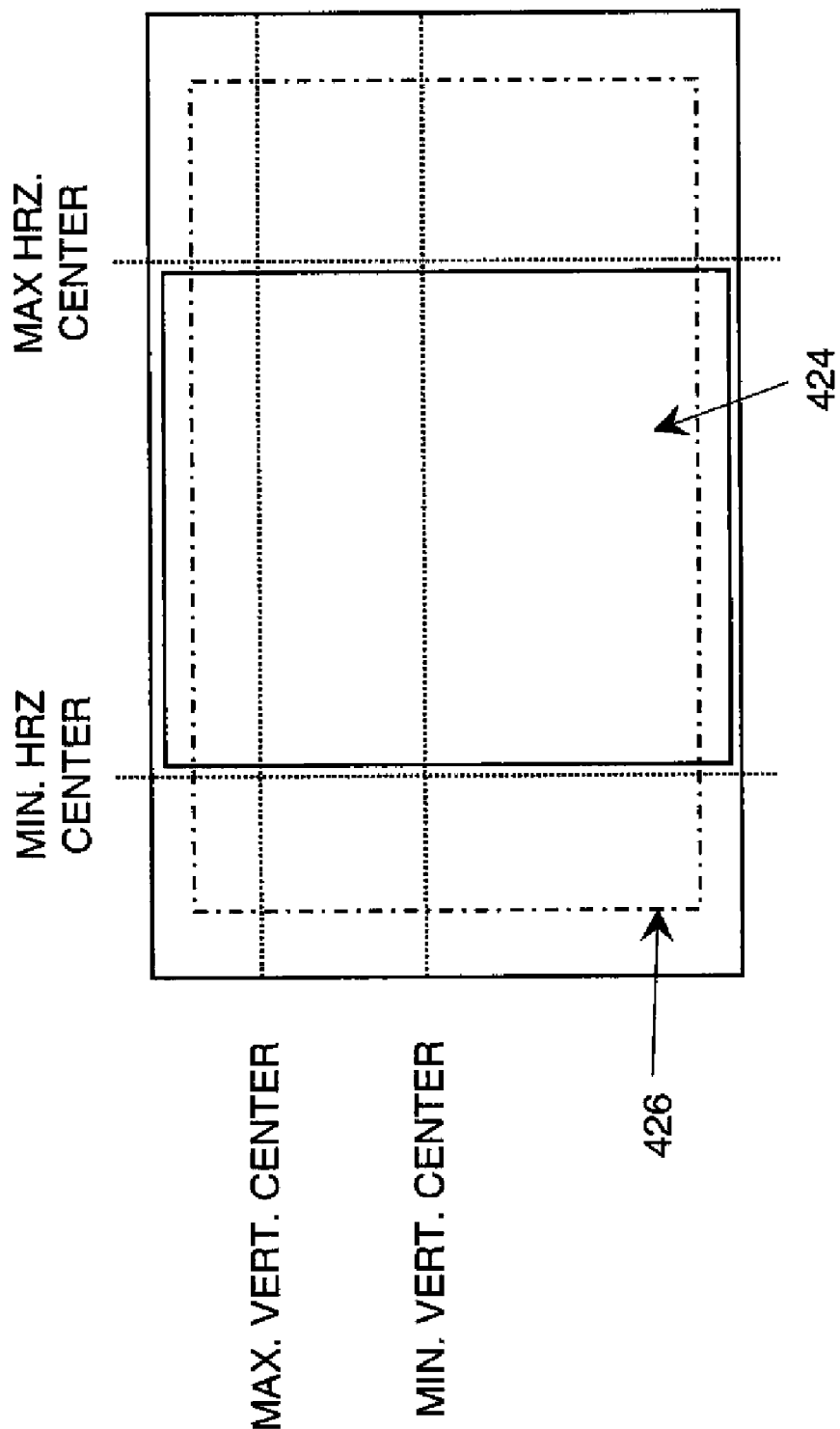
FIG. 7B illustrates image framing of the present invention as used for multiple subjects.

| | | |
|---|---|---|
| Shot Selection | | Including close-up, medium, medium wide, wide, and intermediate shots |
| Facial Area | ROI | |
| Facial sizing threshold | ΔROI | % variation in facial size allowed within a shot, without triggering a new shot. |
| Action safe area—large central portion of frame, % of frame height and frame width | | See FIGS. 7a and 7b; ~90% frame height, ~90% frame width; provides ~5-7% wide outer band beyond safe zone |
| Camera Movement Speed—The speed the NFOV camera can pan or tilt for a frame rate of 30 fps. | Cs | casual or slow rate: ~0.5-1.0 deg./frame = ~15-30 degrees/sec = ~2-4% frame width/frame time; Quick or fast rate: ~2-4 degrees/frame = ~60-120 degrees/sec. = ~10-20% frame width/frame time |
| Re-Center & Re-Size Time Delay (3) - The subject's ROI is considered out of frame (outside action safe zone) and inter-scene framing will be corrected after this inter-scene reframing time delay has passed. | ΔT3 | For example, ~0-4 seconds delay after a subject moves outside the frame, depending on the current shot, the # of people, and the activity level; time is short to reduce subject loss |
| Shot duration—duration for a current shot | Ts | ~30 seconds minimum, for example; can depend on shot selection |

TABLE 2-continued

System and Shot Framing Metrics

| | | |
|---|---|---|
| Scene (shot) change transition time - allotted time for making a transition from current video capture settings (including shot framing) to new settings. | $\Delta T4$ | $\Delta T4 \leq$ (Cs or Zs time), can depend on current shot framing and the changes needed |
| Inactivity Time—When the FOV lacks a subject or significant motion in for a MIN. INACTIVITY TIME, the local environment is considered inactive. | Tn | ~60 seconds |
| Zooming—The maximum amount of digital zoom (or zoom range) that can be applied to the NFOV image. | Zdr | for example, to zoom down to an equivalent to a VGA image ? For 2MP camera, that is ~3x |
| Zoom Rate—The maximum speed in which digital or optical zoom can be applied. | Zs | casual or slow zoom: ~2-4% frame width change/frame time quick zoom: ~10% frame width/frame time |
| Reframing frequency: rate at which reframing (zooming, panning, tilting, cropping, camera switching) is done; for intra-scene or inter-scene reframing, can be tracked separately or combined | $\tau PTZ$ | in units of reframing events/minute (or second) or reframing events per (shot or video scene or event) |
| Subject movement factor: a measure of subject movement | $\tau SUB$ | a normalized product of subject movement relative to the FOV: for example duration * velocity * movement area/FOV |
| Scene change probability: probability or confidence that capture settings (PTZ, etc . . . ) needs to be changed; intra-scene or inter-scene | $P_{IA}$ or $P_{IE}$ | See FIGS. 11a and 11b |
| Shot selection probability: probability or confidence in determining the next shot or framing | $P_{SF}$ | See FIGS. 11c and 11d |

However, when a subject 10 then wanders outside the frame center area 424 to the left or right, corrective reframing action can be taken. In a case that the subject 10 remains in an intermediate space between the frame center area 424 and a defined bounding box or action safe zone 426, which is a frame outline near the frame edge, reframing can re-center the subject 10 into a new frame center area 424. In order to reduce viewer annoyance with rapid reframing, reframing frequencies ($\tau PTZ$) or rates can be limited by applying a reframing (re-center or re-size) time delay ($\Delta T1$) of a few seconds, depending on the current framing. For example, a shot reframing to re-center a single subject 10 being captured with a medium wide shot can be ~1-2 seconds, or 30-60 frames at standard video rates (see Tables 2 and 3 for details). After the reframing delay time ($\Delta T1$) has been achieved, then pan, tilt, zoom, focus, or cropping adjustments can be made as appropriate to accomplish image reframing, subject to camera movement speed (Cs) or zoom rate limits (Zs), which can again depend on the current shot selection. In particular, reframing occurs over a defined scene change transition time (or shot change transition time) $\Delta T4$, which is an allotted time for making a transition from current video capture settings (including shot framing) to new settings. This transition time $\Delta T4 \leq$ (Cs or Zs in time), and it depends on the current shot framing, and the new shot framing. Transition timing for small changes in subject activity (intra-scene) can be more casual than transition timing for large changes in subject activity (inter-scene). Image cropping changes or camera selection can be instantaneous, but gradual changes are preferred to provide a better real time viewing experience. For example, for a medium wide shot, the maximum camera speed (Cs) can be ~2-4 degrees per frame or ~10-15% frame width per frame time. The subject 10 can also move closer to, or further away from, the camera 120, without re-framing being required, although focus adjustments can still be needed. The sizing of the subject 10 can be tested against a sizing threshold ($\Delta ROI$), within which changes in subject size are ignored. For example, for a medium shot of a single subject, where the face should occupy ~4% of the image area, facial size changes within a sizing threshold $\Delta ROI=+/-40\%$ of the nominal 4% size can be ignored, meaning that reframing is not required.

TABLE 3

| Image Capture—Single Subject | Metric | Wide Shot | Medium Wide Shot | Medium Shot | Medium Close-Up |
|---|---|---|---|---|---|
| Sizing—The subject's facial rectangular ROI is considered properly sized when it occupies a FACE SIZE % of the total FOV area | ROI/FOV | wide shot (shows entire standing pose, small group): ~0.5-1.0% | Medium wide shot (standing person from knees up, two-shot): ~2% | Medium shot (waist up, sitting in front of system ?): ~4% | Medium close-up (upper body/shoulders up): ~8% |
| Re-Center and Re-Size Time Delay (1)—The subject's ROI will be considered off-center and/or improperly sized, and intra-scene framing will be corrected after this time period has passed. | $\Delta T1$ | ~4-30 seconds delay time after a casual subject horizontal moves into action safe area, before gradually panning or zooming back, vertical corrections are ~2x | ~2-20 seconds delay time after a casual subject horizontal move into the action safe area, vertical corrections are ~2x faster | ~2-10 seconds delay time after subject moves horizontally into action safe area, vertical corrections are ~2x faster | ~0.5 seconds delay time after subject moves into action safe area |

TABLE 3-continued

| | | | | |
|---|---|---|---|---|
| Re-Center and Re-Size Time Delay (2)—This a time delay to shift to a lighter shot (inter-scene change) in response to reduced subject movement (settling). | ΔT2 | ~40 seconds | ~60-90 seconds | ~90-120 seconds |
| Centering—facial ROI—center point is located between MINIMUM CENTER % and CENTER %] of the FOV area. | | horizontal: between 33%-67% of screen width | vertical: between 55-75% of screen height | |

| Image capture—Multiple Subjects | Metric | Long Shot | Wide Shot | Medium Wide Shot |
|---|---|---|---|---|
| Sizing—The subject's facial rectangular ROI is considered properly sized when it occupies a FACE SIZE % of the total FOV area | ROI/FOV | Long shot (fill FOV): >~5-6 people | wide shot (shows entire standing pose, small group (2-6 people): ~0.5-1.0% | Medium wide shot (standing person from knees up, two-shot): ~2% |
| Re-Center and Re-Size Time Delay—The subject's facial rectangular ROI will be considered off-center and/or improperly sized, and framing will be corrected after this time period has passed. | ΔT1 | ~2-20 seconds delay time after a casual subject horizontal moves into action safe area, before gradually panning or zooming back, vertical corrections are ~2x faster | ~2-10 seconds delay time after a casual subject horizontal move into the action safe area, vertical corrections are ~2x faster | ~2-5 seconds delay time after subject moves horizontally into action safe area, vertical corrections are ~2x faster |
| Re-Center and Re-Size Time Delay (2)—This a time delay to shift to a lighter shot in response to reduced subject movement (settling). | ΔT2 | ~60-90 seconds | ~90-120 seconds | |
| Centering—facial ROI—center point is located between MINIMUM CENTER % and CENTER %] of the FOV area. | | horizontal: between 20%-80% of screen width | vertical: between 55-75% of screen height | |

Figure 9:
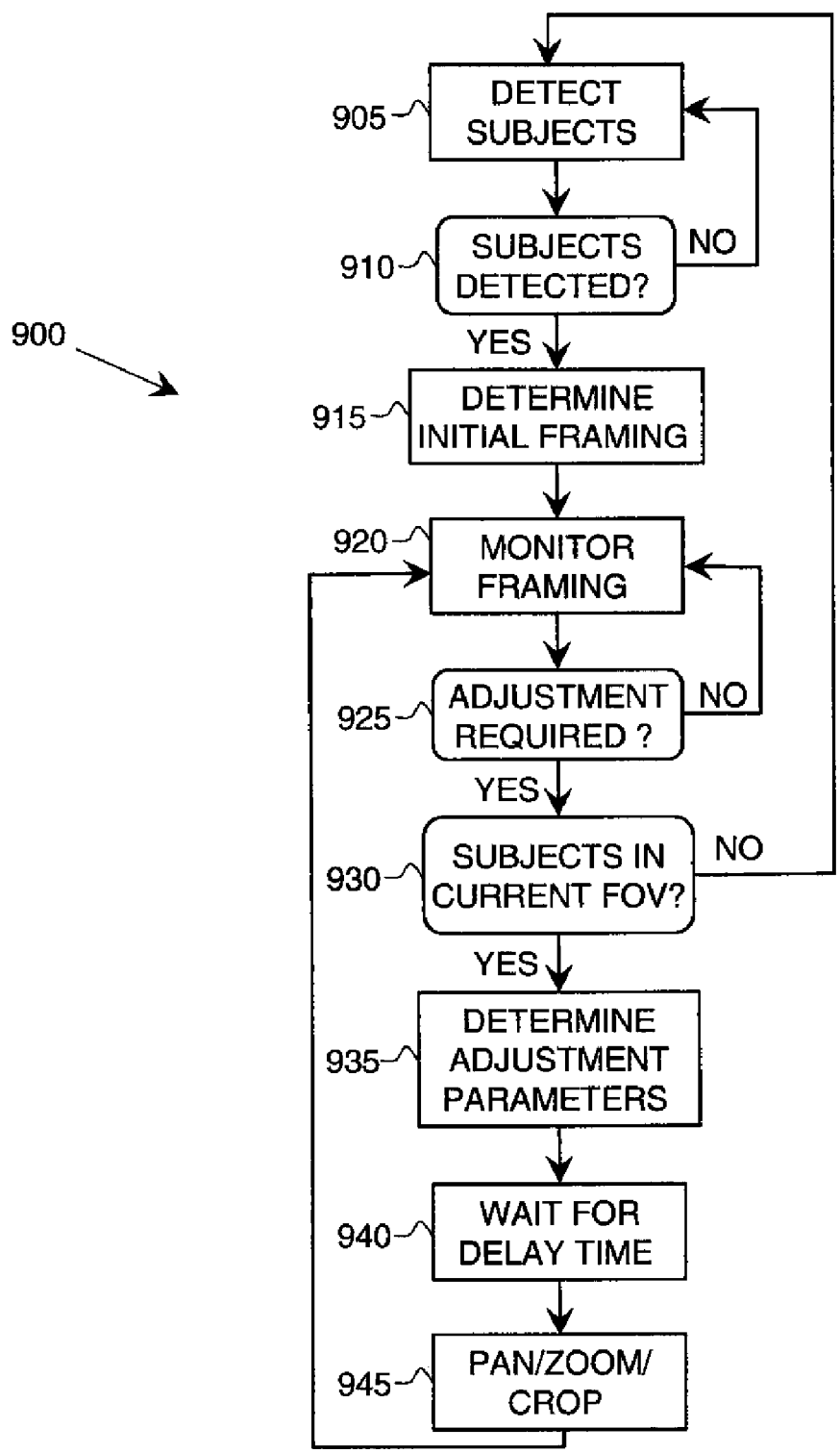
FIG. 9 illustrates a flowchart showing an automated videography process for providing a system framing and reframing response to user activity.

Over the course of time, subject activity levels can either increase or decrease. In the case, opportunities can occur to reframe a shot 428 to a tighter shot (medium wide to medium, for example), so that a viewer can better see a subject 10. FIG. 9 depicts an exemplary framing process flowchart 900 for automated videography that illustrates processing that the present invention can implement to determine and maintain proper framing during either intra-scene or inter-scene transitions 635. In a sense, the framing process 900 is another view of the scene analysis processes or algorithms, the transition test 630 and communication event analysis 655, that shows logical software process steps to execute these analyses and decisions. The initial step 905 attempts to detect subjects 10 in the WFOV camera at the beginning of a communication event 600. If subjects are detected (YES to decision step 910) an automatic framing algorithm is employed in step 915 to determine initial framing parameters. If no subjects are detected (NO to subjects detected decision step 910) subject detection step 905 is repeated until subjects 10 are detected. The algorithm used in the determine initial framing step 915 utilizes the metrics from Tables 2 and 3 to determine the desired initial framing. Then, in analyze framing step 920, the content in the current FOV is analyzed to determine if the desired framing has been achieved, using metrics such as the reframing frequency, subject movement factor, and people counting in the analysis. If the current framing is not the desired framing, a framing adjustment is required (YES to decision box 925). If the current framing is the desired framing (NO to adjustment required decision box 925), the framing is checked via monitoring step 920 to maintain proper framing. A check can be made in decision box 930 to determine if the subjects are 10 still in the current FOV. If the subjects are not in the current FOV (NO to decision box 930), subject detection is performed in step 905. If the subjects are still in the current FOV (YES to subjects in FOV decision box 930), step 935 is performed to determine the framing adjustment parameters required to change the current framing to the desired framing. In step 945, changes in capture (for cameras, microphones, etc.) settings are made, once the appropriate delay time (shot change delay time step 940) has passed. The capture settings changes include changes to camera selection, a cameras direction and zoom setting, and image cropping, which are made to achieve the desired framing. It should be noted that limits and thresholds on the amount of panning, zooming, and cropping could prevent the desired framing from being achieved with one set of changes to camera position, camera zoom, or image cropping. The shot change delay time step is determined by the SHOT DELAY TIME, $\Delta T_{1,2,3}$) as described in Tables 2 and 3, and in relation to the shot duration Ts. Once changes to the camera made in step 945 have been made, the system returns to the analyzing framing step 920.

The system and shot framing metrics of Tables 2 and 3 will now be discussed in greater detail. Consider that a single subject has been detected and an initial framing (such as a medium wide shot) determined and initiated. The subject activity levels, relative to current framing, can be monitored using various parameters, including a subject movement factor (τSUB) that measures the magnitude of subject motion, relative particularly to the range (area), speed (velocity), and frequency of subject motion. For example (see Table 2), the subject movement factor, τSUB, can be a normalized product of subject movement (for example duration*velocity*movement area (or range)/FOV) relative to the FOV (the WFOV or the current FOV), which thereby directly measures user activity. Other factors, including the acceleration, direction, and position, of the subject movement can also be included in τSUB. By comparison, the reframing frequency (τPTZ), which measures the frequency of changes in image framing by PTZ, image cropping, or camera switching, is a measure of the device response to user activity. However, the reframing frequency (τPTZ) can be a somewhat indirect, or dampened, measure of the magnitude of user activity. For example, if such parameters measure decreasing user motion (settling) relative to the current framing for a sufficient period of time (reframing time delay for settling, ΔT2), then the shot selection can be changed to a tighter shot 428. As discussed in Table 3, the settling time delay ΔT2 can depend on the current shot selection, with longer periods of stability required to change to a tighter shot. As part of reducing potential viewer annoyance with rapid reframing, the setting time delay ΔT2 should exceed a minimum shot duration Ts. In such an instance, transition testing 630 effectively results in an inter-scene transition 635 based on user activity changing (settling) on a system measurable basis.

For a given framing, user activity may remain at a level that may not then require or allow reframing to either a wider or a tighter shot 428. In such an instance, determine adjustment parameters step 935 (or scene capture management 650 and transition testing 630) can identify a range of capture changes consistent with intra-scene transitions 635, including field of view adjustments, application of privacy settings to framing, image quality parameters (such as resolution/focus, brightness, or color), eye gaze adaptations, or audio controls, which can be modified to improve the viewing experience for the current scene. For example, a user 10 may gradually drift rightwards, but at a magnitude below level of motion threshold levels for subject movement (τSUB), or for re-sizing thresholds (ΔROI), or for reframing frequency (τPTZ), such that a series of small reframing (PTZ, cropping) steps occur, but all within the intra-scene thresholds appropriate for the current shot 428. Nominally, the small reframing steps would occur after the specified reframing time delay ΔT1 has passed, and the changes would occur at rates much less than the specified maximum camera speed Cs and zoom rate Zs. A viewer would then observe the user 10 gradually moving through the user environment and the images would keep apace with a series of gradual image capture changes. The visual effect can be similar to the automatic lock and follow video capture mode. For smoother image capture, the video communication device 300 can operate in a 'soft' (non-user specified) lock and follow mode, to reduce the step-wise nature of the just described image capture sequence. A remote viewer may also request the system to initiate this soft lock and follow mode, to follow the local user 10 while maintaining a relatively constant FOV.

The re-centering and resizing time delays ΔT1 and ΔT2 are used for reframing subjects relative to small or intra-scene changes in subject activity and position, and help to reduce the system responsiveness to small user movements. As before, subject settling can be measured with user or system activity metrics such as subject movement (τSUB) or reframing frequency (τPTZ). As Table 3 shows, these time delays can be shot dependent. In the case of time delay ΔT1, the tighter the shot, the more quickly the system will respond to reframe the subject. It is noted that if a subject 10 moves back into the frame center area 424 before a ΔT1 time delay has passed, the anticipated reframing changes can be cancelled or changed. In moving from a current shot 428 to a new shot 428 on the basis of subject settling, the amount of time delay ΔT2 after the subject 10 has been considered to settle, plus prior time spent in the current shot, should exceed a specified minimum shot durations Ts. As shown in Table 3 with exemplary values, settling time delays ΔT2 lengthens as shots become tighter.

On the other hand, user activity can change in various ways such that transition testing 630 identifies capture parameter changes consistent with an inter-scene transition 635. Again, consider the circumstances of a single subject 10, framed in a current shot (such as medium, medium wide, wide, or intermediate) that is tighter than a long shot, when then user activity increases and a framing change is triggered. There are numerous ways in which the activity of a subject 10 can require changes to the current framing, such as movement going outside a defined action safe zone 426. User activity can also exceed thresholds for re-sizing ΔROI, or level of motion thresholds for subject movement (τSUB) or reframing frequency threshold (τPTZ), or camera adjustment limits, such that reframing becomes necessary and is then defined in a determine adjustment parameters step 935. As one example, a subject 10 can move at a gradual but intermittent rate across the capturable space of the local environment 415, such that modest re-centering and resizing adjustments keep being made, but at a greater rate than in the prior example. As this occurs, the camera angle can become more extreme or the reframing frequency (τPTZ) can increase. For example, to then reduce the rate of PTZ or cropping changes, image capture can be reframed to a wider shot, thereby reducing potential viewer annoyance.

As user activity increases beyond level of motion thresholds supportable by a current shot, shot selection is generally forced to wider and wider shots (inter-scene transitions 635). For example, widely ranging user activity may best be provided by the WFOV camera, providing a wide shot or a long shot, with or without cropping. Also limitations on a NFOV camera, related to zoom range Cz or camera angle, may indicate use of the WFOV camera, even if the cropped WFOV images are comparable in size or modestly larger than the largest images available from a NFOV camera. Alternately, wide ranging rapidly moving activity of a single user 10 can be captured using a lock and follow mode, using images from either a NFOV camera or a cropped WFOV camera. Either the local user 10 or the remote viewer can be asked if image capture can be switched to an effective lock and follow mode, until user activity potentially subsequently settles.

Gradual shot transitions 635 are easier to support when user activity is decreasing (settling) than when it is increasing. Indeed, various sudden changes in user activity can cause a user 10 to disappear or be partially occluded from subsequent image capture for a period of time (ΔT3) until the user is reframed. Re-Center and Re-Size Time Delay ΔT3 should be short (a few seconds maximum, to minimize subject loss. Image reframing for inter-scene changes should be minimized by not getting into too tight a shot, relative to user activity, for a video communication device 300 to gracefully support changes without subject loss. As one approach to minimize subject loss, changes in user activity can be tracked using reframing frequencies τPTZ or subject movement factors τSUB, so that the automated videography system 300 can reframe to wider shots in an anticipatory way. Other approaches to reducing the subject loss risk can be situation specific. For example, facial images of a user 10, captured in a tight shot (medium or medium close-up) while sitting, can suddenly be lost if the user quickly stands up. Because of such concerns, vertical reframing time delays can be smaller for vertical movements than for horizontal movements. Video communication device 300 can also provide a wider shot from the WFOV camera, perhaps cropped down, until the NFOV camera can adjust to the new circumstances. Of course, if a subject 10 moves into an area of the local environment 415 that is outside the available WFOV 420, or is a privacy limited image area 422, then the video communication device 300 will not reframe to show the subject. If the subject 10 is then gone for a time greater than a defined inactivity time Tn, the device 300 can for example provide a default image. Real time image capture can cease until a local user 10 reinitiates the video communication device 300.

In comparison to automated videography of single subjects, automated video capture of multiple subjects can potentially be more, or less, complicated. As an example, automated video capture of multiple subjects that keys on interpreting behavioral or contextual cues, such as gestures, voice or audio cues, eye gaze, or explicit behaviors or activities, or personal relationships, can become increasingly complicated as the number of people increases. However, automatic capture using event classifications (such as "birthday party", "dinner party", or "card game"), whether user supplied or system interpreted, can reduce the complexity, as framing, transition recognition, and reframing decisions, can be made using rules or guidelines appropriate for the event. At a more fundamental level, automatic video capture can be guided by maintaining a count of the number of people involved, and then framing to the tightest shot that captures all or most of the people with some margin. Again people can be counted using image interpretation algorithms that locate body shapes (torsos), heads, or faces.

In this regard, FIG. 7B depicts an exemplary nominal framing for device 300 usable when multiple subjects are present. In particular, the intent is to frame images with the subjects located within the central ~60% of the image (frame center area 424), for example using face detection and tracking of the associated facial ROI's in defining a minimum subject bounding area. Image width can be determined by the lateral positions of the extreme facial ROI's. Vertical positioning can be determined by the position of the most extreme vertically positioned facial ROI. Image framing can then target image capture to include all of the facial ROI's laterally, while positioning the vertically most extreme facial ROI at ~75-80% of the frame height. Depending on the arrangement of the people, these framing positions may or may not match well with the guidelines for shot selection. As noted previously, selection of shots 428 generally becomes more limited as the number of people increase. Again, a long shot is likely required to accommodate greater than six ~(6) people, while a wide shot can accommodate small groups of 2-6 people, depending on positioning, and a medium wide or medium shot can likely only accommodate two (2) people. The tighter shots can be provided by a NFOV camera 120 or a cropped down WFOV camera image, but as the number of people increase, the usage of NFOV cameras 120 likely decreases.

Once the subjects are being captured by an initial or current image framing, scene capture management 650 and transition testing 630 can determine subsequent responses of video communication device 300 to changes in user activity. As with image capture of single subjects, the people can settle into an activity with a reduced range of motion, thereby potentially enabling a tighter shot, assuming a sufficient period of time (refraining time delay for settling, $\Delta T2$) has been met. The refraining time delay $\Delta T2$ for multiple subject image capture can be longer than that for single subject image capture (for example, 90 seconds versus 40 seconds) to reduce the risk of subject loss in case one or more subjects 10 suddenly becomes more active. Likewise, as with image capture of single subjects, corrective refraining action can be taken when a subject 10 exits the frame center area 424 to the left or right, but then lingers in the intermediate space between the frame center area 424 and an action safe zone 426. After an appropriate time delay ($\Delta T1$), refraining can then occur. The refraining time delays ($\Delta T1$) are generally shorter for a given shot with multiple subjects than with a single subject. For example, the refraining delay time ($\Delta T1$) to modify a wide shot with multiple subjects can only be 2-20 seconds, compared to 4-30 seconds for the single subject case.

As with the single subject case, one or more of the multiple subjects 10 can move in a way that takes them completely outside the action safe zone 426 and the image of a current image framing, and even out of the available WFOV. In the case that some subjects 10 remain in areas (FOV 420) of the local environment 415 capturable by the WFOV camera 120 for the duration of a defined reframing delay time ($\Delta T3$), then the image framing can change to include all of the available subjects 10. If on the other hand, one or more subjects 10 leave the capturable FOV 420 entirely, image framing can remain directed and sized for the remaining subjects 10. The viewers can be provided with an icon or text indicating that some subjects 10 left the area. If the departed subjects 10 return before a delay time $\Delta T3$ has passed, image reframing to a wider FOV need not necessarily occur. Alternately, as suggested by FIG. 3C, multiple spatially non-contiguous images can also be acquired simultaneously by multiple cameras 120.

In considering the prior image framing discussion for single and multiple subjects 10, the use of defined frame center areas 424 helps to dampen the device response to user activity. One or more subjects 10 can move in appropriately defined frame center areas 424, while scene capture management 650 makes intra-scene changes (focus, brightness, gaze, audio, etc.) as needed, while the image framing remains nominally constant. As the activity levels of subjects 10 increases or changes, use of parameters such as an action safe zone 426, a subject movement factor $\tau SUB$, or a reframing frequency $\tau PTZ$ enable the video communication device 300 to quantify the activity and provide a response, which may correspond to an inter-scene or intra-scene transition 635. Of course, predetermined privacy settings can provide privacy limited image areas 422 that are out-of-bounds, or limit selection of shots 428, or direct image capture to define areas such that shot selection is limited.

As mentioned previously, intermediate shots 428 can occur if subject movement (area, magnitude, frequency, and direction) does not match well with a standard shot. An intermediate shot can be selected the automated videography system 300 on an interim basis (step 645), or used for the duration of a shot. In a sense, each shot, as well as intermediate shots, can be defined and selected according to associated facial ROI's, body size ROI's, an allowed number of subjects, an appropriate range of subject movement (as measured by a subject movement factor or a reframing frequency), or other factors.

This automated videographic method for changing image framing, whether for intra-scene or inter-scene transitions 635 can be thought of as an algorithm that determines proper framing based on an intelligent decision derived from the metrics in Tables 2 and 3. Different shot framing choices, automatic modes and scene capture choices can be implemented by including or excluding metrics or by giving different priorities to the metrics. The process of changing image framing (PTZ, cropping, shots 428), whether for intra-scene or inter-scene transitions 635, can be thought of as a deterministic process enabled by the framing process flowchart 900 depicted in FIG. 9, or the processes of transition testing 630 and communication event analysis 655 outlined in FIGS. 5A-5C. In this view, measured levels of user or system activity lead to clear, or intermediate system responses.

Figure 10:
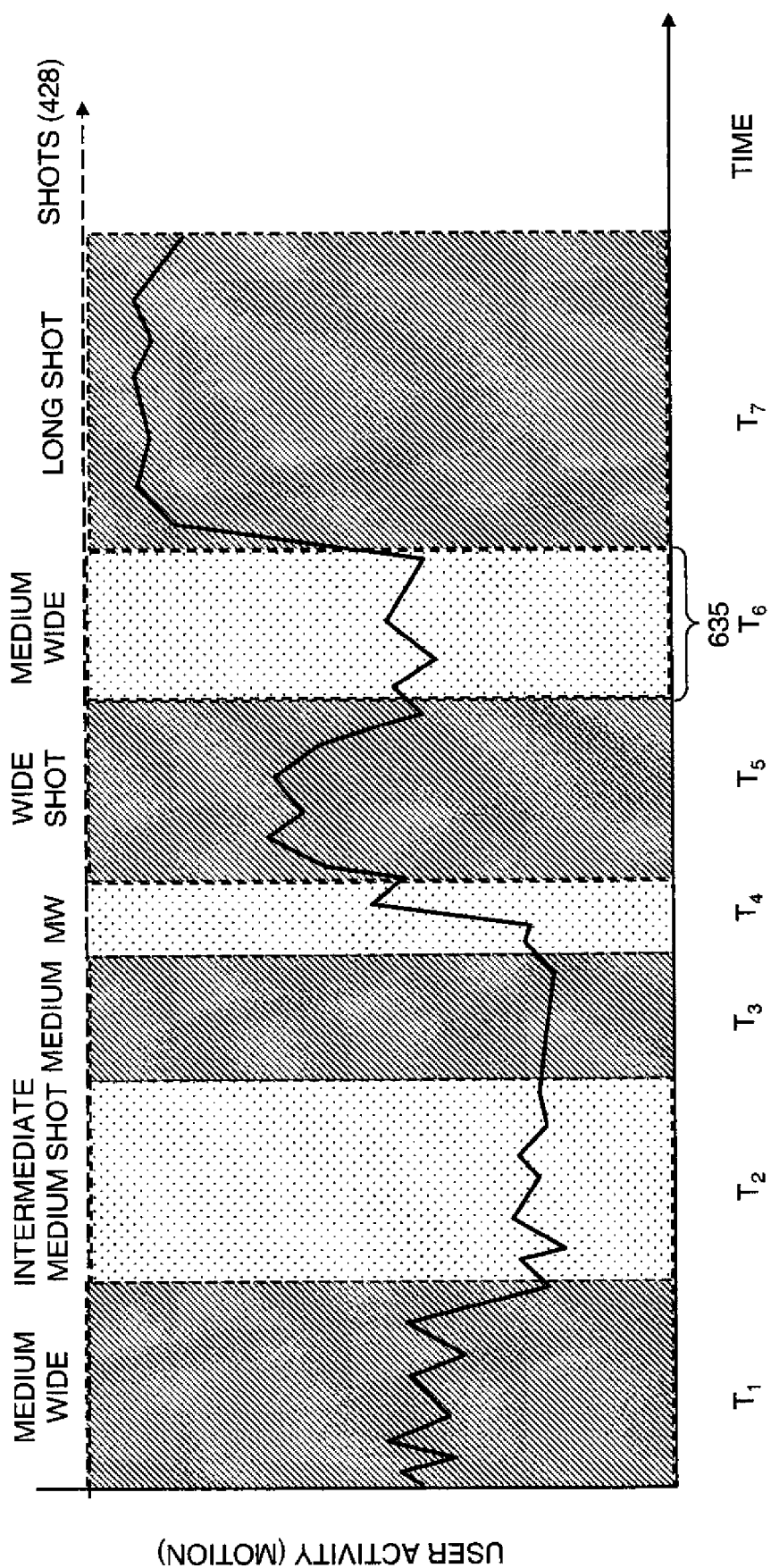
FIG. 10 illustrates an exemplary time sequence of user activity and shot selection versus time.

As another approach to understanding framing and re-framing, FIG. 10 represents the activity of a subject 10, occurring over time, overlapped with a sequence of defined shots 428, and inter-scene shot transitions 635, corresponding to changes in activity levels. For example in the initial time span t1, user activity was captured by a medium wide shot. User activity then reduced entering time span t2, enabling a tighter intermediate medium shot. As user activity subsequently settled more, a video communication device 300 then transitioned to a tighter medium shot (in t3). Then as user activity increases, the shot selection transitions back to a medium wide shot (t4) and then a wide shot (t5), with measurements of user activity τSUB or reframing frequency τPTZ potentially aiding the system in recognizing the increasing user activity level. After a subsequent medium wide shot (t6), increased user activity to levels corresponding to a long shot (t7), without an intermediate shot, such as wide shot, occurring between t6 and t7. The medium wide shot of the t4 time span can exemplify an interim shot, provided via interim settings transition step 645, during which time user activity was changing quickly enough that the best shot selection was unclear. While communication event 600 will likely start with a wider shot (such as a medium wide shot) and progress to tighter shots as (or if) user activity settles, it is not presumed that the system will start with the widest shot available (such as a long shot) at the beginning of an event.

Figure 11C:
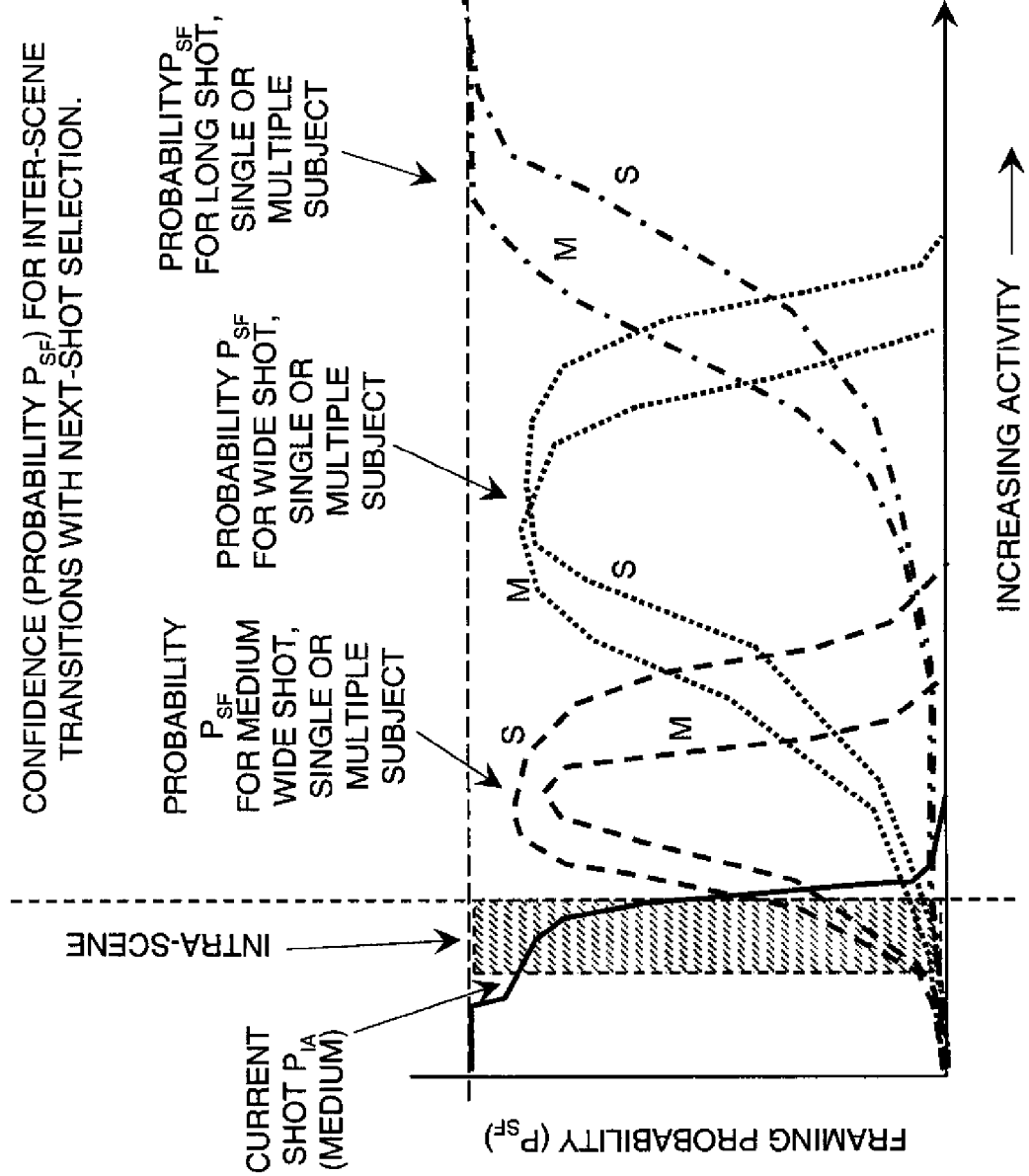
FIG. 11C illustrates probabilities for a next shot selection versus increasing user activity for different shots and single or multiple subjects.
Figure 11D:
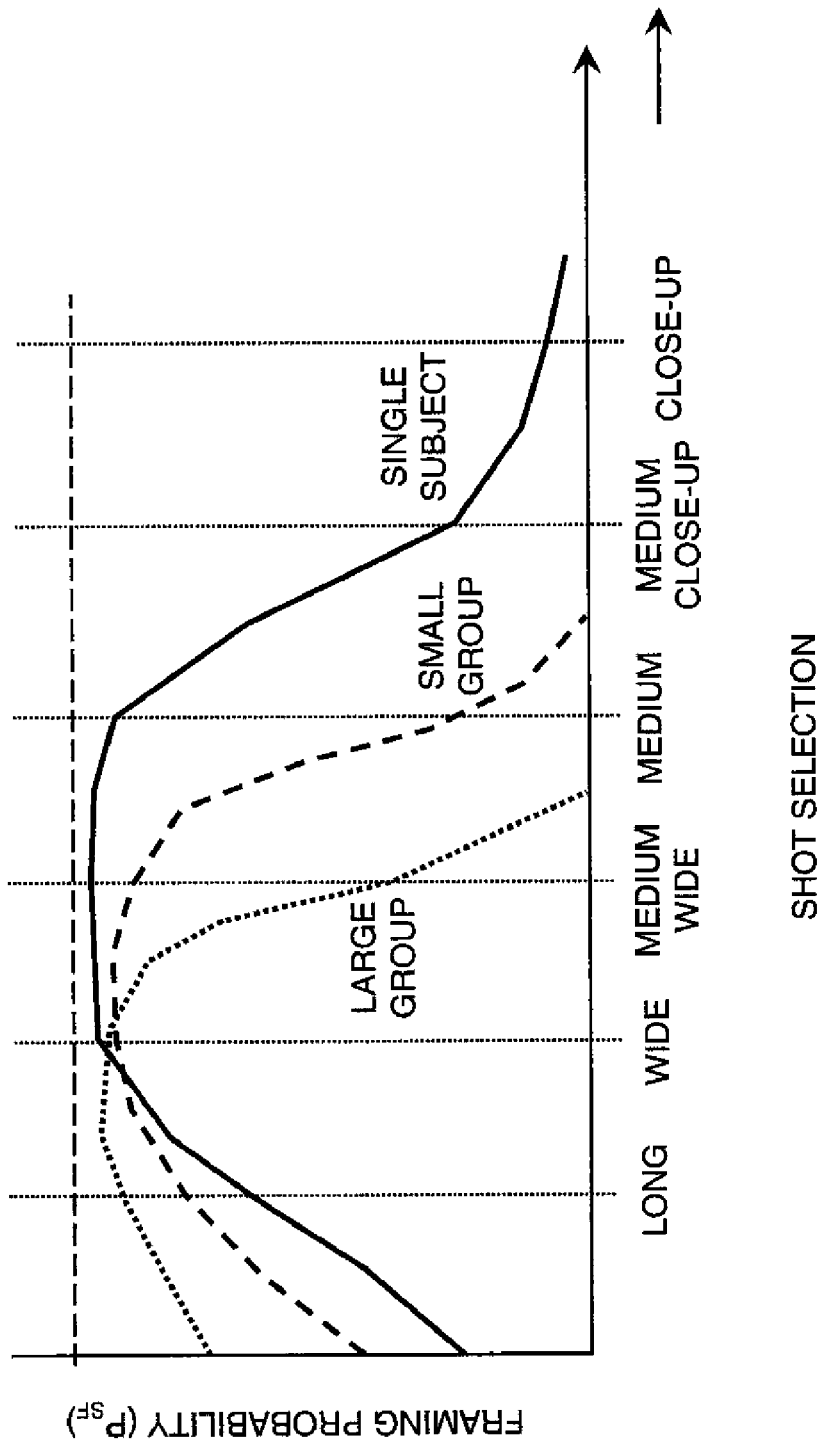
FIG. 11D illustrates the probabilities for framing in a given shot versus shot selection and the number of subjects.

FIG. 10 basically depicts an activity-shot selection-time sequence that corresponds to a series of inter-scene transitions 635, without depicting smaller changes in capture settings for intra-scene transitions 635 that may have occurred within the given shots 428. By comparison, FIGS. 11A and 11B represent examples of the probability ($P_{IA}$) of the current shot (medium wide or medium, respectively) staying in the current defined shot with intra-scene transitions 635 in capture settings, or the probability ($P_{IE}$) of the current shot 428 giving way to an inter-scene transition 635 to a wider shot 428, as user activity increases. As these two figures show, the tighter the current shot is (such as medium versus medium wide), the less likely the comparable levels of user activity can be supported in the current shot 428 with intra-scene transitions 635. FIG. 11C then complements FIG. 11B by depicting the probability ($P_{SF}$) of a given next shot selection for an inter-scene transition 635 as user activity increases. In particular, FIG. 11C gives representational plots of the probabilities ($P_{SF}$) of the subsequent shot following a medium shot being a medium wide shot, a wide shot, or a long shot, relative to increasing user activity and whether single (S) or multiple (M) subjects 10 are present in the captured FOV 420. Basically, the presence of multiple people corresponds to quicker transitions into and out of defined shots as user activity increases. As a further comparison, FIG. 11D provides representational plots of the normalized framing probabilities ($P_{SF}$) for shot selection depending on the number of people. In particular, FIG. 11D depicts exemplary probabilities ($P_{SF}$) of a given shot (long, wide, medium-wide, etc.) occurring for different numbers of subjects 10, defined as "large group," "small group," and single subject. As can be seen, the larger the group, the less likely a tight shot 428 is to occur, and the smaller the group, the less likely the widest shots 428 are to occur. Again, the range of shots applicable to single subjects is wider than for multiple subjects.

In one sense, the framing process flowchart 900, which depicts a mechanism for transition testing 630 and communication event analysis 655, represents a deterministic view of the framing decision process, in which changes in user activity are tested against current framing and user activity and device activity metrics (such as subject movement factor τSUB or reframing frequency τPTZ) to determine when framing (size and centering) changes are required, and what the subsequent re-framing changes should be. From that respect, the probabilities of staying in the current shot or the probabilities of encountering an inter-scene transition ($P_{IA}$ or $P_{IE}$ in FIGS. 11A and 11B) and determining a new shot selection ($P_{SF}$ in FIGS. 11C and 11D), represent statistical results that can be compiled during the course of device operation under various operational conditions.

Alternately, these probabilities can be used as confidence values, which can be used in a pro-active fashion. The scene analysis algorithms (for scene capture management 650 and transition testing 630) can be used to calculate confidence values (or confidence levels), which are measures of the confidence assigned to the value of an attribute, and which are often expressed as a percentage (0-100%) or a probability (0-1). Thus, FIGS. 11A and 11B provide examples of intra-scene transition confidence values ($P_{IA}$) and inter-scene transition confidence values ($P_{IE}$) versus increasing user activity for two different current shots. Whereas, FIGS. 11C and 11D provide examples of new shot selection confidence values ($P_{SF}$), depending on the shot definition and the number of subjects involved.

The confidence values can be used to directly support the decision making process 900 for automated videography, relative transition testing 630 for inter-scene or intra-scene transitions 635. As an example, the shot selection for a small group, as suggested by FIG. 11D, spans a limited range of shots 428 in an unequal way. In a decision algorithm, such as that suggested by framing process flowchart 900, the selection of the next shot 428 can be weighted using confidence values ($P_{SF}$). This can potentially increase both the speed and accuracy of the decision-making algorithm.

As another approach, confidence values can be calculated as a mechanism to test or validate a determined scene transition or new shot selection. For example, the selection of the next shot 428 can be determined using a framing algorithm while the shot selection probabilities ($P_{SF}$) are calculated in parallel, and then the two can be compared. As user activity increases beyond level of motion thresholds for the current video scene 620 or shot 428, and changes in shot framing (size, centering, pan, tilt) become necessary, the calculated inter-scene transition confidence values ($P_{IE}$) can measure or test the likelihood that user activity will fit within an identified new framing. In this context, if the result is sufficiently uncertain, the automated videography system 300 can bump up framing to the next frame size or to interim frame size. For example, under such circumstances where the next shot selection is unclear relative to the confidence values, an interim or default shot selection can be made, as provided by interim settings transition step 645.

It is noted that the probability analysis can be multi-variate and depend on the current shot selection, the number of people in the current shot and the number in the next shot (for example, including people seen in a WFOV outside the current FOV), the positioning of the people, or the motion statistics (τSUB) of the people. As discussed previously, probabilities for scene transitions or shot selection can also depend on the frequency of changes in capture settings (reframing frequency τPTZ). It is noted that scene transition or shot selection probabilities (or confidence values) can be determined based on contextual criteria (such as changes in event classifications or user classifications), rather than just criteria based on the location and duration of activity. For the matter, activity based measures, such as τSUB and τPTZ, can be used in combination with contextual cues, to determine a next shot selection or shot selection probabilities, or a scene transition or scene transition probabilities.

Values for intra-scene transition confidence levels ($P_{IA}$) and inter-scene transition confidence levels ($P_{IE}$) can be used in a transition test 630 (or framing process 900) to determine whether scene capture management 650 or transition process

640 is currently applicable. As another guide to aid the decision process, a history of calculated values for inter-scene transition ($P_{IE}$) confidence values, intra-scene confidence values ($P_{IA}$), or shot selection confidence values ($P_{SF}$) can be maintained within scenes or over the course of several adjacent scenes 620 or shots 428. For example, FIG. 10 illustrates a history of user activity and successive shots 428 that frame those activities. A variety of parameters, including the activity metrics τPTZ and τSUB, and the probability metrics ($P_{IA}$, $P_{IE}$, $P_{SF}$) can be calculated within shots 428, and at the transitions 635 between shots or scenes, as appropriate. The evolving history of these parameters can be tracked over time (within a shot 428 or video scene 620, or over many shots or scenes, or over the duration of a videography event 600), and trend monitoring of this data can then be used as an aid to identify changes in user activity, scene changes, or shot selections. These values will tend to vary less than user activity plots (τSUB), as shot selection criteria, delay times, and framing bounding boxes 424 and action safe area 426 all provide damping. The old data can be dropped after a minimum time is reached (for example 20 minutes), or after a minimum number of inter-scene transitions (for example, five (5) scene transitions or shot changes) have occurred. Again, it is noted that other factors, such as contextual cues like event classifications, subject classifications (primary user, etc.), or behavior classifications (such as recognition of jumping or clapping) can also be included in determining or using scene or shot confidence values.

In the above discussions, the described statistical testing and validation to identify scene transitions 635 and select shots 428 was largely reactive, in that a scene or shot change is in a response to changes in user activity. The system responsiveness or sensitivity to changes in user activity is somewhat reduced by framing with defined frame center areas 424 and the use of action safe areas 426 and delay times ΔT1 and ΔT2. Additionally, calculation and tracking of user activities using a subject movement factor τSUB, or a reframing frequency τPTZ, or confidence values ($P_{IA}$, $P_{IE}$, $P_{SF}$), is somewhat anticipatory. These mechanisms enable an automated videography system 300 to detect and respond to small or modest changes in user activity that in turn better position the video capture relative to potential subsequent larger changes in user activity. That can speed the apparent response for a viewer. Additionally, the use of confidence values for weighting or testing, such as determining a next shot selection, is an aid in further trying to improve the response time and accuracy of the video communication device 300. Certainly, the monitoring of a WFOV 420 for peripheral changes in user activity, while providing video capture from a NFOV, is also anticipatory.

However, as another approach, pro-active or anticipatory statistical analytical methods can be used to identify potential scene transitions and the appropriate video capture and processing changes. For example, a Bayesian network methodology can be used. Bayesian networks are based upon a graphical model of probabilistic relationships among a set of variables, for which the probability of an event X is best determined based upon a person's degree of belief in that event, rather than on a classical physical probability of an event occurring. Degrees of belief are assigned to propositions, and then combined and manipulated using the rules of probability. Bayesian networks are also particularly useful for managing conditional probabilities, where the probability of one event is conditional on the probability or occurrence of a previous one (prior knowledge). In Bayesian inference, evidence is collected that is meant to be consistent or inconsistent with a given hypothesis. As evidence accumulates, the degree of belief in a hypothesis changes. With enough evidence, it will often become very high or very low. Alternately stated, Bayesian networks enable the calculation of conditional probabilities for the nodes in the network, given that the values of some of the nodes have been observed or provided. In the simplest case, a Bayesian network is specified by an expert and is then used to perform inference. In other applications the task of defining the network is too complex for humans, and the network structure and the parameters of the local distributions must be learned from data.

Bayes' theorem (Equation 1) relates the conditional and marginal probabilities of random events A and B, taking into account the conditional probabilities or linkages between the two events;

$$P(A/B)=[P(B/A)*P(A)]/P(B) \qquad (1)$$

where P(A/B) is the conditional or posterior probability of event A, given B. Likewise, P(B/A) is the conditional or posterior probability of event B, given A. Probabilities P(A) and P(B) are the marginal or apriori probabilities of events A and B respectively, as new events occurring independent of prior events (prior experiences). The probability of an event A conditional on another event B is generally different from the probability of B conditional on A. However, there is a definite relationship between the two, and Bayes' theorem is the statement of that relationship.

The Bayesian network approach can be used to support the contextual interface 450 in decision-making for scene transitions 635 and selection of shots 428, which can be based on behavioral attributes such as event or behavior classifications. As examples, there are individual marginal probabilities P(event) for each type of event (such as a large group event, a spontaneous event, or a purposeful event) occurring. Likewise, as an example, there can be conditional probabilities associated with a purposeful event transitioning to a spontaneous event (as in FIG. 4C), which can be different than for a spontaneous event transitioning to a purposeful event. There can also be conditional probabilities for transitioning from one type of motion (clapping) to another (jumping), or from one quantitative level or measure of user activity to another (hurried to settling, for example). As the probabilities for a transition from one event type to another are based upon knowledge of human behavior, rather than on a classical probability for a physical event (a coin flipping to heads or tails, for example), Bayesian analysis can be particularly useful. Related statistical models, such as a directional Markovian probability model, can also be used. These probability-modeling approaches can be used for validation tests, perhaps resulting in the use of interim event settings. However, there greatest potential value may be for pro-active or anticipatory scene or shot identification, as the models attempt to predict a new event state (or shot selection or scene or automatic capture mode), based on belief models of what may occur. However, these belief-based models may be more difficult to implement than the methods discussed previously, and may add marginal value.

Thus, as can be seen, cinematography provides language and concepts useful for the present invention, particularly with respect to shot sizing (medium wide, etc.). However, unlike cinematography, whether traditional or automated, where shots and actor activities are planned to follow a script, the present invention for automated videography, which supports personal video communications, targets shot transition management and shot selection of real time, unscripted events, in which subsequent user activity is unknowable. The shot selection and shot or scene transition decisions can be based on contextual cues (such as event classifications, user identity, or type of activity), or the selection of the automatic capture mode (such as lock and follow or hierarchical), or user and system activity metrics (τSUB and τPTZ), or shot change and scene transition probabilities ($P_{SF}$, $P_{IA}$, $P_{IE}$). These latter parameters, the user and system activity metrics and the shot change and scene transition probabilities, directly address the uncertainty in subsequent user activity by providing quantitative factors for tracking and measuring such activity. The uncertainty in user activity also means that the shot conventions (wide shot, etc.) are applied differently, with bounding boxes (424, 426) that are used to define and reduce shot reframing activities (PTZ and cropping), rather than to optimize aesthetic value.

As another aspect that the automated videography system 300 of the present invention targets residential video communications, then unlike standard cinematography, a very limited set of cameras and limited camera placement (orientation) is generally assumed. This means that users 10 will often violate cinematographic conventions, such as the action axis rule or indecisive cuts. Additionally, the camera pacing for PTZ activity or shot changes, in consideration of the remote viewer, are constrained by the shot resizing and recentering time delays (such as ΔT2). As a result, the video capture system of the present invention will tend to provide a slow pacing or video style, rather than a fast pacing frequently used in dramatic cinema.

There are of course alternate applications of the present invention, aside from real-time video communications, which can apply the previously described for different purposes, or use alternate hardware and software combinations for similar purposes. In anticipation of one alternate exemplary application of the present invention, FIG. 12A depicts an autonomous camera 120, much as generally described in commonly-assigned U.S. Patent Publication No. 2008/0298795 (Kuberka et al.). Conceptually an autonomous camera 120 can independently capture still or video images in response to cued environmental triggers, without requiring immediate or constant human operation, therefore freeing the picture-taker from having to operate the camera. As shown in FIG. 12A, an autonomous camera 120, having an electronic imaging device 100, user interface controls 190, a lens (not shown) and other components, is capturing an image of a subject 10, which in this instance, is a soccer player. The camera 120 can employ one or more environmental sensors 130 including sensors that detect sound, light (λ: visible, ultraviolet or infrared), vibration, heat, electric fields, magnetic fields, radiation and other environmental variables, whose output data is interpreted to detect cues. Depending on user input, an autonomous camera 120 can trigger on a variety of cues, including sounds (such as laughter, clapping, keywords, changes in volume level), changes in lighting, objects 260 (such as a soccer ball), faces, and gestures or motion. For example, as depicted in FIG. 12A, a user could use a touch-screen display 110 to identify a cue by drawing an outline 192 around an object 260 (the soccer ball), which becomes the chosen cue for a the subsequent event.

Of course, when capturing still images of real time events, both human operators and autonomous cameras 120 can miss the optimum shot due to a delayed response in recognizing a photo opportunity. One approach, as discussed in the Kuberka '795 publication, is to have a high resolution camera 120 capture an ongoing sequence of wide field of view images, for example as a few seconds of video, which is then stored in a temporary frame buffer. By continually monitoring the resulting using an event detection algorithm that can interpret incoming data from environmental sensors 130, any designated cues or events can be detected and used as triggers that determine that a still image or sequence of images are to be stored in permanent memory 345, rather than being deleted from temporary storage in the frame buffer. When this occurs, the original selected image or images can be then be cropped down, and centered or aligned with the photographic rule of thirds (per FIG. 6B), to extract final images to be saved. In support of this, key frame extraction methods and automatic zoom and crop techniques can be used in order to detect and distinguish key image frames that are most likely to be of value to the user.

While the autonomous camera 120 of Kuberka '795 can operate in real time to capture unscripted events, the key frame extraction and image cropping methods are primarily applied to post-processing known still images. Effectively this means that a subset of the original captured images are retained, as a prolonged processing time, subsequent image cropping, image tagging, and image storage are geared to the handling and optimizing of still images. However, as an autonomous camera 120 attempts to capture and process real time unscripted events more quickly, with the goal of saving more optimum images from a time sequence, the camera operation more closely resembles the operation of the video capture device and method of the present invention. Therefore, the image framing concepts for single and multiple subjects described in relation to FIGS. 7A and 7B, and the shot selection probabilities of FIGS. 11A-11D become pertinent in dealing with potentially sudden changes in user activities. However, unlike during video communications, the images captured by an autonomous camera 120 are likely not viewed in real time. As a result, the shot transition delay times ($\Delta T_{1,2,3}$) that moderate changes in image capture settings to reduce remote viewer annoyance during video communications, need not apply. However, in the case of capturing a video sequence, an autonomous camera 120 can be required to capture a shot sequence with a minimum shot duration (Ts).

As an additional note, the autonomous camera 120 of Kuberka '795 is described as having a single WFOV lens for image capture. While a WFOV is monitored, the camera must have high enough resolution that acceptable image quality is provided for the cropped down images. Alternately, the autonomous camera 120 can use multiple camera modules 121 in a single camera housing 146. FIG. 12B depicts a dual lens camera 120 having multiple camera modules 121, each including a lens and sensor (CCD or CMOS). An exemplary camera product, the Kodak V705 dual lens camera, has both a WFOV camera module and a zooming NFOV camera module, although it lacks the autonomous camera functionality. An autonomous camera with multiple camera modules capable of capturing different fields of view, can use the image framing and shot selection concepts of the present invention, while using the multiple camera modules to reduce the resolution loss allowed by the Kuberka '795 publication. The multiple camera modules can be used to capture either still or video images, sequentially, or simultaneously. As an example, commonly assigned U.S. Patent Publication No. 2008/0211941 (Deever et al.) describes a multi-lens camera that uses multiple camera modules to simultaneously capture images of the same scene.

In a general way, the autonomous camera 120 can capture either intermittent still images or continuous video using the automated videography methods of the present invention, as they relate to shot selection, shot framing, and shot transition detection and management, whether the camera 120 is directly or immediately connected to a display 110 or not. Camera 120 can also be a extremely wide angle camera, such as a 360° panoramic camera.

The present invention has generally been described as an automated videography system 300, particularly applicable to video communications, which is present and used in a residential setting. Needless to say, it can of course be used in other settings. Additionally, an existing device, including a display 110, camera 120, and CPU or computer 340 can be converted to the purpose of automated videography, with or without call management, and used as a portable device or in a fixed location. The present invention include computer readable media and program storage devices (memory 345) tangibly embodying or carrying a program of instructions or algorithms readable by machine or a processor, for having the machine or computer processor execute instructions or data structures stored thereon. Such computer readable media can be any available media that can be accessed by a general purpose or special purpose computer. Such computer-readable media or memory device can comprise physical computer-readable media such as RAM, ROM, EEPROM, CD-ROM, DVD, hard disk, or other optical disk storage, flash drive, magnetic disk storage or other magnetic storage devices, for example. Any other media that can be used to carry or store software programs which can be accessed by a general purpose or special purpose computer are considered within the scope of the present invention. Algorithms, program instructions, or software specific or germaine to the present invention (such as for the automated videography framing process 900 depicted in FIG. 9) can be loaded into memory 345 via a program storage media such as a DVD or flash drive.

Of course, the video communications system 300 of the present invention can be used for purposes other than personal communications between local and remote family members. As other examples, the automated videography system 300 can be used to enable student to teacher, or home health monitor, video communications. As another example, a recording feature can be used to save a discussion of family history with a remotely located family elder. The automated videography system 300 can also be used to record real time events in the local environment without real time transmitting them. As one example, a musician or a dancer can use the automated videography system 300 for recording an informal audition tape during a videography event 600. While a similar task can be accomplished with a conventional human operated video camera or a web-cam, the scene framing rules and autonomous operation can provide a potential better quality video recording without requiring an operator. Similarly, it can be used to record video for video blogging (such as for YouTube) or to provide images for a meta-verse, such as Second Life.

Again, for some of these alternate uses outside of real time communications, the starting premise to provide real time video communications can be limiting. The automated videography system 300 can be used to capture real time video during videography events 600 without including the call management and networking aspects. For example, the standard automated rules for handling shot transitions 635 may not be appropriate for a dancer using the system to record an audition tape. Whereas, use of an automated lock and follow mode may be better suited for that purpose. Similarly, users may want to select a shot style, such as dramatic" or "comedic" for automated capture, with a style selection impacting shot selection, shot framing, and shot transition timing (for example, reduced shot transition delay times ($\Delta T_{1,2,3}$). This may more closely simulate automated cinematography, but the limited number of cameras 120, limited camera positioning, and limited camera PTZ and cropping ranges, as well as the reality of capturing unscripted real time events, would likely limit the stylistic effect compared to true cinematography. However, as evidenced by recent motion picture releases the Blair Witch Project (1999) and Slumdog Millionaire (2008), which were shot in part with electronic cameras, modern cinematography is evolving and accepting new technologies, and automated videography may eventually be utilized too.

It is also considered that users may want to overcome camera limitations by simulating a perspective captured by a virtual camera. This can be accomplished by using views of a scene captured by multiple cameras with differing perspectives, and then synthesizing a new perspective of the scene from the available imagery. Virtual cameras are used in other application spaces, and in particular, in virtual worlds to simulate alternate views. However, virtual worlds and spaces, which are defined by a computer, lack the complexity of the real world. So, while synthesizing virtual camera perspectives for capture of real time, unscripted, events in relatively unconstrained settings (compared to conference rooms or auditoriums) may become feasible, given the required computational horsepower, this is unlikely in the near term. This is particularly true given that computational effort also can be directed to real time scene capture management and transition testing, eye gaze correction, and application of privacy settings.

As another alternate exemplary use, a local user 10a can view a program of wildlife scenes or dance scenes while the video communication device 300 captures the responses and participation of the local user 10, within the limitations of the predetermined privacy and contextual settings. The captured video can be transmitted to a remote location. This type of operational model may lend itself to numerous applications in various fields, including education, market research, and behavioral and drug research. As other examples where users can use the video communication device 300 to view image content between video communication events 600, it can also be used as a computer display, a television, or as an electronic picture frame.

As the system 300 has been targeted to video communications, the device concept is human-centric. However, it can also be used for non-human subjects. As one example, the automated videography system 300 can be directed to video capture the activities of animals, perhaps using audio or visual cues, including body shape, texture, and other classifiers as input to camera selection, camera direction, shot framing, and shot transition determinations. Likewise, video capture can also be targeted to objects whether they are animate (moving) or inanimate.

For a point of comparison, the present invention is generally unlike automated security and surveillance systems, although both can involve multi-camera video capture of real-time unscripted events. An automated video surveillance system can be used to identify and track security threats, thereby reducing the burden on the human operators relative to watching hours of video on end. As an example, in the paper, "*Real-time video tracking using PTZ cameras*", by Sangkyu Kang et al., which is published in the SPIE Proc., Vol., 5132, pp. 103-111, (2003), a real-time tracking system using a PTZ camera, and an adaptive background generation and subtraction method, is described for detecting and tracking potential intruders or suspects. As this paper discusses, a variety of techniques, including adaptive background generation, shape identification and tracking, and region based tracking, are used in automated security systems. The approach of the Kang paper uses adaptive background generation to extract moving objects, and a mosaicing technique to geometrically project one view onto another view, as overlapping views are seen with changes in camera pan and tilt angles. In comparison, shape identification and tracking methods can apply algorithms to automatically identify security concerns or threats, such as detecting weapons or running targets, which can then be tracked. Region based tracking attempts to localize objects with data or histograms representing color and intensity distributions and other information that are pose, illumination, and object occlusion insensitive.

There are numerous ways in which an automated video surveillance system is different than the automated video capture system of the present invention. To begin with, a security system can pre-deploy cameras directed at key areas or objects in sufficient numbers, and the cameras can be overt or covert placed, and operate in the visible or IR spectra. An automated security system is also motivated to detect and isolate a subject from the image content captured of the background environment. Additionally, as subject loss is highly undesirable, rapid camera changes and reframing to track a subject is acceptable. By comparison, the residential video communications application likely has limited cameras with limited camera placement and functionality. Additionally, the camera automation algorithms of the present invention are designed to optimize framing (relative to shot transition identification (intra-scene or inter-scene), shot selection, subject framing within shots, or shot transition timing and delays) of user activities for the purpose of improving a viewing experience, rather than to frame images so as to localize, target, and track identified security threats. Certainly analytical techniques, such as foreground and background separation of the captured images, can be useful for the present invention, for example in supporting a lock and follow mode or spatial privacy. In the latter case, the goal is to identify and track areas, features, and objects that are off limits for privacy reasons, and omit them from image capture, rather than to target them, as in a security application.

The invention has been described in detail with particular reference to certain preferred embodiments thereof, but it will be understood that variations and modifications can be effected within the spirit and scope of the invention. It is emphasized that the apparatus or methods described herein can be embodied in a number of different types of systems, using a wide variety of types of supporting hardware and software. In particular, the networked video communication system 290 and the video communications devices 300 have been described as using a construct of scene analysis algorithms, scene adjustment algorithms, scene analysis rules, and contextual classifications as aspects of the automatic operation of contextual interface 450. The interaction and application of these video capture analysis and adjustment mechanisms have been described by a series of operational diagrams (FIGS. 5A-5C and FIG. 9). However, other equivalent methods, mechanisms, and operational interactions, including changes in the order thereof, can be used to accomplish the claimed functionality. It should also be noted that drawings are not drawn to scale, but are illustrative of key components and principles used in these embodiments.

The invention has been described in detail with particular reference to certain preferred embodiments thereof, but it will be understood that variations and modifications can be effected within the scope of the invention.

PARTS LIST

| 10 | user (viewer or subject) |
| 10a | user (viewer or subject) |

-continued

PARTS LIST

| 10b | user (viewer or subject) |
|---|---|
| 100 | electronic imaging device |
| 110 | display |
| 115 | screen |
| 120 | image capture device (or camera) |
| 121 | image capture module |
| 122 | imaging lens |
| 124 | image sensor |
| 125 | speaker (audio emission device) |
| 130 | environmental sensors |
| 140 | ambient light detector |
| 142 | motion detector |
| 144 | microphone |
| 146 | housing |
| 190 | interface controls |
| 192 | outline |
| 200 | ambient light |
| 260 | object |
| 265 | home structure |
| 270 | home appliance |
| 290 | networked video communication system |
| 300 | video communications device (automated videography system) |
| 310 | image capture system |
| 320 | image processor |
| 325 | audio system processor |
| 330 | system controller |
| 340 | computer (CPU) |
| 345 | data storage (memory) |
| 350 | alert notifier |
| 355 | communications controller |
| 360 | network |
| 362 | site |
| 364 | site |
| 365 | electronic handshake |
| 400 | privacy interface |
| 410 | split screen image |
| 410' | split screen image |
| 410" | split screen image |
| 412 | subtitles |
| 415 | local environment |
| 420 | image field of view (or NFOV, WFOV) |
| 422 | image area |
| 424 | frame center area |
| 426 | action safe area |
| 428 | shots |
| 430 | audio field of view |
| 440 | user interface |
| 450 | contextual interface |
| 460 | reference image |
| 470 | user identification process |
| 480 | user tracking process |
| 490 | appearance altering interface |
| 495 | gaze adapting process |
| 600 | communication event (or videography event) |
| 605 | invitation |
| 610 | acceptance |
| 615 | initiate video transmission |
| 617 | end transmission step |
| 620 | video scene (shot) |
| 620a | video scene (shot) |
| 620b | video scene (shot) |
| 620c | video scene (shot) |
| 620d | video scene (shot) |
| 630 | transition test |
| 635 | transition (inter-scene or intra-scene) or shot transition |
| 640 | transition process |
| 641 | transition process steps |
| 642 | transition process steps |
| 643 | transition process steps |
| 644 | transition process steps |
| 645 | transition process steps |
| 650 | scene capture management |
| 655 | communication event analysis |
| 900 | framing process flowchart |
| 905 | subject detection step |

-continued

PARTS LIST

| | |
|---|---|
| 910 | subjects detected decision step |
| 915 | determine initial framing step |
| 920 | analyze framing step |
| 925 | adjustment required decision box |
| 930 | subjects in FOV decision box |
| 935 | determine adjustment parameters step |
| 940 | shot change delay time step |
| 945 | change capture settings step |
| θ | full angle |
| λ | light |
| $P_{IA}$ | intra-scene transition confidence value or probability |
| $P_{IE}$ | inter-scene transition confidence value or probability |
| $P_{SF}$ | new shot selection confidence value or probability |

The invention claimed is:

1. A method for framing one or more subjects captured on video during a video communication event with a remote viewer, the method comprising the steps of:
  receiving video of a first subject in an environment from a camera;
  determining a current shot framing of the first subject in the video images, with a computer and an associated image processor, relative to a shot selection and subject positioning within the framed shot;
  determining at least one subject activity metric for the observed movement of the first subject in the received video, relative to the current framing and level of motion thresholds;
  analyzing the subject movement of the first subject, relative to the determined at least one subject activity metric and the current framing, to determine scene change probabilities, relative to the determined subject activity metrics and current shot subject motion thresholds, to determine whether video capture of the at least first subject can continue using modifications to the current subject framing or that framing of the at least first subject can be improved with new subject framing;
  determining alternate shot options, including associated shot selection probabilities, based upon associated shot dependent subject motion thresholds and the determined subject activity metrics, if the determined scene change probability for new subject framing is greater than a predetermined value;
  selecting a next shot from among the determined alternate shot options based upon the determined shot selection probabilities;
  instructing the image processor or camera to re-frame the first subject in accordance with the newly selected next shot, including associated shot framing and any new video capture settings; and
  transmitting video images to the remote viewer using the newly instructed shot framing and video capture settings.

2. The method according to claim 1 wherein the shot selection is further determined based on the percentage area occupied by a face or head relative to the total image area, or on the basis of the number of subjects within the framed shot, or on the basis of subject activity, or combinations thereof.

3. The method according to claim 2 in which the selection of available shots includes a long shot, a wide shot, a medium shot, a medium wide shot a close-up shot, or intermediate shots thereof.

4. The method according to claim 1 wherein subject activity metrics are measured relative to a variety of factors, including at least a velocity, acceleration, frequency, position, direction, or a range of motion, a risk of subject loss, or combinations thereof, relative to the subject framing.

5. The method according to claim 1 wherein the subject activity metrics are measured by a reframing frequency, which is a measurable rate of reframing the subject in video images, by means of zooming, panning, tilting of a camera, image cropping, or switching from images captured by one camera to images captured by another camera, or combinations thereof.

6. The method according to claim 1 wherein decreasing levels of subject motion are analyzed relative to the subject motion thresholds to determine that the current shot framing can be changed to a tighter shot.

7. The method according to claim 1 wherein at least one of the scene change probabilities, the shot selection probabilities, and a threshold associated with the at least one subject activity metric are shot dependent, whether for the current shot, the next shot, or combinations thereof.

8. A method for providing video communications between at least one subject in a local environment and a remote viewer using a video communication system, comprising:
  capturing video images with the video communication system according to current video capture settings while using one or more cameras during a video communication event of one or more video scenes, which involves a subject within the local environment, where the current video capture settings at least define current subject framing within a selected shot;
  transmitting captured video images to the remote viewer in accordance with current video capture settings;
  analyzing the captured video images of a current video scene as captured according to the current video capture settings, to assess image quality relative to current subject framing and changes in subject activity using at least one subject activity metric;
  determining a need to change the current subject framing, relative to improving video image quality and reducing a risk of subject loss relative to the assessed changes in subject activity, as indicated by the at least one subject activity metric, for presentation to the remote viewer;
  in response to a determined need to change subject framing, determining whether the analyzed changes in subject activity, relative to the subject framing and the risk of subject loss, correspond to an intra-scene transition or an inter-scene transition, such that when the analyzed changes in subject activity relative to the at least one subject activity metric are below a predetermined value, they correspond to the intra-scene transition for which modifications to the current shot framing are consistent with that shot framing, and when the changes in subject activity relative to the at least one subject activity metric are above a predetermined value, and they correspond to the inter-scene transition to a selected new shot having new shot framing;
  determining new subject framing and new video capture settings corresponding to the determined shot framing for the determined scene-transition, whether intra-scene or inter-scene;
  automatically modifying ongoing video image capture in accordance with the newly determined shot framing and video capture settings; and
  transmitting video images to the remote viewer using the modified shot framing and video capture settings.

9. The method according to claim 8 wherein an intra-scene transition corresponds to a change in the framing of the subject in the video image, relative to subject position, size, or focus, while retaining the current framing, and wherein an inter-scene transition corresponds to a change to a new subject framing.

10. The method according to claim 8 wherein scene change confidence values, including an intra-scene change probability or an inter-scene change probability, are calculated and then used to determine that an intra-scene transition or an inter-scene transition, respectively.

11. The method according to claim 8 in which the shot selection is determined based on a variety of factors including shot change confidence values, the percentage area occupied by a face or head relative to the total image area, or on the basis of the number of subjects within the framed shot, or on the basis of subject activity, or combinations thereof.

12. The method according to claim 8 in which the selection of available shots includes a long shot, a wide shot, a medium shot, a medium wide shot a close-up shot, or intermediate shots thereof.

13. The method according to claim 8 in which reframing of video capture from a current framed shot to an alternate shot framing is delayed by a defined re-centering and re-sizing time delay.

14. The method according to claim 13 wherein the defined re-centering and re-sizing time delays are applied to enhance the viewing experience of the remote viewer.

15. The method according to claim 8 in which changing levels of subject activity are measured by the subject activity metrics or a re-framing frequency, which are tracked over time during the videography event.

16. The method according to claim 15 wherein the reframing frequency is a measurable rate of reframing, by means of zooming, panning, tilting of a camera, image cropping, or camera switching, or combinations thereof.

17. The method according to claim 15 wherein the subject activity metrics are determined relative to a factors, selected from a group consisting of velocity, acceleration, frequency, position, direction, or a range of motion, or combinations thereof, relative to the subject framing.

18. The method according to claim 8 wherein the remote viewer provides instructions to the system to change the video capture settings of the system operating in the local environment.

19. A video communication system, comprising:
an image display device adapted to display video images;
at least one image capture device which acquires framed video images of a local environment having at least one subject therein during a video capture event, according to defined video capture settings, which includes a current shot selection and current shot framing of the subject;
a computer cooperating with the at least one image capture device and an image processor, to generate video signals based upon the acquired video images, wherein said video signals are then transmitted across a communicative network to a remote viewer, the computer operating a set of instructions that comprise:
instructions for operating the at least one image capture device to capture video images according to video capture settings during a videography event consisting of one or more video scenes which involve at least one subject within a local environment, where a set of first video capture settings define the first subject framing within a selected first shot and first camera parameters;
instructions for analyzing the captured video images of the video scene as captured according to the first video capture settings, to assess subject activity of the at least one subject, relative to the first subject framing and the image quality thereof;
instructions for determining scene change probabilities, relative to the assessed subject activity, whether video capture of the at least subject can continue using the first subject framing, or that the video image quality can be improved with a new subject framing;
instructions for determining alternate shot options, including associated shot selection probabilities, based upon the assessed level of subject activity, if the determined scene change probability for providing the new subject framing is greater than a predetermined value; and
instructions for selecting a next shot from among the determined alternate shot options based upon the determined shot selection probabilities, including determining the associated new subject framing and any new video capture settings;
wherein the video communication system then implements the newly selected next shot to modify ongoing video image capture of the at least one subject by the at least one image capture device and data processor using associated second video capture settings; and
wherein the video communication system provides first transmitted video signals corresponding to the video images captured according to the first video capture settings, and where the video communication system then provides second video signals corresponding to the video images captured according to the second video capture settings.

20. The system according to claim 19 wherein the subject activity is assessed using subject activity metrics or a re-framing frequency, which are tracked over time during the video capture event.

21. The system according to claim 20 wherein the reframing frequency is defined as a measurable rate at which reframing, which includes zooming, panning, tilting of a camera, or image cropping, is undertaken.

22. The system according to claim 20 wherein the subject activity metrics are measured relative to factors, selected from a group consisting of a velocity, acceleration, frequency, position, direction, or a range of motion, or combinations thereof, relative to the subject framing.

23. The system according to claim 19 wherein the video capture management algorithm determines shot change confidence values that are calculated as probabilities in determining a selection of a subsequent shot to follow a current shot framing.

24. The system according to claim 19 wherein an intra-scene transition corresponds to a change in the framing of the subject in the video image, relative to subject position, size, or focus, while retaining the current framing, and wherein an inter-scene transition corresponds to a change to a new subject framing.

25. The system according to claim 24 wherein the scene change confidence values, including those for an intra-scene change probability or an inter-scene change probability, are calculated and then used to determine that an intra-scene transition or an inter-scene transition, respectively.

26. The system according to claim 19 wherein the at least one image capture device includes at least one camera that captures a wide image field of view and one camera that captures a narrow image field of view.

27. The system according to claim 19 which further includes a user interface that enable subjects, or the remote viewer, to determine user defined settings, including privacy settings or selection of automatic capture modes that define operation of the video communication system.

28. The system according to claim 19 in which image capture modification for the next shot are applied using a shot transition delay time or a shot change transition time that are measured in seconds or frames of elapsed video, and depend on a number of subjects and a shot selection.

29. The system according to claim 19 wherein the scene change probabilities or shot selection probabilities are dependent on the shot selection.

30. A method for framing one or more subjects captured on video during a video communication event with a remote viewer, the method comprising:
   receiving video of at least one subject in an environment from a camera during the video communication event, the video consisting of one or more video scenes, for which current video capture settings define current subject framing of the at least one subject within a selected shot and current camera parameters;
   analyzing the captured video images of a current video scene as captured according to the current video capture settings, to assess subject activity and changes thereof, relative to the current subject framing and video image quality;
   determining whether the analyzed changes in subject activity, relative to the current subject framing, correspond to either an intra-scene transition, for which an intra-scene change probability based on the analyzed changes in subject activity and current shot framing indicates that a determined modified current shot framing can adapt to the changing subject activity, or to an inter-scene transition, for which an inter-scene change probability, based on the analyzed changes in subject activity, indicates for a change to a selected new shot with new shot framing;
   determining next shot options, including associated shot selection probabilities, based upon the assessed level of subject activity, if the determined inter-scene change probability indicates need for a new subject framing;
   selecting a next shot from among the determined next shot options based upon the determined shot selection probabilities, and determining a next shot subject framing and associated video capture settings;
   automatically modifying ongoing video image capture to apply either the modified current shot framing or the next shot framing, as indicated by the at least one of the determined inter-scene change probabilities, the intra-scene change probabilities, and the shot selection probabilities; and
   transmitting video images to the remote viewer using the modified shot framing and video capture settings.

31. The method according to claim 30 in which changing levels of subject activity are measured by a subject activity metrics, which are determined relative to factors, selected from the group consisting of velocity, acceleration, frequency, position, direction, or a range of motion, a risk of subject loss, a re-framing frequency, or combinations thereof, relative to the subject framing during the video communication event.

32. The method according to claim 30 wherein the changing levels of subject activity are associated with the arrival or departure of the at least one subject relative to at least a portion of the local environment that is subject to image capture.

* * * * *